US008381247B2

(12) United States Patent
Matsuura et al.

(10) Patent No.: US 8,381,247 B2
(45) Date of Patent: Feb. 19, 2013

(54) SCHEDULE-TABLE PRESENTING APPARATUS AND SCHEDULE-TABLE PRESENTING METHOD

(75) Inventors: Koji Matsuura, Tokyo (JP); Yasushi Tsuruta, Tokyo (JP); Masatoshi Ohta, Tokyo (JP); Hideki Asazu, Tokyo (JP)

(73) Assignee: Sony Corporation, Tokyo (JP)

( * ) Notice: Subject to any disclaimer, the term of this patent is extended or adjusted under 35 U.S.C. 154(b) by 1029 days.

(21) Appl. No.: 12/011,656

(22) Filed: Jan. 29, 2008

(65) Prior Publication Data

US 2008/0184314 A1 Jul. 31, 2008

(30) Foreign Application Priority Data

Jan. 31, 2007 (JP) ................................ P2007-022267

(51) Int. Cl.
*H04N 5/445* (2011.01)
*G06F 3/00* (2006.01)
*G06F 13/00* (2006.01)

(52) U.S. Cl. .......................................... 725/44; 725/39
(58) Field of Classification Search .......................... None
See application file for complete search history.

(56) References Cited

U.S. PATENT DOCUMENTS

| | | | | |
|---|---|---|---|---|
| 6,128,009 A | * | 10/2000 | Ohkura et al. | 725/46 |
| 6,813,774 B2 | * | 11/2004 | Inoue | 725/39 |
| 7,340,677 B2 | * | 3/2008 | Cowperthwaite | 715/719 |
| 2003/0177494 A1 | * | 9/2003 | Satterfield et al. | 725/43 |
| 2004/0168186 A1 | * | 8/2004 | Rector et al. | 725/39 |
| 2007/0039021 A1 | * | 2/2007 | Lee | 725/40 |

FOREIGN PATENT DOCUMENTS

| | | |
|---|---|---|
| JP | 2003-283947 A | 10/2003 |
| JP | 2006-050011 A | 2/2006 |
| JP | 2006-295806 A | 10/2006 |

* cited by examiner

*Primary Examiner* — Mark D Featherstone
(74) *Attorney, Agent, or Firm* — Lerner, David, Littenberg, Krumholz & Mentlik, LLP

(57) ABSTRACT

A schedule-table presenting apparatus including: a schedule acquisition section configured to acquire a schedule including the broadcasting start time and a descriptive text describing each of the events; a schedule-table generation section configured to assign a specific one of the events to a first program frame and assign a plurality of events other than the specific event to a second program frame in order to generate a schedule table including the first program frame allocated to the specific event as a frame showing the broadcasting start time of the specific event as well as the descriptive text describing the specific event and the second program frame allocated to the other events as a frame showing the broadcasting start time of each of the other events; and a display control section configured to display the schedule table generated by the schedule-table generation section on a display section determined in advance.

15 Claims, 27 Drawing Sheets

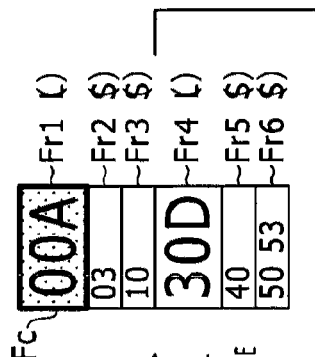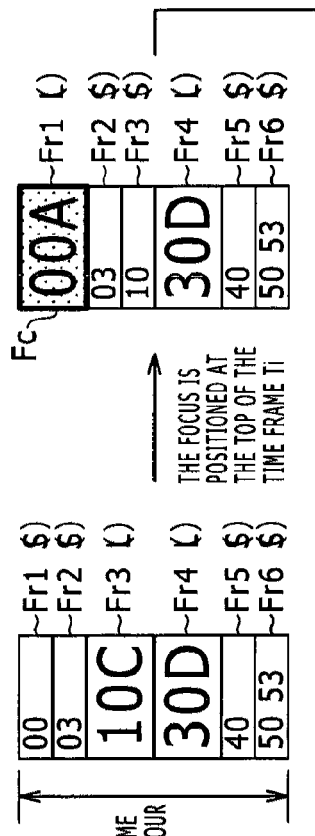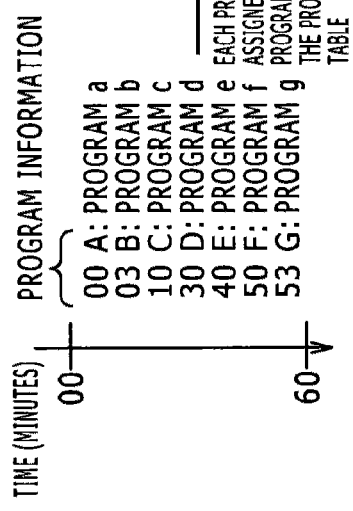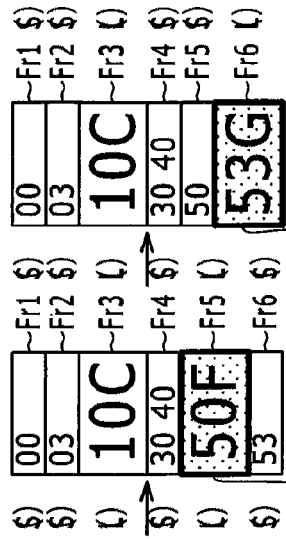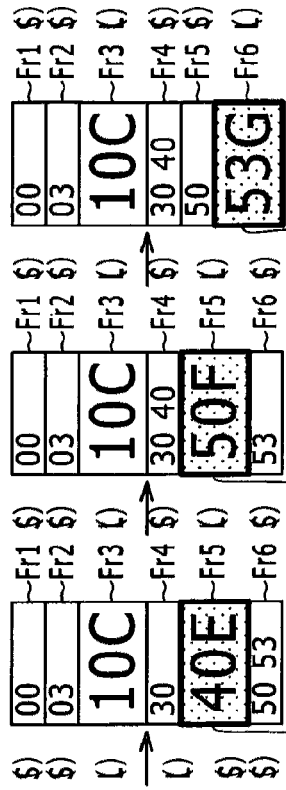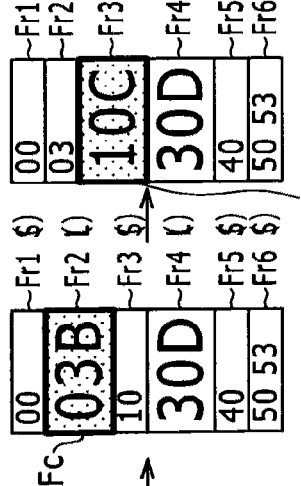

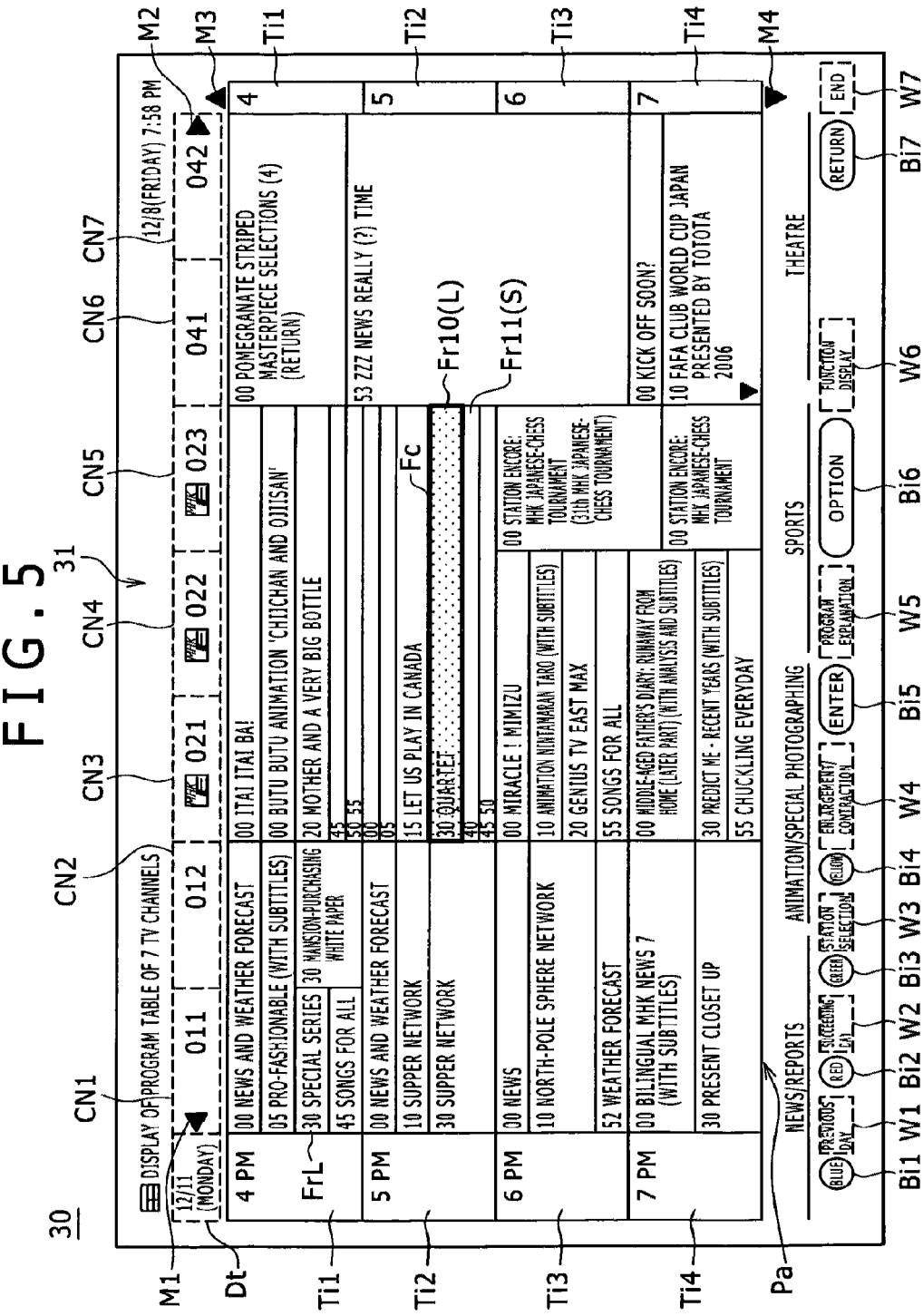

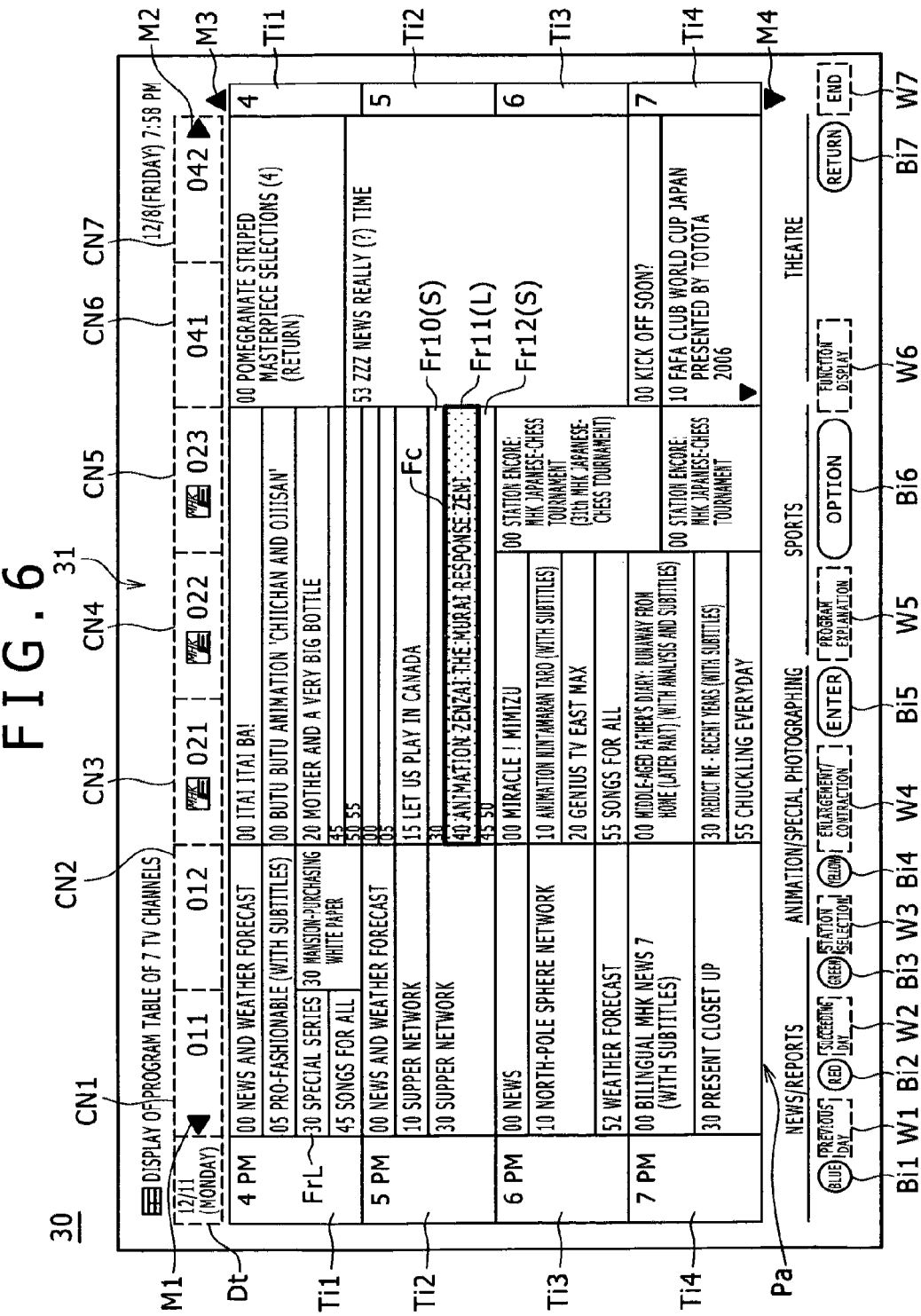

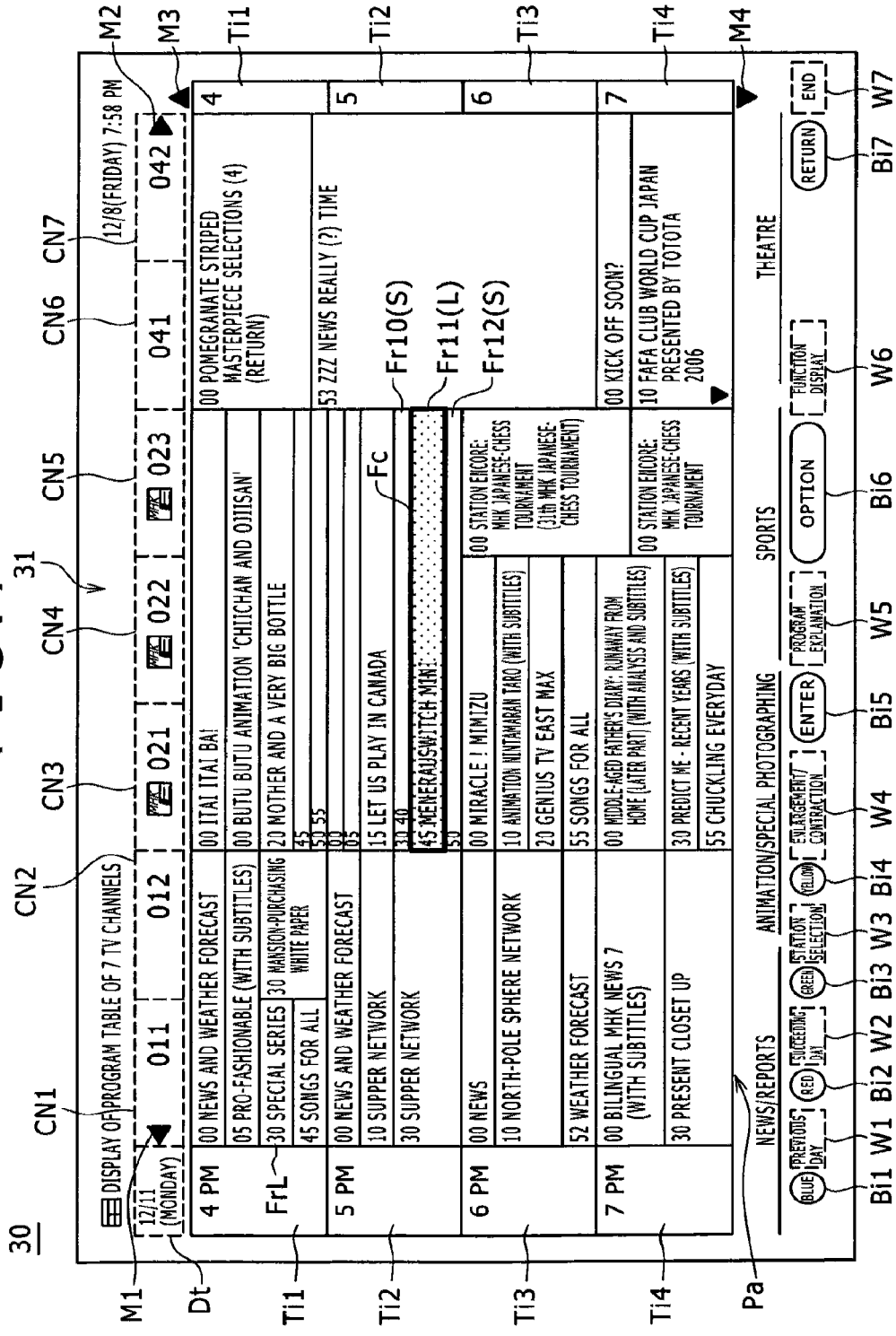

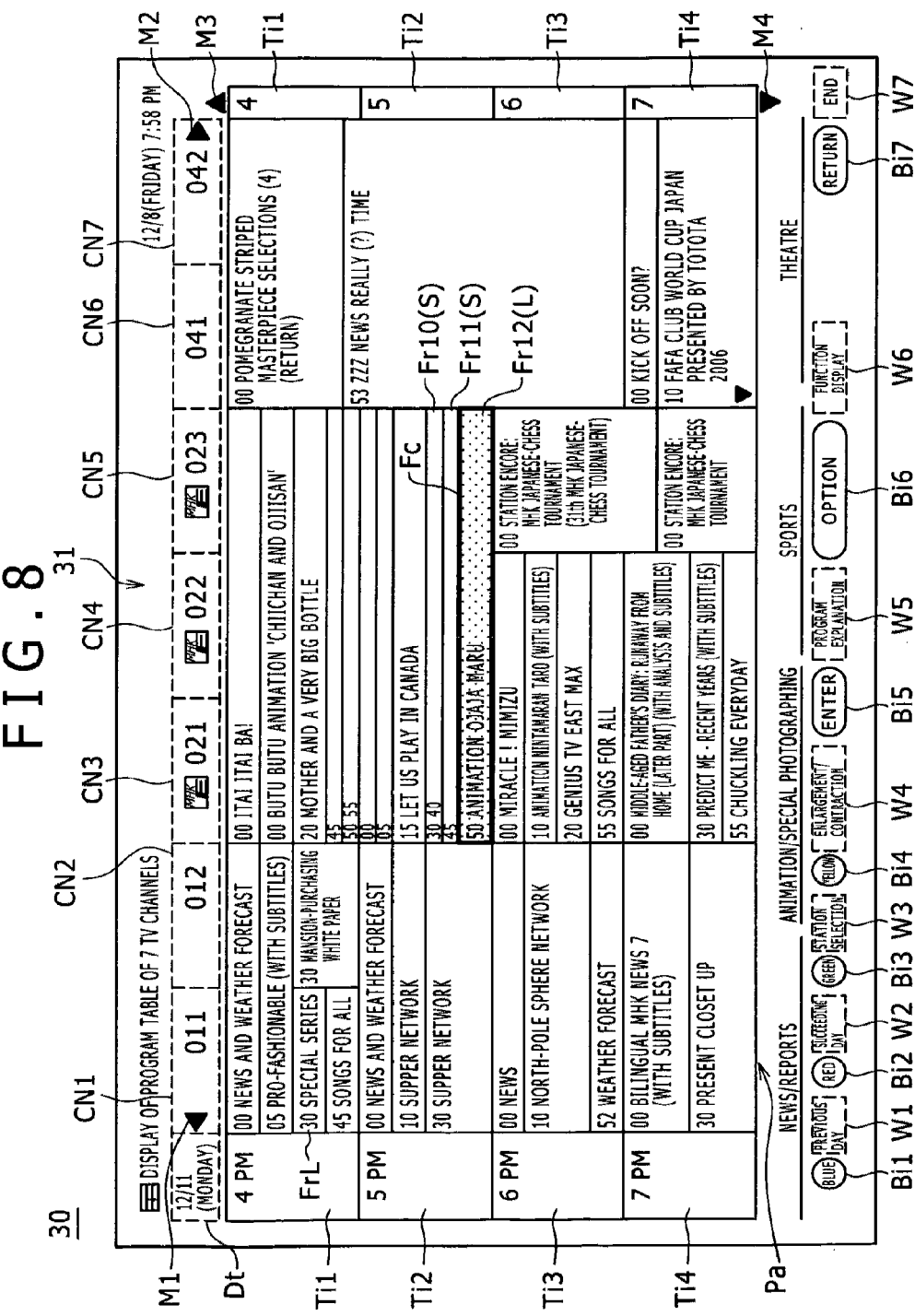

FIG. 9

| | CN1 | CN2 | CN3 | CN4 | CN5 | CN6 | CN7 |
|---|---|---|---|---|---|---|---|
| | | | | | | | 12/8 (FRIDAY) 7:58 PM |
| | DISPLAY OF PROGRAM TABLE OF 7 TV CHANNELS | 012 | 021 | 022 | 023 | 041 | 042 |
| 12/11 (MONDAY) | 011 | | | | | | |
| 4 PM | 00 NEWS AND WEATHER FORECAST | | 00 ITAI ITAI BA! | | | 00 POMEGRANATE STRIPED MASTERPIECE SELECTIONS (4) (RETURN) | |
| | 05 PRO-FASHIONABLE (WITH SUBTITLES) | 30 SPECIAL SERIES MANSION-PURCHASING WHITE PAPER | 20 BUTU BUTU ANIMATION 'CHIICHAN AND OJIISAN' | 20 MOTHER AND A VERY BIG BOTTLE | | | |
| | 45 SONGS FOR ALL | | 45 | | | 53 ZZZ NEWS REALLY (?) TIME | |
| 5 PM | 00 NEWS AND WEATHER FORECAST | | 50:55 | 15 LET US PLAY IN CANADA | | Fr10(L) | |
| | 10 SUPPER NETWORK | | 05 | | | Fr11(S) | |
| | 30 SUPPER NETWORK | | 30 QUARTET (WITH SUBTITLES) | | | Fr12(S) | |
| 6 PM | 00 NEWS     Fr13(L) | | 40 | 00 MIRACLE 1: MIMIZU | 00 STATION ENCORE: NHK JAPANESE-CHESS TOURNAMENT (31th NHK JAPANESE-CHESS TOURNAMENT) | 00 KICK OFF SOON? | |
| | 10 NORTH-POLE SPHERE NETWORK | | 45:50 | 10 ANIMATION NINTAMARAN TARO (WITH SUBTITLES) | | | |
| | 52 WEATHER FORECAST | | | 20 GENIUS TV EAST MAX | | | |
| | | | | 55 SONGS FOR ALL | | 10 FAFA CLUB WORLD CUP JAPAN PRESENTED BY TOTOTA 2006 | |
| 7 PM | 00 BILINGUAL MHK NEWS 7 (WITH SUBTITLES) | | | 00 MIDDLE-AGED FATHER'S DIARY: RUNAWAY FROM HOME [LATER PART] (WITH ANALYSIS AND SUBTITLES) | 00 STATION ENCORE: NHK JAPANESE-CHESS TOURNAMENT | | |
| | 30 PRESENT CLOSET UP | | | 30 PREDICT ME: RECENT YEARS (WITH SUBTITLES) | | | |
| | | | | 55 CHUCKLING EVERYDAY | | | |
| | NEWS/REPORTS | | ANIMATION/SPECIAL PHOTOGRAPHING | | SPORTS | | THEATRE |

| (BLUE) PREVIOUS DAY | (RED) SUCCEEDING DAY | (GREEN) STATION SELECTION | (YELLOW) ENLARGEMENT/CONTRACTION | ENTER | PROGRAM EXPLANATION | OPTION | FUNCTION DISPLAY | RETURN | END |
|---|---|---|---|---|---|---|---|---|---|
| Bi1 W1 | Bi2 W2 | Bi3 W3 | Bi4 W4 | Bi5 W5 | | Bi6 W6 | | Bi7 W7 | |

FIG. 10

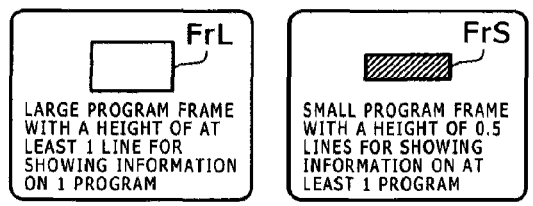

FIG. 11A

FIRST BASIC PATTERN a

EACH PROGRAM IS ASSIGNED TO A LARGE PROGRAM FRAME FrL WITH A HEIGHT OF AT LEAST 1 LINE

FIG. 11B

SECOND BASIC PATTERN b

2 PROGRAMS ARE EACH ASSIGNED TO A LARGE PROGRAM FRAME FrL WITH A HEIGHT OF 1 LINE AND A SMALL PROGRAM FRAME FrS WITH A HEIGHT OF 0.5 LINES TO GIVE A TOTAL HEIGHT OF 1.5 LINES

FIG. 11C

THIRD BASIC PATTERN c

3 OR MORE PROGRAMS ARE EACH ASSIGNED TO 1 LARGE PROGRAM FRAME FrL WITH A HEIGHT OF 1 LINE AND 2 SMALL PROGRAM FRAMES FrS EACH HAVING A HEIGHT OF 0.5 LINES

FIG. 11D

FOURTH BASIC PATTERN d

4 OR MORE PROGRAMS ARE EACH ASSIGNED TO 1 LARGE PROGRAM FRAME FrL WITH A HEIGHT OF 1 LINE AND 3 SMALL PROGRAM FRAMES FrS EACH HAVING A HEIGHT OF 0.5 LINES TO GIVE A TOTAL HEIGHT OF 2.5 LINES

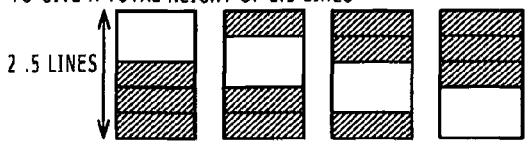

FIG.12

|  |  | LINE COUNT | PROGRAM COUNT | PROGRAM-FRAME ELEMENTS |
|---|---|---|---|---|
| BASIC PATTERNS | a | $\geq 1$ | 1 | 1 LARGE PROGRAM FRAME |
|  | b | 1.5 | 2 | 1 LARGE PROGRAM FRAME + 1 SMALL PROGRAM FRAME |
|  | c | 2 | $\geq 3$ | 1 LARGE PROGRAM FRAME + 2 SMALL PROGRAM FRAMES |
|  | d | 2.5 | $\geq 4$ | 1 LARGE PROGRAM FRAME + 3 SMALL PROGRAM FRAMES |

FIG.13

|  |  | PROGRAM COUNT | | | | |
|---|---|---|---|---|---|---|
|  |  | 1 | 2 | 3 | 4 | 5 |
| LINE COUNT | 2 | a | a+a | c | c | c |
|  | 2.5 | a | a+a | a+b | d | d |
|  | 3 | a | a+a | a+a+a | a+c | a+c |
|  | 3.5 | a | a+a | a+a+a | a+c | b+c |

FIRST BASIC PATTERN v

SECOND BASIC PATTERN w

THIRD BASIC PATTERN x

FOURTH BASIC PATTERN y

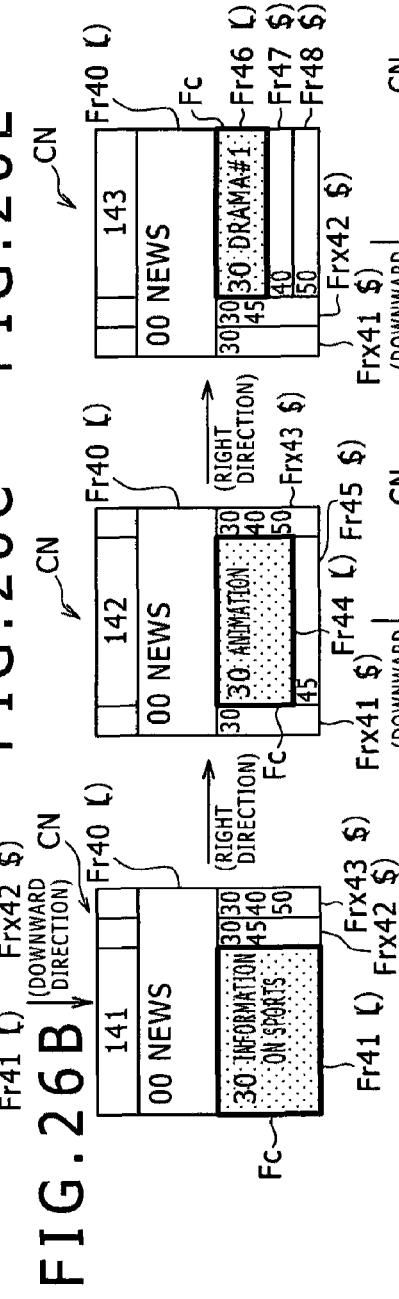

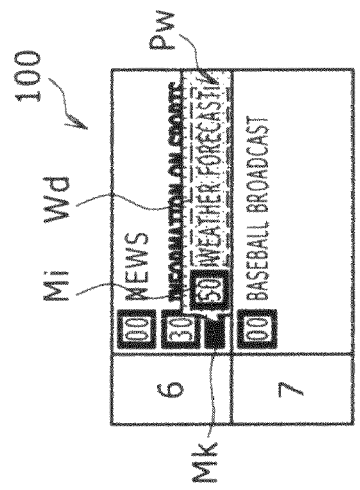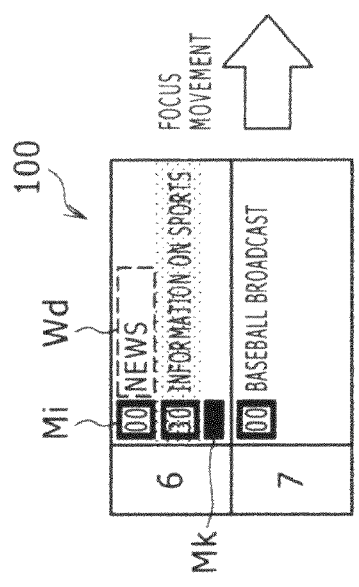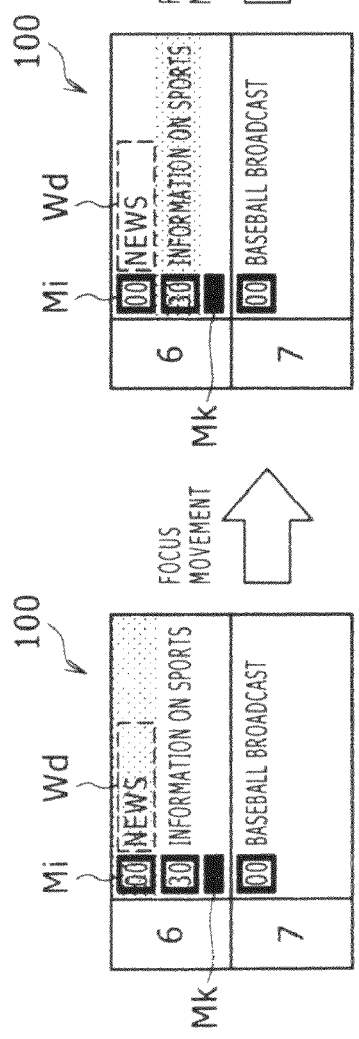

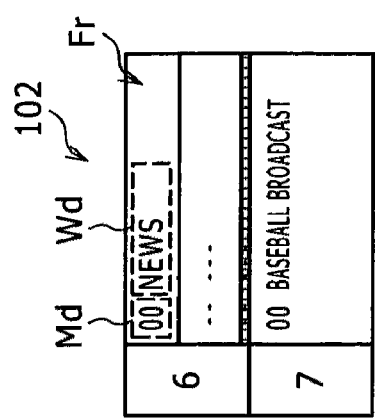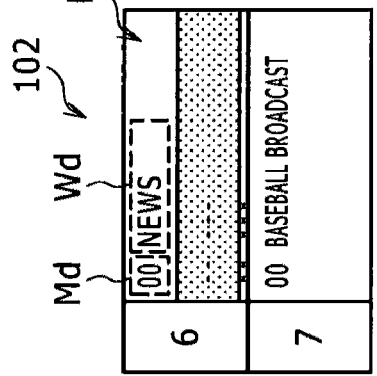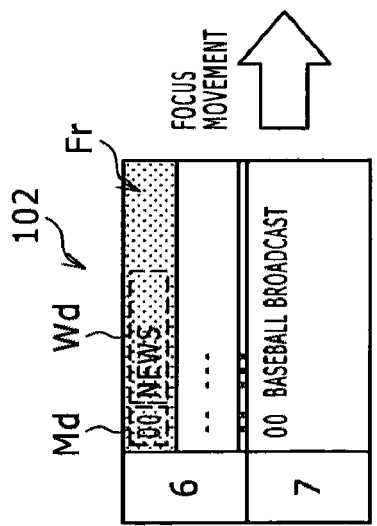

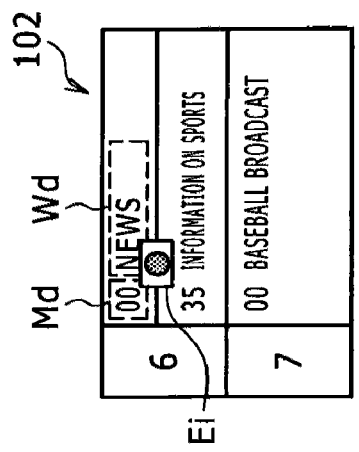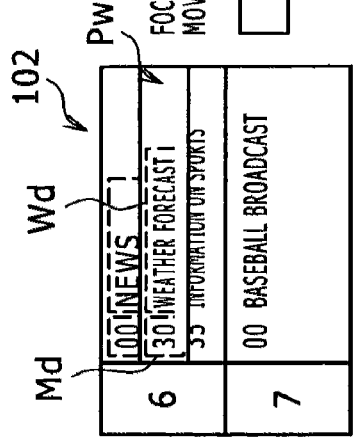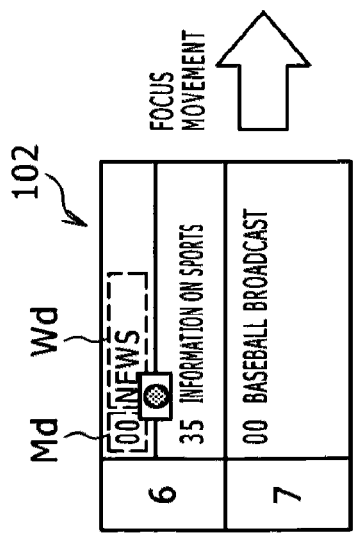

SCHEDULE-TABLE PRESENTING APPARATUS AND SCHEDULE-TABLE PRESENTING METHOD

CROSS-REFERENCE TO RELATED APPLICATIONS

The present application claims priority from Japanese Patent Application No. JP 2007-022267 filed in the Japanese Patent Office on Jan. 31, 2007, the entire content of which is incorporated herein by reference.

BACKGROUND OF THE INVENTION

1. Field of the Invention

The present invention relates to a schedule-table presenting apparatus and a schedule-table presenting method to be adopted by the schedule-table presenting apparatus. For example, the present invention can be well applied to a program-table presenting apparatus for generating a program table as a schedule table showing programs and showing the program table to the user.

2. Description of the Related Art

In recent years, a wide range of TV receiver sets and program recording apparatus each employ a program-table presenting apparatus of the type described above. Such a program-table presenting apparatus acquires an EPG (Electronic Program Guide) showing a schedule of broadcasting of programs, generating an electronic program table as a schedule table of broadcasting of programs on the basis of the EPG and showing the electronic program table to the user.

For example, a TV receiver set displays an electronic program table generated on the basis of an EPG on a program display screen in order to let the user recognize a schedule of broadcasting of programs and select a desired program from the electronic program table. In this way, the user is capable of switching the program display screen from one program to another and making a reservation of a program to be watched on the basis of the electronic program table.

In addition, a program recording apparatus displays an electronic program table generated on the basis of an EPG on an external display unit in order to let the user recognize a schedule of broadcasting of programs and select a desired program from the electronic program table. In this way, the user is capable of switching the external display unit from one program to another and making a reservation of a program to be watched on the basis of the electronic program table.

As described above, the existing TV receiver set and the existing program recording apparatus show an electronic program table generated on the basis of an EPG to the user in order to make the user capable of switching the program display screen or external display unit from one program to another and making a reservation of a program to be watched on the basis of the electronic program table without referring to TV columns of a newspaper.

By the way, the ground digital broadcasting and the network broadcasting contribute to an ongoing transition to multi-channel broadcasting. As a result, the number of programs provided to users or the number of programs to be included in an electronic program table has been increasing. For this reason, in the past, there was proposed a method for presenting an electronic program table as a method capable of displaying information on a large number of programs in a limited display area such as one screen.

In accordance with a first program-table presenting method for example, information on programs each to be broadcasted for at least a predetermined time range is displayed in an electronic program table 100 as shown in FIGS. 28A to 28C. The predetermined time range is typically several minutes. In the following description, such programs are each also referred to as an ordinary program. The displayed information on an ordinary program includes a minute display icon Mi showing the start of the broadcasting of the program in terms of minutes indicating an offset relative to the start of a time slot of one hour in the electronic program table 100 and a descriptive text Wd of the program. Typically, the descriptive text Wd of a program is the title of the program. In the case of a program to be broadcasted for a time range shorter than the predetermined time range, that is, in the case of a program to be broadcasted for a time range shorter than several minutes, only a mark Mk is displayed for the program in the electronic program table 100 as a mark indicating the existence of the program. In the following description, such a program is also referred to as a short-time program. For more information on the electronic program table 100, the reader is suggested to refer to Patent Document 1, which is Japanese Patent Laid-Open No. 2006-50011.

By the way, the size of a mark Mk displayed for a short-time program represents the duration of the program. In the following description, the duration of a program is also referred to as a program length.

When an observation focus to be described later is moved to a mark Mk of a short-time program, a pop-up window Pw is displayed, being superposed on the electronic program table 100 as shown in FIG. 28C. As shown in this figure, the pop-up window Pw for a short-time program shows the minute display icon Mi and the descriptive text Wd, which are provided for the program. As described above, the minute display icon Mi of a program shows the start of the program in terms of minutes indicating an offset relative to the start of a time slot of one hour in the electronic program table 100 whereas the descriptive text Wd of a program is character-written information on the program. In this way, in accordance with the first program-table presenting method, with the observation focus moved to a mark Mk of a short-time program, a pop-up window Pw for the program can show the user the minute display icon Mi and the descriptive text Wd, which are provided for the program.

In addition, in accordance with a second program-table presenting method, information on ordinary programs to be broadcasted for at least a predetermined time range is displayed in an electronic program table 101 as shown in FIGS. 29A to 29C. The predetermined time range is typically several minutes. The displayed information on an ordinary program includes a minute display icon Md showing the start of the program in terms of minutes indicating an offset relative to the start of a time slot of one hour in the electronic program table 101 and a descriptive text Wd of the program. In the case of a short-time program to be broadcasted for a time period shorter than the predetermined time range, that is, in the case of a short-time program to be broadcasted for a time range shorter than several minutes, only a bar Br is displayed for the program in the electronic program table 101 as a bar indicating the existence of the program. By the way, the bar Br indicates that one or more successive short-time programs exist.

When the observation focus is moved to a bar Br of a short-time program, a pop-up window Pw is displayed, being superposed on the electronic program table 101 as shown in FIG. 29D. As shown in this figure, the pop-up window Pw for a short-time program shows the minute display icon Md and the descriptive text Wd, which are provided for the program. As described above, the minute display icon Md of a program shows the start of the program in terms of minutes indicating an offset relative to the start of a time slot of one hour in the electronic program table 101 whereas the descriptive text Wd of a program is character-written information on the program. In this way, in accordance with the second program-table presenting method, with the observation focus moved to a bar Br of a short-time program, a pop-up window Pw for the program shows the user the minute display icon Md and the descriptive text Wd, which are provided for the program.

In addition, in accordance with a third program-table presenting method, information on programs is displayed in an electronic program table 102 as shown in FIGS. 30A to 30C. The electronic program table 102 includes frames Fr allocated to the programs. A large program frame Fr is allocated to a long program having a length of typically equal to at least 30 minutes whereas a small program frame Fr is allocated to a small program having a length of typically smaller than 30 minutes. A large program frame Fr allocated to a long program includes the broadcasting start time and descriptive text of the program. On the other hand, a small program frame Fr allocated to a small program does not include any information on the program.

When the observation focus is moved to a program frame Fr allocated to a program, the broadcasting start time Hm and descriptive text Wd of the program are displayed in a predetermined display area Da separated from the location of the program frame Fr as information on the program. In this way, in accordance with the third program-table presenting method, with the observation focus moved to the program frame Fr allocated to a program, the broadcasting start time Hm and descriptive text Wd of the program are displayed in a predetermined display area Da separated from the location of the program frame Fr as information on the program so that the information on the program can be shown to the user. This feature also applies as well to a small program frame Fr allocated to a small program having a length of typically smaller than 30 minutes.

In addition, in accordance with a fourth program-table presenting method, information on ordinary programs to be broadcasted for at least a predetermined time range is displayed in an electronic program table 103 as shown in FIGS. 31A to 31C. The predetermined time range is typically several minutes. The displayed information on an ordinary program includes a minute display icon Md showing the start of the program in terms of minutes indicating an offset relative to the start of a time slot of one hour in the electronic program table 103 and a descriptive text Wd of the program. In the case of a short-time program to be broadcasted for a time period shorter than the predetermined time range, that is, in the case of a short-time program to be broadcasted for a time period shorter than several minutes, only a short-time program icon Ei is displayed for the program in the electronic program table 103 as a bar indicating the existence of the program.

When the observation focus is moved to a short-time program icon Ei of a short-time program, a pop-up window Pw is displayed, being superposed on the electronic program table 103 as shown in FIG. 31B. As shown in this figure, the pop-up window Pw for a short-time program shows the minute display icon Md and the descriptive text wd, which are provided for the program. As described above, the minute display icon Md of a program shows the start of the program in terms of minutes indicating an offset relative to the start of a time slot of one hour in the electronic program table 103 whereas the descriptive text Wd of a program is character-written information on the program. In this way, in accordance with the fourth program-table presenting method, with the observation focus moved to a bar Br of a short-time program icon Ei, a pop-up window Pw for the program shows the user the minute display icon Md and the descriptive text Wd, which are provided for the program.

SUMMARY OF THE INVENTION

By the way, in accordance with the hitherto known methods each described above as a method for presenting an electronic program table, information on a large number of programs can be displayed in a limited display area but, on the other hand, information on specific programs such as short-time programs and small programs is displayed by expressing the information on specific programs in terms of icons, marks and the like. In consequence, the user is not capable of recognizing the existence of a specific program with ease unless the user moves the observation focus to such an icon, such a mark or the like.

In accordance with the first program-table presenting method for example, information on a short-time program is displayed as a mark Mk indicating the existence of the program. However, for example, a user seeing such a mark Mk for the first time is not capable of easily knowing the fact that the mark Mk indicates the existence of a short-time program. In addition, even if the user knows the fact that the mark Mk indicates the existence of a short-time program, the mark Mk by itself does not tell the user about the broadcasting start time of the program.

On top of that, in accordance with the second program-table presenting method, a bar Br is displayed in order to indicate that one or more successive short-time programs exist. However, a user seeing such a bar Br for the first time is not capable of easily knowing the fact that the bar Br indicates that one or more successive short-time programs exist. In addition, even if the user knows the fact that that one or more successive short-time programs exist, the bar Br by itself does not tell the user about the broadcasting start time of each of the programs.

On top of that, in accordance with the third program-table presenting method, a program frame Fr displaying no information on a program is allocated to a small program having a length typically smaller than 30 minutes. Thus, the user is not capable of knowing even the existence of a program with ease.

In addition, in accordance with the fourth program-table presenting method, information on a short-time program is displayed as a short-time program icon Ei indicating the existence of the program. However, for example, a user seeing such a short-time program icon Ei for the first time is not capable of easily knowing the fact that the short-time program icon Ei indicates the existence of a short-time program. In addition, even if the user knows the fact that the short-time program icon Ei indicates the existence of a short-time program, the short-time program icon Ei by itself does not tell the user about the broadcasting start time of the program.

As explained above, with the hitherto known methods each described before as a method for presenting an electronic program table, the user is not capable of recognizing the number of programs included in an observed display period and the broadcasting start time of each of the programs. In other words, it has been almost impossible to implement an electronic-program-table presenting method capable of displaying information on a large number of programs as well as allowing the user to easily recognize the number of programs included in an observed display period and the broadcasting start time of each of the programs. If such a method for presenting an electronic program table can be implemented, it is possible to show the user an electronic program table that can be viewed and understood by the user with ease.

Addressing the problems described above, inventors of the present invention propose a schedule-table presenting apparatus capable of presenting a schedule table very easy to view and very easy to understand in comparison with the existing one and a schedule-table presenting method to be adopted by the schedule-table presenting apparatus.

In accordance with the present invention, the problems described above are solved by executing the steps of:

acquiring a schedule including the broadcasting start time of each of events and a descriptive text describing each of the events;

assigning a specific one of the events to a first program frame having a size large enough for showing the broadcasting start time of the specific event as well as a descriptive text describing the specific event and assigning a plurality of events other than the specific event to a second program frame having a size smaller than that of the first program frame but large enough for showing the broadcasting start time of each of the other events on the basis of the acquired schedule in accordance with importance of each of the events;

generating a schedule table including the first program frame allocated to the specific event as a frame showing the broadcasting start time of the specific event as well as a descriptive text describing the specific event and the second program frame allocated to the other events as a frame showing the broadcasting start time of each of the other events; and displaying the generated schedule table on a display section determined in advance.

As described above, the first program frame included in the schedule table shows the broadcasting start time of the specific event and a descriptive text describing the specific event whereas the second program frame having a size smaller than that of the first program frame shows the broadcasting start time of each of the other events. Thus, it is possible to implement a schedule-table presenting method capable of presenting information on a large number of events in a limited display area as well as allowing the user to easily and certainly recognize the number of events included in an observed display period and the broadcasting start time of each of the events.

In addition, the present invention executes the steps of:

acquiring a schedule including the broadcasting start time of each of events and a descriptive text describing each of the events;

generating a schedule table showing at least the broadcasting start time of each of the events as information on each of the events on the basis of the acquired schedule; and displaying the generated schedule table on a display section determined in advance.

Thus, it is possible to display information on a large number of events in a limited display area a limited display area as well as allow the user to easily and certainly recognize the number of events included in an observed display period and the broadcasting start time of each of the events.

In accordance with the present invention, the problems described above are solved by executing the steps of:

acquiring a schedule including the broadcasting start time of each of events and a descriptive text describing each of the events;

assigning a specific one of the events to a first program frame having a size large enough for showing the broadcasting start time of the specific event as well as a descriptive text describing the specific event and assigning events other than the specific event to a second program frame having a size smaller than that of the first program but large enough for showing the broadcasting start time of each of the other events on the basis of the acquired schedule in accordance with importance of each of the events;

generating a schedule table including the first program frame allocated to the specific event as a frame showing the broadcasting start time of the specific event as well as a descriptive text describing the specific event and the second program frame allocated to the other events as a frame showing the broadcasting start time of each of the other events; and displaying the generated schedule table on a display section determined in advance.

Thus, it is possible to display information on a large number of events in a limited display area as well as allow the user to easily and certainly recognize the number of events included in an observed display period and the broadcasting start time of each of the events. Therefore, it is possible to realize a schedule-table presenting apparatus capable of displaying a schedule table very easy to view and very easy to understand in comparison with the existing one and a schedule-table presenting method to be adopted by the schedule-table presenting apparatus.

In addition, the present invention executes the steps of:

acquiring a schedule including the broadcasting start time of each of events and a descriptive text describing each of the events;

generating a schedule table showing at least the broadcasting start time of each of the events as information on each of the events on the basis of the acquired schedule; and displaying the generated schedule table on a display section determined in advance.

Thus, it is possible to display information on a large number of events in a limited display area as well as allow the user to easily and certainly recognize the number of events included in an observed display period and the broadcasting start time of each of the events. Therefore, it is possible to realize a schedule-table presenting apparatus capable of displaying a schedule table very easy to view and very easy to understand in comparison with the existing one and a schedule-table presenting method to be adopted by the schedule-table presenting apparatus.

BRIEF DESCRIPTION OF THE DRAWINGS

FIGS. 4A through 4I are explanatory diagrams showing typical processes to select programs by making use of a focus;

FIG. 5 is a rough diagram showing a first typical process to select a program by using the focus from programs shown on an electronic program table screen;

FIG. 6 is a rough diagram showing a second typical process to select a program by using the focus from programs shown on an electronic program table screen;

FIG. 7 is a rough diagram showing a third typical process to select a program by using the focus from programs shown on an electronic program table screen;

FIG. 8 is a rough diagram showing a fourth typical process to select a program by using the focus from programs shown on an electronic program table screen;

FIG. 9 is a rough diagram showing a fifth typical process to select a program by using the focus from programs shown on an electronic program table screen;

FIG. 10 is a diagram showing program-frame types;

FIGS. 11A through 11D are first diagrams showing basic patterns of program assignment;

FIG. 12 is a second diagram showing the basic patterns of program assignment in a table;

FIG. 13 is a table showing relations between program counts, line counts and program assignment patterns;

FIGS. 26A through 26F are diagrams each showing typical selection of a program in the further embodiment for displaying information for the channel numbers of channels sharing an event;

FIGS. 28A through 28C are explanatory diagrams to be referred to in description of a first known method for displaying an electronic program table;

FIGS. 30A through 30C are explanatory diagrams to be referred to in description of a third known method for displaying an electronic program table; and FIGS. 31A through 31C are explanatory diagrams to be referred to in description of a fourth known method for displaying an electronic program table.

DETAILED DESCRIPTION OF THE PREFERRED EMBODIMENTS

Preferred embodiments of the present invention are described by referring to diagrams as follows.

(1): Hardware Configuration of a Television-Broadcast Receiving Apparatus

Figure 1:
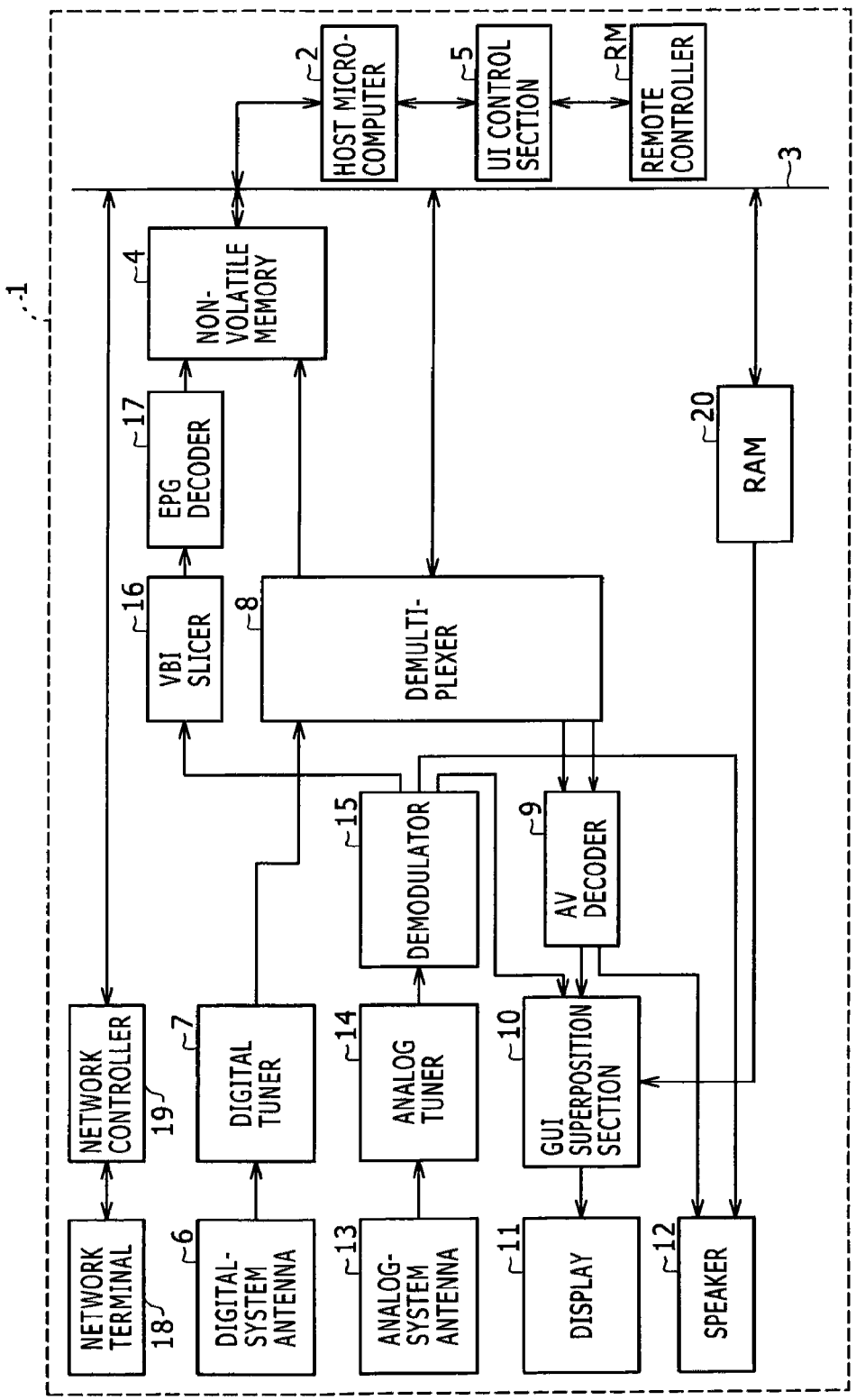
FIG. 1 is a block diagram showing the hardware configuration of a TV-broadcast receiving apparatus.

In the hardware configuration shown in FIG. 1, reference numeral 1 denotes a TV (television) broadcast receiving apparatus. The TV-broadcast receiving apparatus 1 has a function to receive TV broadcasts of digital and analog systems and reproduce the TV broadcasts as well as a function to acquire an EPG (Electronic Program Guide). A host microcomputer 2 is a section for carrying out various kinds of processing by execution of a variety of programs stored in advance in an embedded memory not shown in the figure or a nonvolatile memory 4 connected to the host microcomputer 2 through a bus 3. The host microcomputer 2 also receives an operation signal from a remote controller RM through a UI (User Interface) control section 5 as a command and controls operations of other sections employed in the TV-broadcast receiving apparatus 1 in accordance with the command. The operation signal is a signal representing an operation carried out by the user on the remote controller RM.

In actuality, the TV-broadcast receiving apparatus 1 is controlled by the host microcomputer 2 to receive digital broadcast signals to be supplied to a digital tuner 7 by way of a digital system antenna 6. On the basis of control executed by the host microcomputer 2, the digital tuner 7 extracts the broadcast signal of a desired channel from the digital broadcast signals. The desired channel is a channel specified by the user in an operation carried out by the user on the remote controller RM. The digital tuner 7 then carries out processing such as a demodulation process and a descramble process on the extracted broadcast signal in order to obtain broadcast channel data and supplies the data to a demultiplexer 8.

The demultiplexer 8 splits the broadcast channel data into video and audio data and supplying the video and audio data to an AV decoder 9. The AV decoder 9 decodes each of the video and audio data in order to obtain video and audio signals respectively and supplying the video signal to a display 11 by way of a GUI (Graphical User Interface) superposition section 10 while supplying the audio signal to a speaker 12. The GUI superposition section 10 superposes a graphic signal such as an OSD (On Screen Display) signal on the video signal received from the AV decoder 9.

As a result, the display 11 employed in the TV-broadcast receiving apparatus 1 shows a program picture conveyed by the digital broadcast signal of the desired channel whereas the speaker 12 outputs a program sound conveyed by the digital broadcast signal. In this way, the TV-broadcast receiving apparatus 1 receives a digital broadcast, reproducing the program picture and the program sound from the digital broadcast.

By the same token, the TV-broadcast receiving apparatus 1 is controlled by the host microcomputer 2 to receive analog broadcast signals to be supplied to an analog tuner 14 by way of an analog-system antenna 13. On the basis of control executed by the host microcomputer 2, the analog tuner 14 extracts the broadcast signal of a desired channel from the analog broadcast signals and supplies the broadcast signal to a demodulator 15. The demodulator 15 then carries out a demodulation process determined in advance on the extracted broadcast signal in order to obtain a demodulated signal. Then, the demodulator 15 splits the demodulated signal into video and audio signals, supplying the video signal to the display 11 by way of the GUI superposing section 10 while supplying the audio signal to the speaker 12. The GUI superposition section 10 superposes a graphic signal such as an OSD signal on the video signal received from the AV decoder 9.

As a result, the display 11 employed in the TV-broadcast receiving apparatus 1 shows a program picture conveyed by the analog broadcast signal of the desired channel whereas the speaker 12 outputs a program sound conveyed by the analog broadcast signal. In this way, the TV-broadcast receiving apparatus 1 receives an analog broadcast, reproducing the program picture and the program sound from the analog broadcast.

In addition, controlled by the host microcomputer 2, the demultiplexer 8 employed in the TV-broadcast receiving apparatus 1 splits EPG information of digital broadcasts from the broadcast channel data and stores the EPG information in the nonvolatile memory 4. By the way, if EPG information is presented for each channel, the host microcomputer 2 controls the demultiplexer 8 to extract the EPG information from each broadcast channel data of a plurality of channels, from which digital broadcasts can be received. The demultiplexer 8 then stores the extracted EPG information in the nonvolatile memory 4.

In addition, in accordance with control executed by the host microcomputer 2, the demodulator 15 employed in the TV-broadcast receiving apparatus 1 outputs the demodulated signal obtained as a result of the demodulation process to a VBI (Vertical Blanking Interval) slicer 16. The VBI slicer 16 cuts out a specific line of the demodulated signal and supplies the line to an EPG decoder 17. The EPG decoder 17 decodes the specific line of the demodulated signal in order to obtain the EPG information of the analog broadcast. The EPG decoder 17 then stores the EPG information in the nonvolatile memory 4.

In addition, controlled by the host microcomputer 2, a network controller 19 employed in the TV-broadcast receiving apparatus 1 receives an EPG information of an analog broadcast from an EPG information distribution server not shown in the figure through a network terminal 18. The network controller 19 stores the EPG information in the nonvolatile memory 4 by way of the bus 3.

In this way, the TV-broadcast receiving apparatus 1 receives EPG information. By the way, EPG information typically includes information on programs scheduled for broadcasting. The information on programs scheduled for broadcasting includes the name of a broadcasting station, the number of a channel, a broadcasting date/time including broadcasting start and end times, a program title, a genre, a program overview, program details and performers for each of the programs.

In the TV-broadcast receiving apparatus 1, the host microcomputer 2 generates data of an electronic program table on the basis of EPG information stored in the nonvolatile memory 4 and stores the data temporarily in a RAM 20 through the bus 3. Later on, the GUI superposition section 10 reads out the data of an electronic program table from the RAM 20 and generates a screen signal on the basis of the data. Then, the GUI superposition section 10 outputs the screen signal to the display 11.

Figure 2:
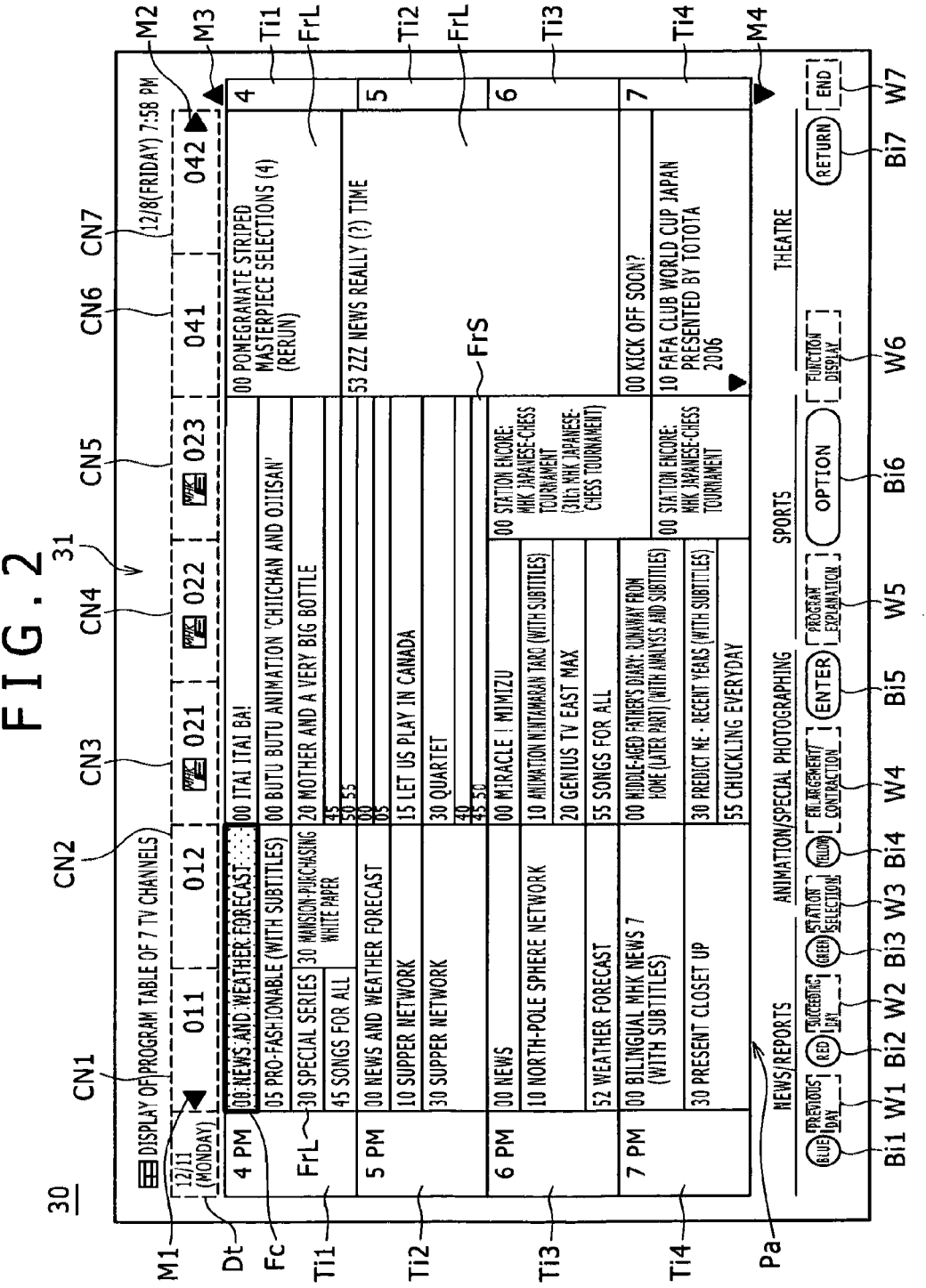
FIG. 2 is a rough diagram showing the configuration of an electronic program table screen.

As a result, the display 11 employed in the TV-broadcast receiving apparatus 1 shows an electronic program table screen 30 like one shown in FIG. 2. The configuration or the electronic program table screen 30 is explained in detail as follows.

(2): Configuration of the Electronic Program Table Screen

The electronic program table screen 30 displays an electronic program table 31 located at the center of the screen 30 as a table with a size occupying almost the entire area of the screen 30. The bottom row of the electronic program table 31 shows words W1 to W7 to be operated through operation of buttons Bi of the remote controller RM to display explanations of a variety of operations that can be carried out on the electronic program table 31. The operations include selection of a preceding day or a following day as a schedule viewing day, selection of a station, enlargement or contraction of a display, explanation of a program, displaying of a function and termination of the display of the electronic program table 31. In the figure, the words W1 to W7 are displayed at locations close to respectively button icons Bi1 to Bi7, which correspond to the buttons Bi of the remote controller RM.

The electronic program table 31 is a table with its horizontal and vertical axes representing channels and broadcasting times respectively. The broadcasting times represented by the vertical axis starts from the present time and ends at an end time lagging behind the present time by several days. The user is allowed to select any arbitrary time period between the present time and the end time as a time period having a length of typically several hours in order to display a selected table showing information on programs scheduled for broadcasting during the selected time period through a plurality of channels. The electronic program table 31 shown in FIG. 2 is a typical selected table showing information on programs scheduled for broadcasting during a selected time period having a typical length of four hours through typically seven channels. The electronic program table 31 shown in FIG. 2 as such a typical selected table is explained as follows.

The numbers of the seven channels are shown on the top row of the electronic program table 31 shown in the figure in single-channel-number frames CN1 to CN7 respectively. In this typical table, the numbers of the seven channels each serving as an object of observation are respectively 011, 012, 021, 022, 023, 041 and 042, which are shown in the single-channel-number frames CN. The leftmost and rightmost columns of the table show a time period selected as an observation object having a length of four hours. In the typical table, the selected time period having four time frames Ti each serving as a time unit (or a time slot) of one hour starts at 4:00 PM and ends at 8:00 PM. That is to say, the selected time period has time frames Ti1 to Ti4 laid out in the vertical direction. The upper-left corner of the table is a date frame Dt showing a date serving as an object of observation. The date is displayed in terms of months, days and a day of the week. The rest of the screen is a program-information display area Pa displaying information on programs for each of the channels. By the way, each of the time frames Ti shows characters such as 4 PM on the left-most column or 4 on the right-most column as the start of the time frame Ti.

The left-most channel number frame CN1, which is a particular channel number frame CN of the channel number frames CN1 to CN7, shows a triangular mark M1 oriented in the left direction if a channel number smaller than the channel number displayed in the left-most channel number frame CN1 exists in the acquired EPG information. The triangular mark M1 oriented in the left direction is displayed in order to indicate that a channel number smaller than the channel number displayed in the left-most channel number frame CN1 exists in the acquired EPG. By the same token, the right-most channel number frame CN7, which is a particular channel number frame CN of the channel number frames CN1 to CN7, shows a triangular mark M2 oriented in the right direction if a channel number greater than the channel number displayed in the right-most channel number frame CN7 exists in the acquired EPG information. The triangular mark M2 oriented in the right direction is displayed in order to indicate that a channel number greater than the channel number displayed in the right-most channel number frame CN7 exists in the acquired EPG information.

In the same way, the upper-most time frame Ti1, which is a particular time frame Ti of the time frames Ti1 to Ti4, shows a triangular mark M3 oriented in the upward direction if a time leading ahead of the time displayed in the upper-most time frame Ti1 exists in the acquired EPG information. The triangular mark M3 oriented in the upward direction is displayed in order to indicate that a time leading ahead of the time displayed in the upper-most time frame Ti1 exists in the acquired EPG information. Likewise, the lower-most time frame Ti4, which is a particular time frame Ti of the time frames Ti1 to Ti4, shows a triangular mark M4 oriented in the downward direction if a time lagging behind the time displayed in the lower-most time frame Ti4 exists in the acquired EPG. The triangular mark M4 oriented in the downward direction is displayed in order to indicate that a time lagging behind the time displayed in the lower-most time frame Ti4 exists in the acquired EPG information.

The remote controller RM has direction keys having the same orientations as the triangular marks M (M1 to M4) respectively. If any one of the direction keys provided on the remote controller RM is operated, the channels serving as an object of observation or the times serving as an object of observation are changed in accordance with a triangular mark M corresponding to the operated direction key.

The program-information display area Pa shows a plurality of program frames Fr allocated to a program or a plurality of programs consecutively broadcasted through a channel. Each of the program frames Fr is located at a position corresponding to a channel for broadcasting a plurality of programs or a program, which are assigned to the program frame Fr, and corresponding to a time range during which the program will be broadcasted. The vertical and horizontal coordinates of the position of a program frame Fr correspond to the channel and the time respectively. Each of the program frames Fr shows information on a plurality of programs or a program, which are assigned to the program frame Fr.

Figure 3:
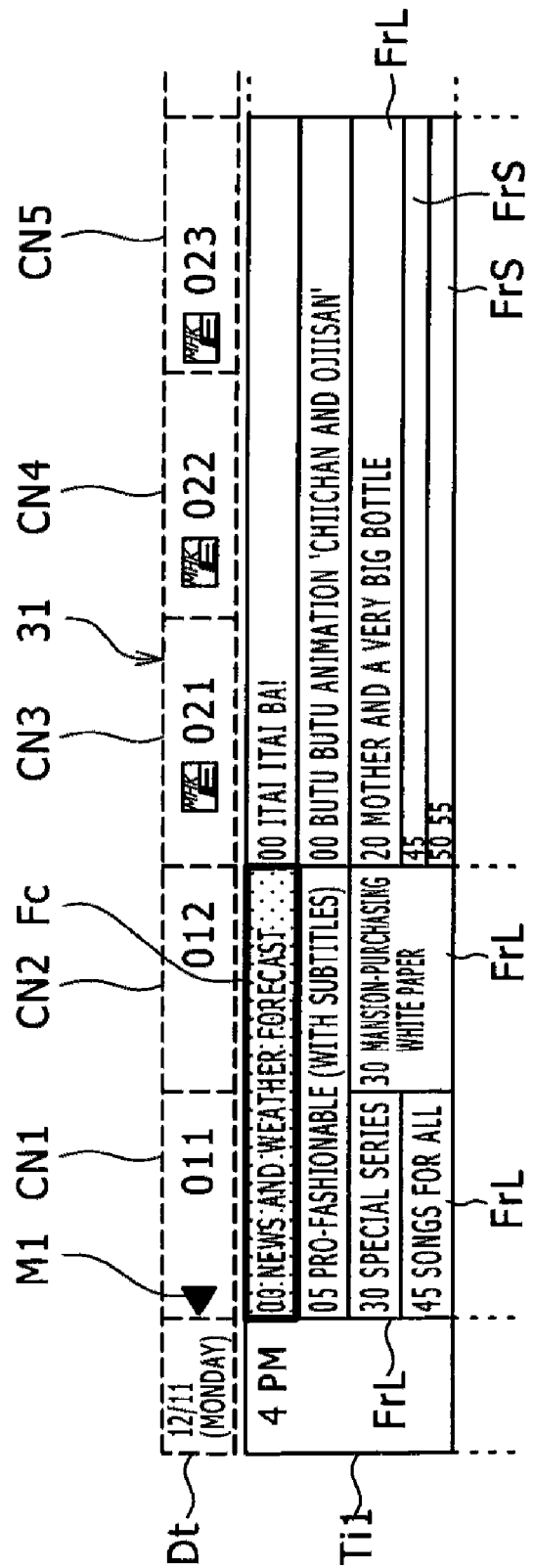
FIG. 3 is a rough diagram showing a portion of the electronic program table screen.

As shown in FIG. 3 in addition to FIG. 2, program frames Fr are classified into two large categories in accordance with the heights of the program frames Fr. One of the categories represents large frames FrL each having a height large enough for displaying at least one line of information on a program in terms of characters including Kanji characters, Hiragana characters, Katakana characters, alphabetical characters and numbers. To put it concretely, the information shown in a large program frame FrL as information on a program is a time expressed in terms of minutes as the broadcasting start time of the program and the title of the program. The other category represents small frames FrS each having a height smaller than the height of a large program frame FrL large enough for displaying one or more numerals arranged in parallel each having a smaller size than the size of a character used for expressing information on a program in a large program frame FrL. To put it concretely, the numerals shown in a small program frame FrS as information on a program is a time expressed in terms of minutes as the broadcasting start time of the program. Typically, one line of information on a program or programs in a small program frame FrS has a height equal to 0.5 times the height of a line of information on a program in a large program frame FrL. It is to be noted that, unless otherwise specified in particular, one line of a large program frame FrL is taken as a unit line in the following description.

A large program frame FrL is allocated to one program and pieces of information on the program are described in the program frame FrL sequentially. Pieces of information described in a program frame FrL as information on a program start with the broadcasting start time of the program on the left-upper corner of the large program frame FrL to be followed by a descriptive text representing the title of the program. The broadcasting start time of a program is expressed in terms of minutes such as 00 shown in the figure. Examples of the title of a program are news and a weather forecast on the left-hand side of the figure. On the other hand, a small program frame FrS is allocated to one program or a plurality of programs. If a small program frame FrS is allocated to one program, the broadcasting start time of the program is described at the left end of the program frame FrS in terms of minutes such as 45 shown on the right-hand side of the figure. If a small program frame FrS is allocated to a plurality of programs, on the other hand, the broadcasting start times of the programs are described successively, starting from the left end of the program frame FrS in the horizontal direction in terms of minutes such as 50 and 55 shown on the right-hand side of the bottom of the figure. The series of the broadcasting start times begins with the earliest one.

That is to say, a large program frame FrL can be used for showing more detailed information on a program than a small program frame FrS by a detail difference corresponding to the difference in height between the large program frame FrL and the small program frame FrS. Since the height of a small program frame FrS is smaller than that of a large program frame FrL, however, the display area occupied by a small program frame FrS is smaller than that occupied by a large program frame FrL. In addition, since a small program frame FrS shows only broadcasting start times as program information, a small program frame FrS can be allocated to a plurality of programs.

By the way, in the electronic program table 31 according to this embodiment, the height of a time frame Ti is set at a value allowing information on programs each assigned to a large program frame FrL included in the time frame Ti to be displayed on up to four lines each allocated to one of the programs. As described above, information on a program is a time expressed in terms of minutes as the broadcasting start time of the program and the title of the program. Let us assume for example a time frame Ti1 starting at 4:00 PM as shown in the figure. In this case, the time frame Ti1 can include up to four large frames FrL allocated to a channel number of 011 for example as large frames FrL each showing a line of information on a program. As described above, information on a program is a time expressed in terms of minutes as the broadcasting start time of the program and title of the program.

In other words, if the number of programs to be broadcasted during the time frame Ti of one hour for each channel is equal to or smaller than 4, the electronic program table 31 is capable of showing information on all the programs, that is, capable of showing the broadcasting start time of each of the programs and a title given to the program, in only large frames FrL as shown on the left-hand side for the channel numbers of 011 and 012 as shown in the figure. If the number of programs to be broadcasted during the time frame Ti of one hour for any particular channel is equal to or greater than 5, on the other hand, the electronic program table 31 must show information on the programs of the particular channels, that is, the broadcasting start time of each of the programs and a title given to the program, also in small frames FrS besides large frames FrL as shown on the right-hand side for the channel numbers of 021, 022 and 023 as shown in the figure.

On the left-hand side of the figure showing a portion of the electronic program table 31, for example, a large program frame FrL in the time range 4:30 PM to 4:45 PM or the time range 4:45 PM to 5:00 PM has a width basically set at a value equal to the width of a single-channel-number frame CN for a channel number of 011. The width of this large program frame FrL is typically large enough for showing a plurality of characters. As another example, a broadcasting station broadcasts a program through a plurality of channels with channel numbers of 011 and 012 in the time range 4:00 PM to 4:05 PM. The operation carried out by a broadcasting station to broadcast a program through a plurality of different channels is also referred to as event sharing. In the case of event sharing, a large program frame FrL has a width set at a value equal to the width of a multi-channel-number frame CN obtained as a result of concatenating channel-number frames CN provided for a plurality of channels sharing the same event to each other. The multi-channel-number frame CN will be described later in detail. That is to say, a plurality of programs broadcasted through a plurality of channels sharing the same event are handled in the electronic program table 31 as a single program corresponding to the shared event assigned to the multi-channel-number frame CN. The single program is assigned to a large program frame FrL having a width equal to the weight of a multi-channel-number frame CN obtained as a result of concatenating channel-number frames CN provided for a plurality of channels sharing the same event to each other. In the above description, large frames FrL are each taken as an example. However, the above description also holds true of small program frames FrS.

The date frame Dt of the electronic program table 31 shows the broadcasting date of each program in the table in terms of months, days and a day of the week. The vertical-direction positions of a time frame Ti, a large program frame FrL and a small program frame FrS represent the start time of the time frame Ti, the broadcasting start time of a program included in the large program frame FrL and the broadcasting start time of an earliest program included in the small program frame FrS respectively. Since the start time of a time frame Ti is expressed in terms of hours, the broadcasting start times assigned to a large program frame FrL and a small program frame FrS, which are included in the time frame Ti, can each be expressed in terms of minutes only. Nevertheless, as a whole, the electronic program table 31 is capable of accurately showing the user the broadcasting start time of each program in terms of hours and minutes on a day expressed by a date displayed in the date frame Dt. In addition, since the broadcasting end time of a specific program can be recognized by looking at the broadcasting start time of a program immediately following the specific program, the electronic program table 31 does not show the broadcasting end time of any program in particular.

By displaying such an electronic program table 31 on the electronic program table screen 30 as described above, the TV-broadcast receiving apparatus 1 allows the user to easily recognize at least the total number of programs broadcasted through a plurality of channels each serving as an object of observation in a time period serving as an object of observation and the broadcasting start time of each of the programs. In the case of the embodiment, the number of channels is seven and the time period has a length of four hours.

In addition, as shown in FIG. 2, the bottom row of the electronic program table screen 30 appearing on the TV-broadcast receiving apparatus 1 displays words W (that is, words W1 to W7) explaining a variety of operations that can be carried out on the electronic program table 31. The operations include selection of preceding day or following day as a schedule observation day, selection of a broadcasting station, enlargement or contraction of a display, explanation of a program, displaying a function and termination of the display of the electronic program table. In the figure, the words W1 to W7 are displayed at locations close to respectively button icons B1 to B7, which are the buttons Bi provided on the remote controller RM. Thus, the user can read explanations of the buttons Bi provided on the remote controller RM with ease as explanations of operations that can be carried out on the electronic program table 31 without referring to a user guide manual or an operation explaining screen which needs to be displayed separately from the electronic program table screen 30.

In addition, any one of the programs displayed on the electronic program table screen 30 to be broadcasted during the time period of four hours through the seven channels can be selected by superposing a focus Fc on a program frame Fr of the electronic program table 31. By the way, the host microcomputer 2 employed in the TV-broadcast receiving apparatus 1 is capable of moving the focus Fc in accordance with an operation carried out on a direction key (not shown) provided on the remote controller RM. The following description explains an operation carried out to move the focus Fc in order to select a program.

(3): Focus Used to Select a Program

Let us assume that a plurality of programs are to be broadcasted during a predetermined time frame of one hour through channels determined in advance and the user wants to select each of the programs.

For example, the time frame of one hour during which seven programs a to g are to be broadcasted through the channels is a time slot from 00 minutes to 60 minutes as shown in FIG. 4A. The seven programs a to g to be broadcasted during the time frame through the channels are described as follows:

The first program a is a program with a broadcasting start time of 00 minutes and a title of A. The second program b is a program with a broadcasting start time of 03 minutes and a title of B. The third program c is a program with a broadcasting start time of 10 minutes and a title of C. The fourth program d is a program with a broadcasting start time of 30 minutes and a title of D. The fifth program e is a program with a broadcasting start time of 40 minutes and a title of E. The sixth program f is a program with a broadcasting start time of 50 minutes and a title of F. The seventh program g is a program with a broadcasting start time of 53 minutes and a title of G. The seven programs a to g are included in an EPG information.

In this case, as shown in FIG. 4B, the host microcomputer 2 employed in the TV-broadcast receiving apparatus 1 accommodates the seven programs a to g in a time frame Ti of four lines by properly allocating six frames Fr1 to Fr6 to the seven programs a to g. A frame having a subscript (S) is a small program frame FrS having a height of 0.5 lines. An example of a frame having a subscript (S) is a program frame Fr1 (S). On the other hand, a frame having a subscript (L) is a large program frame FrL having a height at least equal to one line. An example of a frame having a subscript (L) is a program frame Fr3 (L).

To put it concretely, as an example, the host microcomputer 2 allocates the program frame Fr1 (S) at the top of the time frame having a height of 0.5 lines to the program a, the program frame Fr2 (S) at the next frame having a height of 0.5 lines to the program b, the program frame Fr3 (L) at the next frame having a height of one line to the program c, the program frame Fr4 (L) at the next frame having a height of one line to the program d, the program frame Fr5 (S) at the next frame having a height of 0.5 lines to the program e and the program frame Fr6 (S) at the bottom of the time frame having a height of 0.5 lines to the programs f and g.

As a result, the small program frame Fr1 (S) at the top of the time frame shows only the broadcasting start time of 00 minutes for the program a. By the same token, the small program frame Fr2 (S) serving as the second program frame from the top of the time frame shows only the broadcasting start time of 03 minutes for the program b. The large program frame Fr3 (L) serving as the third frame from the top of the time frame is large enough for showing the broadcasting start time of 10 minutes for the program c and the program title of C given to the program c. By the same token, the large program frame Fr4 (L) serving as the fourth frame from the top of the time frame is large enough for showing the broadcasting start time of 30 minutes for the program d and the program title of D given to the program d. The small program frame Fr5 (S) serving as the fifth frame from the top of the time frame shows only the broadcasting start time of 40 minutes for the program e. The small program frame Fr6 (S) as the sixth frame from the top of the time frame shows the broadcasting start times of 50 and 53 minutes for the programs f and g respectively.

The host microcomputer 2 takes the state shown in FIG. 4B as an initial state in which the focus Fc has not been positioned at any of the program frames. Later on, when the remote controller RM is operated to position the focus Fc at the small program frame Fr1 (S) at the top of the time frame for example, the program frame Fr1 (S) is changed to a program frame Fr1 (L) having a height of one line as shown in FIG. 4C. That is to say, the small program frame Fr1 (S) is changed to a large program frame Fr1 (L). In consequence, the program frame Fr2 (S) right below the program frame Fr1 (S) must be shifted downward by 0.5 lines corresponding to the difference in height between the program frame Fr1 (S) and the program frame Fr1 (L) whereas the height of the large program frame Fr3 (L) serving as the third frame from the top of the time frame must be reduced to 0.5 lines due to the positioning of the focus Fc at the small program frame Fr1 (S) at the top of the time frame and the conversion of the small program frame Fr1 (S) into the large program frame Fr1 (L) having a height of one line. That is to say, the large program frame Fr3 (L) is changed to a program frame Fr3 (S) having a height of 0.5 lines or, in other words, the large program frame Fr3 (L) is changed to a small program frame Fr3 (S).

As a result of an operation to position the focus Fc at the small program frame Fr1 (S) at the top of the time frame, the new large program frame Fr1 (L) at the top of the time frame becomes large enough for showing the broadcasting start time of 00 minutes for the program a and the program title of A given to the program a. The small program frame Fr2 (S) serving as the second program frame from the top of the time frame shows only the broadcasting start time of 03 minutes for the program b. The new small program frame Fr3 (S) serving as the third frame from the top of the time frame shows only the broadcasting start time of 10 minutes for the program c. The state shown in FIG. 4C is a result of the operation carried out to position the focus Fc at the small program frame Fr1 (S) at the top of the time frame in order to select the program a assigned to the newly created program frame Fr1 (L).

When the host microcomputer 2 recognizes an operation carried out by the user to press a downward-direction key of the remote controller RM in order to move the focus Fc from the program frame Fr1 (L) to the program frame Fr2 (S) in the state shown in FIG. 4C for example, a transition is made so as to be in a state shown in FIG. 4D. In the transition, the program frame Fr2 (S) is changed to a program frame Fr2 (L) having a height of one line. That is to say, the small program frame Fr2 (S) is changed to a large program frame Fr2 (L). In consequence, the height of the large program frame Fr1 (L) must be reduced to 0.5 lines due to the positioning of the focus Fc at the small program frame Fr2 (S) and the conversion of the small program frame Fr2 (S) into the large program frame Fr2 (L) having a height of one line. That is to say, the large program frame Fr1 (L) is changed to a program frame Fr1 (S) having a height of 0.5 lines or, in other words, the large program frame Fr1 (L) is changed to a small program frame Fr1 (S). Thus, the focus Fc is now located at the newly created large program frame Fr2 (L).

As a result of an operation to position the focus Fc at the small program frame Fr2 (S), the new small program frame Fr1 (S) shows only the broadcasting start time of 00 minutes for the program a. However, the new large program frame Fr2 (L) is large enough for showing the broadcasting start time of 03 minutes for the program b and the program title of B given to the program b. The state shown in FIG. 4D is a result of the operation carried out to move the focus Fc from the program frame Fr1 (L) to the program frame Fr2 (S) in the state shown in FIG. 4C in order to select the program b assigned to the newly created program frame Fr2 (L).

When the host microcomputer 2 recognizes an operation carried out by the user to press the downward-direction key of the remote controller RM in order to move the focus Fc from the program frame Fr2 (L) to the program frame Fr3 (S) in the state shown in FIG. 4D for example, a transition is made so as to be in a state shown in FIG. 4E. In this transition, the program frame Fr2 (L) is changed to a program frame Fr2 (S). That is to say, the large program frame Fr2 (L) is changed to a small program frame Fr2 (S). In consequence, the program frame Fr3 (S) is changed to a program frame Fr3 (L) having a height of one line. That is to say, the small program frame Fr3 (S) is changed to a large program frame Fr3 (L). Thus, the focus Fc is now located at the newly created large program frame Fr3 (L).

As a result of an operation to position the focus Fc at the small program frame Fr3 (S), the small program frame Fr2 (S) now shows only the broadcasting start time of 03 minutes for the program b. However, the new large program frame Fr3 (L) becomes large enough for showing the broadcasting start time of 10 minutes for the program c and the program title of C given to the program c. The state shown in FIG. 4E is a result of the operation carried out to move the focus Fc from the program frame Fr2 (L) to the program frame Fr3 (S) in the state shown in FIG. 4D in order to select the program c assigned to the newly created program frame Fr3 (L).

When the host microcomputer 2 recognizes an operation carried out by the user to press the downward-direction key of the remote controller RM in order to move the focus Fc from the program frame Fr3 (L) to the program frame Fr4 (L) in the state shown in FIG. 4E for example, a transition is made so as to be in a state shown in FIG. 4F. Thus, the focus Fc is now located at the large program frame Fr4 (L).

As a result of an operation to position the focus Fc at the program frame Fr4 (L), the large program frame Fr4 (L) is now showing the broadcasting start time of 30 minutes for the program d and the program title of D given to the program d. The state shown in FIG. 4F is a result of the operation carried out to move the focus Fc from the program frame Fr3 (L) to the program frame Fr4 (L) in the state shown in FIG. 4E in order to select the program d assigned to the program frame Fr4 (L).

When the host microcomputer 2 recognizes an operation carried out by the user to press the downward-direction key of the remote controller RM in order to move the focus Fc from the program frame Fr4 (L) to the program frame Fr5 (S) in the state shown in FIG. 4F for example, the time frame Ti makes a transition to a state shown in FIG. 4G. In this transition, the program frame Fr5 (S) is changed to a program frame Fr5 (L) having a height of one line. That is to say, the small program frame Fr5 (S) is changed to a large program frame Fr5 (L). In consequence, the height of the large program frame Fr4 (L) must be reduced to 0.5 lines due to the positioning of the focus Fc at the small program frame Fr5 (S) and the conversion of the small program frame Fr5 (S) into the large program frame Fr5 (L) having a height of one line. That is to say, the large program frame Fr4 (L) is changed to a program frame Fr4 (S) having a height of 0.5 lines or, in other words, the large program frame Fr4 (L) is changed to a small program frame Fr4 (S). Thus, the focus Fc is now located at the newly created large program frame Fr5 (L).

As a result of an operation to position the focus Fc at the small program frame Fr5 (S), the small program frame Fr4 (S) now shows only the broadcasting start time of 30 minutes for the program d. However, the new large program frame Fr5 (L) is large enough for showing the broadcasting start time of 40 minutes for the program e and the program title E of the program e. The state shown in FIG. 4G is a result of the operation carried out to move the focus Fc from the program frame Fr4 (L) to the program frame Fr5 (S) in the state shown in FIG. 4F in order to select the program e assigned to the newly created program frame Fr5 (L).

When the host microcomputer 2 recognizes an operation carried out by the user to press the downward-direction key of the remote controller RM in order to move the focus Fc from the program frame Fr5 (L) to the program frame Fr6 (S) in the state shown in FIG. 4G for example, the time frame Ti makes a transition to a state shown in FIG. 4H. In this transition, the position of the focus Fc and the sizes of the program frames Fr1 to Fr6 remain the same as they are. However, the program e assigned so far to the program frame Fr5 (L) is reassigned to the program frame Fr4 (S) located right above the program frame Fr5 (L) as a program frame shared by the program d. In addition, the program f assigned so far to the program frame Fr6 (S) right below the program frame Fr5 (L) as a program having the earliest broadcasting start time among the programs f and g is reassigned to the program frame Fr5 (L) located right above the program frame Fr6 (S). Thus, the focus Fc is now located at the newly created large program frame Fr5 (L).

As a result, the program frame Fr4 (S) shows the broadcasting start times of 30 and 40 for both the programs d and e respectively at successive positions starting at the left end by separating the times from each other by a distance determined in advance. The program frame Fr5 (L) indicated by the focus Fc at a position right below the program frame Fr4 (S) shows the broadcasting start time of 50 for the program f and the title of F given to the program f. The program frame Fr6 (S) right below the program frame Fr5 (L) shows only the broadcasting start time of 53 for the program g. The state shown in FIG. 4H is a result of the operation carried out to move the focus Fc from the program frame Fr5 (L) to the program frame Fr6 (S) in the state shown in FIG. 4G in order to select the program f assigned to the newly created program frame Fr5 (L).

When the host microcomputer 2 recognizes an operation carried out by the user to press the downward-direction key of the remote controller RM in order to move the focus Fc from the program frame Fr5 (L) to the program frame Fr6 (S) in the state shown in FIG. 4H for example, the time frame Ti makes a transition to a state shown in FIG. 4I. In this transition, the height of the program frame Fr5 (L) is reduced to the height of a program frame Fr5 (S). That is to say, the large program frame Fr5 (L) is changed to a small program Fr5 (S). In addition, the height of the program frame Fr6 (S) is increased to the height of the program frame Fr6 (L). That is to say, the small program frame Fr6 (S) is changed the large program Fr6 (L). Thus, the focus Fc is now located at the newly created large program frame Fr6 (L).

As a result, the program frame Fr6 (L) indicated by the focus Fc at a position right below the program frame Fr5 (S) shows the broadcasting start time of 53 for the program g and the title of G given to the program g. The program frame Fr5 (S) right above the program frame Fr6 (L) shows only the broadcasting start time of 50 for the program f. The program frames Fr1 to Fr4 remain the same as they are. The state shown in FIG. 4I is a result of the operation carried out to move the focus Fc from the program frame Fr5 (L) to the program frame Fr6 (S) in the state shown in FIG. 4H in order to select the program g assigned to the newly created program frame Fr6 (L).

As described above, the host microcomputer 2 moves the focus Fc in accordance with an operation carried out by the user on a direction key provided on the remote controller RM in order to indicate any program selected by the user from the seven programs a to g.

As described so far, the TV-broadcast receiving apparatus 1 moves the focus Fc to the location of any program frame Fr in accordance with an operation carried out by the user on a direction key provided on the remote controller RM in order to indicate a program assigned to the program frame Fr as a program selected by the user from the seven programs a to g.

In addition, the TV-broadcast receiving apparatus 1 is capable of changing the assignment of programs to program frames Fr in accordance with an operation carried out by the user on a direction key provided on the remote controller RM. Let us assume for example that a plurality of particular programs have been assigned to a program frame Fr such as the program frame Fr6 as is the case with the state shown in FIG. 4G and the user moves the focus Fc to the program frame Fr6. In this case, the TV-broadcast receiving apparatus 1 changes the assignment of specific programs to at least three adjacent program frames Fr including the program frame Fr6 by reassigning the earliest program among the particular programs to a particular one of the adjacent program frames Fr and the remaining ones of the specific programs to at least two remaining ones of the adjacent program frames Fr. That is to say, even if a plurality of programs have been assigned to a program frame, the TV-broadcast receiving apparatus 1 allows the user to select any individual one of the programs as a desired program.

Since a program selected by making use of the focus Fc can be regarded as a program desired by the user, the TV-broadcast receiving apparatus 1 displays information on the selected program in a large program frame FrL, which has a height of at least one line. By displaying the information on a program selected by making use of the focus Fc in such a large program frame FrL, the TV-broadcast receiving apparatus 1 allows the user to easily recognize the information in more detail.

By referring to FIGS. 5 to 9, the following description briefly explains a case in which the user selects any program individually one after another from those displayed on the electronic program table screen 30 shown in FIG. 2 by making use of the focus Fc. First of all, the focus Fc is placed at a program Fr10 (L) allocated to a program having a broadcasting start time of 30 minutes and a title of Quartet as shown in FIG. 5. The program is an event shared by channel numbers of 021, 022 and 023. The program is to be broadcasted during the time range 5:30 PM to 5:40 PM in a time frame Ti2 starting at 5:00 PM. That is to say, the program assigned to the program frame Fr10 (L) as a program having a broadcasting start time of 30 minutes and a title of "Quartet" is in a state of being selected by making use of the focus Fc.

When the host microcomputer 2 recognizes an operation carried out by the user to press the downward-direction key of the remote controller RM in order to move the focus Fc from the program frame Fr10 (L) to a program frame Fr11 (S) in the state shown in FIG. 5 for example, the time frame Ti2 makes a transition to a state shown in FIG. 6. In this transition, the height of the program frame Fr10 (L) is reduced to the height of a program frame Fr10 (S). That is to say, the large program frame Fr10 (L) is changed to a small program Fr10 (S). In addition, the height of the program frame Fr11 (S) is increased to the height of the program frame Fr11 (L). That is to say, the small program frame Fr11 (S) is changed to the large program Fr11 (L). Thus, the focus Fc is now located at the newly created large program frame Fr11 (L).

As a result, the program frame Fr10 (S) displays only the broadcasting start time of a program assigned to the program frame Fr10 as a program having a broadcasting start time of 30 minutes and a title of "Quartet." On the other hand, the program frame Fr11 (L) located right below the program frame Fr10 (S) as a program frame indicated by the focus Fc shows a broadcasting start time of 40 minutes and a title of "Animation Zenzai The Murai Response Zeni" for a program assigned to the program frame Fr11 (L). Thus, the program assigned to the program frame Fr11 as a program having a broadcasting start time of 40 minutes and a title of "Animation Zenzai The Murai Response Zeni" is put in a state of being selected by making use of the focus Fc.

When the host microcomputer 2 recognizes an operation carried out by the user to press the downward-direction key of the remote controller RM in order to move the focus Fc from the program frame Fr11 (L) to a program frame Fr12 (S) in the state shown in FIG. 6 for example, the time frame Ti2 makes a transition to a state shown in FIG. 7. In this transition, the position of the focus Fc and the sizes of the program frames Fr10 and Fr11 remain the same. However, the program assigned to the program frame Fr11 (L) as a program having a broadcasting start time of 40 minutes and a title of "Animation Zenzai the Murai Response Zeni" is reassigned to a frame program Fr10 (S) right above the FR11 (L). A program assigned so far to the program frame Fr12 (S) right below the program frame Fr11 (L) in the time frame Ti2 as a program having the earliest broadcasting start time among programs assigned so far to the program frame Fr12 (S) is reassigned to the program frame Fr11 (L) located right above the program frame Fr12 (S). The program having the earliest broadcasting start time among two programs assigned so far to the program frame Fr12 (S) as programs with broadcasting start times of 45 and 50 minutes respectively has a broadcasting start time of 45 minutes.

As a result, the program frame Fr10 (S) shows the broadcasting start times of 30 and 40 for two programs respectively at successive positions starting at the left end by separating the times from each other by a distance determined in advance. The program frame Fr11 (L) indicated by the focus Fc at a position right below the program frame Fr10 (S) shows the broadcasting start time of 45 for the program assigned to the program frame Fr11 (L) and a title of "Menarauswitch Mini" given to the program. The program frame Fr12 (S) right below the program frame Fr11 (L) shows only the broadcasting start time of 50 for a program assigned to the program frame Fr12 (S). The state shown in FIG. 7 is a result of the operation carried out to move the focus Fc from the program frame Fr11 (L) to the program frame Fr12 (S) in the state shown in FIG. 6 in order to select a program newly assigned to the program frame Fr11 (L) as a program having broadcasting start time of 45 and a title of "Menarauswitch Mini."

When the host microcomputer 2 recognizes an operation carried out by the user to press the downward-direction key of the remote controller RM in order to move the focus Fc from the program frame Fr11 (L) to a program frame Fr12 (S) in the state shown in FIG. 7 for example, the time frame Ti2 makes a transition to a state shown in FIG. 8. In this transition, the program frame Fr 11 (L) is changed to a program frame F11 (S). That is to say, the large program frame Fr11 (L) is changed to a small program frame Fr11 (S). At the same time, the program frame Fr 12 (S) is changed to a program frame F12 (L). That is to say, the small program frame Fr12 (S) is changed to a large program frame Fr12 (L).

As a result, the program frame Fr11 (S) right above the program frame Fr12 (L) shows only the broadcasting start time of 45 for a program assigned to the program frame Fr11 (S). The program frame Fr12 (L) indicated by the focus Fc at a position right below the program frame Fr11 (S) shows the broadcasting start time of 50 for the program assigned to the program frame Fr12 and a title of "Animation Ojaja Maru" given to the program. The state shown in FIG. 8 is a result of the operation carried out to move the focus Fc from the program frame Fr11 (L) to the program frame Fr12 (S) in the state shown in FIG. 7 in order to select a program assigned to the program frame Fr12 as a program having broadcasting start time of 45 and a title of "Animation Ojaja Maru."

When the host microcomputer 2 recognizes an operation carried out by the user to press the downward-direction key of the remote controller RM in order to move the focus Fc from the program frame Fr12 (L) at the bottom of the time frame Ti2 to a program frame Fr13 (S) at the top of a time frame Ti3 right below the time frame Ti2 in the state shown in FIG. 8 for example, the time frames Ti2 and Ti3 make a transition to a state shown in FIG. 9. In this transition, the states of the program frames Fr10 to Fr12 in the time frame Ti2 are restored to their original states shown in FIG. 5. In addition, a program assigned to the program frame Fr13 (L) as a program having a broadcasting start time of 00 minutes and a title of "Miracle Mimizu" is put in a state of being selected by making use of the focus Fc.

As described above, the host microcomputer 2 allows the user to select any program individually one after another from those displayed on the electronic program table screen 30 shown in FIG. 2 by making use of the focus Fc. Then, the host microcomputer 2 carries out various kinds of processing on the selected program as follows. When the host microcomputer 2 recognizes an operation carried out by the user to press an Enter button provided on the remote controller RM but shown in none of the figures with any program put in a state of being selected by making us of the focus Fc for example, information on the program is displayed on the electronic program table screen 30. The displayed information on the program includes an overview and detailed explanation of the program. In addition, when the host microcomputer 2 recognizes an operation carried out by the user to press a station selection button provided on the remote controller RM but shown in none of the figures with a currently broadcasted program put in a state of being selected by making use of the focus Fc for example, the electronic program table screen 30 is replaced with the video of the program. On top of that, when the host microcomputer 2 recognizes an operation carried out by the user to press a reservation button provided on the remote controller RM but shown in none of the figures with a program put in a state of being selected by making use of the focus Fc from programs to be broadcasted for example, a watching reservation screen is displayed on the electronic program table screen 30. Provided with a mechanism allowing the user to select any program individually one after another from those displayed on the electronic program table screen 30 shown in FIG. 2 by making use of the focus Fc, the TV-broadcast receiving apparatus 1 is capable of carrying out various kinds of processing on the individually selected program.

(4): Algorithm for Generating an Electronic Program Table

Next, an algorithm for generating an electronic program table 31 is explained in detail. In a process to generate an electronic program table 31, each program to be displayed is assigned to a program frame Fr, which can be a large program frame FrL or a small program frame FrS. Each program is shown at a location in the program frame Fr. As described before, each program is broadcasted through a channel or a plurality of channels during a time range included in a 1-hour time slot (or a time frame) in the 4-hour time period of the electronic program table 31. By the way, the TV-broadcast receiving apparatus 1 according to the embodiment basically carries out the process to generate an electronic program table 31 in one-channel/one-time-frame units. That is to say, the TV-broadcast receiving apparatus 1 divides the process to generate an electronic program table 31 into processing units each carried out for every channel in each time frame Ti, which has a length of one hour. In other words, each of the processing units corresponds to a channel in a time frame Ti or a time frame Ti for the channel. Thus, the algorithm for generating an electronic program table 31 is executed for each one-channel/one-time-frame unit.

First of all, the types of program frames Fr composing the electronic program table 31 are described once more. The algorithm for generating an electronic program table 31 provides two types of program frames Fr composing the electronic program table 31, i.e., the large program frame FrL and the small program frame FrS as shown in FIG. 10. The large program frame FrL is a program frame Fr, which has a height of at least one line and is allocated to one program. On the other hand, the small program frame FrS is a program frame Fr, which has a height of 0.5 lines and is allocated to at least one program.

The line used as a unit for expressing the height of a program frame Fr is a font size that can be recognized by the user with ease. That is to say, the line used as a unit for expressing the height of a program frame Fr shows program information described by making use of Kanji, Hiragana, Katakana, alphabetical and numeric characters. To put it concretely, the information on a program includes the broadcasting start time of the program and a title assigned to the program. That is to say, one or more lines of a large program frame FrL allocated to a program can be used for showing program information describing the broadcasting start time of the program and a title given to the program in terms of Kanji, Hiragana, Katakana, alphabetical and numeric characters.

Since the small program frame FrS has a height of only 0.5 lines, on the other hand, unlike the large program FrL, the small program frame FrS may not be used for showing program information describing the broadcasting start time of a program and a title given to the program in terms of Kanji, Hiragana, Katakana, alphabetical and numeric characters. However, a small program FrS can be used for showing program information described in terms of numeric characters having a small font size that can still be sufficiently recognized by the user. To put it concretely, the program information shown in a small program frame FrS is broadcasting start times of at least one program.

The following description explains patterns of assignment of programs to large program frames FrL and small program frames FrS in detail. In the following description, a pattern of assignment of programs to large program frames FrL and small program frames FrS is referred to as a program assignment pattern. A program assignment pattern adopted in the algorithm for generating an electronic program table 31 is any combination of four basic patterns a to d shown in FIGS. 11A to 11D and 12. Thus, the algorithm for generating an electronic program table 31 creates a program assignment pattern by combining any of the four basic patterns a to d shown in FIGS. 11A to 11D and 12.

As shown in FIGS. 11A and 12, in accordance with the first basic pattern a, a program is assigned to a large program frame FrL having a height of at least one line. That is to say, in accordance with the first basic pattern a, information on a program is shown in one or more lines. To put it concretely, in accordance with the first basic pattern a, a program is assigned to a large program frame FrL having a height of one line, 1.5 lines, two lines or 2.5 lines.

As shown in FIGS. 11B and 12, in accordance with the second basic pattern b, two programs are assigned to a large program frame FrL having a height of one line and a small program frame FrS having a height of 0.5 lines. That is to say, in accordance with the second basic pattern b, information on two programs is displayed on 1.5 lines. To put it concretely, as a result of an operation to select a program by making use of a focus Fc as described earlier, the large program frame FrL having a height of one line for showing information on the selected program is placed right above the small program frame FrS having a height of 0.5 lines or the large program frame FrL having a height of one line is placed right beneath the small program frame FrS having a height of 0.5 lines.

As shown in FIGS. 11C and 12, in accordance with the third basic pattern c, at least three programs are assigned to a large program frame FrL having a height of one line and two small program frames FrS each having a height of 0.5 lines. That is to say, in accordance with the third basic pattern c, information on at least three programs is displayed on two lines. To put it concretely, as a result of an operation to select a program by making use of a focus Fc as described earlier, the large program frame FrL having a height of one line for showing information on the selected program is placed right above the two small program frames FrS each having a height of 0.5 lines, the large program frame FrL having a height of one line is placed between the two small program frames FrS each having a height of 0.5 lines or the large program frame FrL having a height of one line is placed right beneath the two small program frames FrS each having a height of 0.5 lines.

As shown in FIGS. 11D and 12, in accordance with the fourth basic pattern d, at least four programs are assigned to a large program frame FrL having a height of one line and three small program frames FrS each having a height of 0.5 lines. That is to say, in accordance with the third basic pattern d, information on at least four programs is displayed on 2.5 lines. To put it concretely, as a result of an operation to select a program by making use of a focus Fc as described earlier, the large program frame FrL having a height of one line for showing information on the selected program is placed right above the three small program frames FrS each having a height of 0.5 lines, the large program frame FrL having a height of one line is placed right below one small program having a height of 0.5 lines and right above two small program frames FrS each having a height of 0.5 lines, the large program frame FrL having a height of one line is placed right above one small program having a height of 0.5 lines and right below two small program frames FrS each having a height of 0.5 lines or the large program frame FrL having a height of one line is placed right beneath the three small program frames FrS each having a height of 0.5 lines.

As is obvious from the description given earlier, a program assignment pattern mentioned above is a pattern obtained as a result of combining the four basic patterns a to d. By the way, it is clear from the third basic pattern c shown in the table of FIG. 12 that, if the display area has a height of at least two lines, a large program frame FrL having a height of one line and two small program frames FrS each having a height of 0.5 lines can be used for displaying information on any number of programs in the display area. In addition, any one of the programs can be assigned to the large program frame FrL whereas the remaining programs can be assigned to the two small program frames FrS. Thus, any one of the programs can be selected individually and information on the selected program is shown in the large program frame FrL.

For every one-channel/one-time-frame unit mentioned above, that is, for a 1-hour time slot (or a time frame Ti) being processed for each channel, the algorithm for generating an electronic program table 31 selects a program assignment pattern on the basis of the number of programs to be broadcasted through the channel during the 1-hour time slot being processed and the number of lines to be allocated to the programs as shown in a table of FIG. 13. The time slot being processed has a length of one hour in the case of this embodiment. Typically, four lines are allocated to one time slot. In actuality, the table of FIG. 13 is used for determining a program assignment pattern for programs each pertaining to the third category. That is to say, the table of FIG. 13 is used for determining how remaining lines are to be allocated to programs each pertaining to the third category.

The third row of the table shown in FIG. 13 shows different program assignment patterns for a line count of two and a variety of program counts. To be more specific, if the number of programs to be broadcasted during the 1-hour time slot being processed is one and the number of lines allocated to the program is two, the algorithm for generating an electronic program table 31 selects the first basic pattern a as the program assignment pattern. If the number of programs to be broadcasted during the one-hour time slot being processed is two and the number of lines allocated to the programs is two, the algorithm for generating an electronic program table 31 selects a combination (a+a) of two aforementioned first basic patterns a as the program assignment pattern. If the number of programs to be broadcasted during the one-hour time slot being processed is three, four or five and the number of lines allocated to the program is two, the algorithm for generating an electronic program table 31 selects the third basic pattern c as the program assignment pattern.

Further, if the number of programs to be broadcasted during the one-hour time slot being processed is one and the number of lines allocated to the program is 2.5, the algorithm for generating an electronic program table 31 selects the first basic pattern a as the program assignment pattern. If the number of programs to be broadcasted during the one-hour time slot being processed is two and the number of lines allocated to the programs is 2.5, the algorithm for generating an electronic program table 31 selects a combination (a+a) of two aforementioned first basic patterns a as the program assignment pattern. If the number of programs to be broadcasted during the one-hour time slot being processed is three and the number of lines allocated to the programs is 2.5, the algorithm for generating an electronic program table 31 selects a combination (a+b) of the first basic pattern a and the second basic pattern b as the program assignment pattern. If the number of programs to be broadcasted during the one-hour time slot being processed is four or five and the number of lines allocated to the programs is 2.5, the algorithm for generating an electronic program table 31 selects the fourth basic pattern d as the program assignment pattern.

Further, if the number of programs to be broadcasted during the one-hour time slot being processed is one and the number of lines allocated to the program is three, the algorithm for generating an electronic program table 31 selects the first basic pattern a as the program assignment pattern. If the number of programs to be broadcasted during the one-hour time slot being processed is two and the number of lines allocated to the programs is three, the algorithm for generating an electronic program table 31 selects a combination (a+a) of two aforementioned first basic patterns a as the program assignment pattern. If the number of programs to be broadcasted during the one-hour time slot being processed is three and the number of lines allocated to the programs is three, the algorithm for generating an electronic program table 31 selects a combination (a+a+a) of three aforementioned first basic patterns a as the program assignment pattern. If the number of programs to be broadcasted during the one-hour time slot being processed is four or five and the number of lines allocated to the programs is three, the algorithm for generating an electronic program table 31 selects a combination (a+c) of the first basic pattern a and the third basic pattern c as the program assignment pattern.

If the number of programs to be broadcasted during the one-hour time slot being processed is one and the number of lines allocated to the program is 3.5, the algorithm for generating an electronic program table 31 selects the first basic pattern a as the program assignment pattern. If the number of programs to be broadcasted during the one-hour time slot being processed is two and the number of lines allocated to the programs is 3.5, the algorithm for generating an electronic program table 31 selects a combination (a+a) of two aforementioned first basic patterns a as the program assignment pattern. If the number of programs to be broadcasted during the one-hour time slot being processed is three and the number of lines allocated to the programs is 3.5, the algorithm for generating an electronic program table 31 selects a combination (a+a+a) of three aforementioned first basic patterns a as the program assignment pattern. If the number of programs to be broadcasted during the one-hour time slot being processed is four and the number of lines allocated to the programs is 3.5, the algorithm for generating an electronic program table 31 selects a combination (a+c) of the first basic pattern a and the third basic pattern c as the program assignment pattern. If the number of programs to be broadcasted during the one-hour time slot being processed is five and the number of lines allocated to the programs is 3.5, the algorithm for generating an electronic program table 31 selects a combination (b+c) of the second basic pattern b and the third basic pattern c as the program assignment pattern.

The algorithm for generating an electronic program table 31 selects a program assignment pattern as described above. By the way, even if the number of programs to be broadcasted during the one-hour time slot being processed is at least six and the number of lines allocated to the programs is at least four, the algorithm for generating an electronic program table 31 is capable of selecting a program assignment pattern in the same concept as the concept adopted by the method to select a program assignment pattern as described above.

As is obvious from the method to select a program assignment pattern as shown in the table of FIG. 13, as many first basic patterns a each including a large program frame FrL as possible are selected. In addition, as is obvious from the diagrams of FIG. 11, each of the second basic pattern b, the third basic pattern c and the fourth basic pattern d always includes a large program frame FrL. That is to say, in accordance with the algorithm for generating an electronic program table 31, as many programs as possible are assigned to large program frames FrL in so far the number of lines allocated to the programs allows. In this way, as many program titles as possible can be displayed in the one-channel/one-time-frame unit.

Figure 14A:
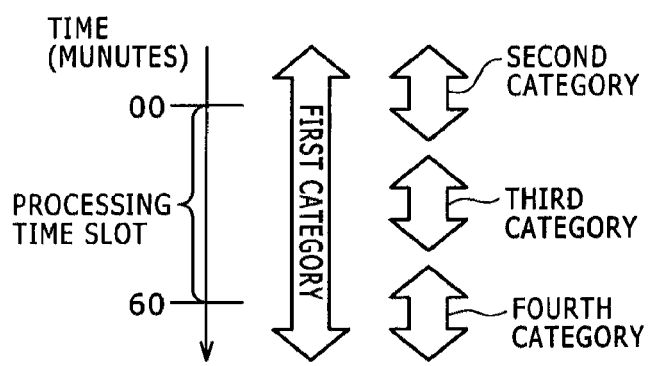
FIGS. 14A and 14B are diagrams showing program categories and allocation of lines in a time reference to programs according to program categories.

In addition, in accordance with the algorithm for generating an electronic program table 31, programs are classified into four categories, i.e, the first to fourth categories, on the basis of the broadcasting times of the programs as described later below by referring to FIG. 14A. To put it concretely, even if only a portion of the broadcasting duration of a program broadcasted through the channel of the one-channel/one-time-frame unit is included the one-hour time slot of the unit, the program is regarded as a program pertaining to one of the four categories. To be more specific, if the broadcasting start time of a program leads ahead of the start of the one-hour time slot being processed and the broadcasting end time of the program lags behind the end of the one-hour time slot being processed, the program is regarded as a program pertaining to the first category. If the broadcasting start time of a program leads ahead of the start of the one-hour time slot being processed and the broadcasting end time of the program is within the one-hour time slot being processed, the program is regarded as a program pertaining to the second category. If the broadcasting start time of and broadcasting end time of a program are both within the one-hour time slot being processed, the program is regarded as a program pertaining to the third category. If the broadcasting start time of a program is within the one-hour time slot being processed and the broadcasting end time of the program lags behind the end of the one-hour time slot being processed, the program is regarded as a program pertaining to the fourth category.

A channel is used for broadcasting only one program pertaining to the first category in the one-hour time slot along with no programs pertaining to the other categories. As an alternative, a channel is used for broadcasting only one program pertaining to the second category in the one-hour time slot probably along with and only one program pertaining to the forth category and programs pertaining to the third category. As another alternative, a channel is used for broadcasting only one program pertaining to the fourth category in the one-hour time slot probably along with only one program pertaining to the second category and programs pertaining to the third category. However, a channel can be used for broadcasting a plurality of programs pertaining to the fourth categories in the one-hour time slot.

For the reasons described above, in accordance with the algorithm for generating an electronic program table 31, if a program broadcasted through a channel as a program pertaining to the first category exists in the one-hour time slot of the one-channel/one-time-frame unit, the lines of a display area allocated to the unit are all allocated to the program. The display area allocated to the one-channel/one-time-frame unit is a display area of a time frame Ti including the one-channel/one-time-frame unit. If a program broadcasted through a channel as a program pertaining to the second category exists in the one-hour time slot of the one-channel/one-time-frame unit, a program frame Fr in the display area including at least 0.5 lines starting from the top of the time frame Ti is allocated to the program. If a program broadcasted through a channel as a program pertaining to the fourth category exists in the one-hour time slot of the one-channel/one-time-frame unit, a program frame Fr in the display area including at least 0.5 lines ending at the bottom of the time frame Ti is allocated to the program. If programs each broadcasted through a channel as a program pertaining to the third category exist in the one-hour time slot of the one-channel/one-time-frame unit, the remaining lines of the display area allocated to the unit are allocated to the programs.

Figure 14B:
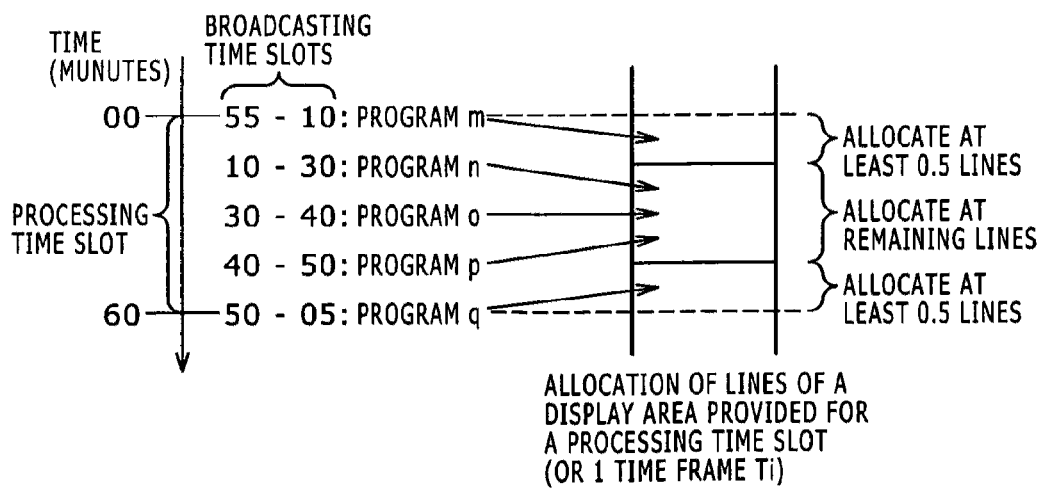

Typical allocation of lines to programs is shown in FIG. 14B. The figure shows five programs included in an EPG as programs m, n, o, p and q, which each have at least a portion of its broadcasting duration included the one-hour time slot being processed. To be more specific, the program m has a broadcasting start time of 55 minutes in the immediately preceding one-hour time slot and a broadcasting start time of 10 minutes in the one-hour time slot being processed.

The program n has a broadcasting start time of 10 minutes in the one-hour time slot being processed and a broadcasting end time of 30 minutes in the one-hour time slot being processed. Similarly, the program o has a broadcasting start time of 30 minutes in the one-hour time slot being processed and a broadcasting end time of 40 minutes in the one-hour time slot being processed. Likewise, the program p has a broadcasting start time of 40 minutes in the one-hour time slot being processed and a broadcasting end time of 50 minutes in the one-hour time slot being processed.

On the other hand, the program q has a broadcasting start time of 50 minutes in the one-hour time slot being processed and a broadcasting end time of 05 minutes in the immediately succeeding one-hour time slot.

Thus, in accordance with the algorithm for generating an electronic program table 31, since the program m is regarded as a program pertaining to the second category, a program frame Fr in a display area including at least 0.5 lines starting from the top of the time frame Ti is allocated to the program m as shown in FIG. 14B. The display area is a display area allocated to the one-channel/one-time-frame unit as a display area of a time frame Ti including the one-channel/one-time-frame unit. Since the program q is regarded as a program pertaining to the fourth category, a program frame Fr in the display area including at least 0.5 lines ending at the bottom of the time frame Ti is allocated to the program q as shown in FIG. 14B. The remaining lines in the display area are allocated to the remaining programs n, o and p as lines used for displaying information on all the remaining programs as shown in FIG. 14B as follows.

The lines remaining in the display area of the time frame Ti1 are allocated to the remaining programs n, o and p in accordance with a method of allocating lines to programs by determining a program assignment pattern. That is to say, in the process to allocate the remaining lines to the three remaining programs n, o and p, the programs are assigned to some program frames Fr created by making use of the remaining lines. In order to display information on all the three remaining programs n, o and p, at least two lines are requisite in accordance with the method of allocating lines to programs by determining a program assignment pattern.

In general, there is one program pertaining to the second category, one program pertaining to the fourth category and a plurality of programs pertaining to the third category in the display area of the time frame Ti1. In this case, since the program pertaining to the second category and the program pertaining to the fourth category each demands at least 0.5 lines whereas the programs pertaining to the third category demand at least two lines, a total of at least three lines (=0.5 lines+0.5 lines+2 lines) is needed. That is to say, it is nice to set the height of each time frame Ti in the electronic program table 31 at three or more lines. It is to be noted that, in the TV-broadcast receiving apparatus 1 according to the embodiment, the height of each time frame Ti in the electronic program table 31 is set at four lines as described before on the basis of the size of the electronic program table screen 30 and the average number of programs broadcasted by each broadcasting station in the one-hour time slot being processed.

If a program broadcasted through a channel as a program pertaining to the second category exists in the one-hour time slot of the one-channel/one-time-frame unit, a program frame Fr in a display area including at least 0.5 lines starting from the top of the time frame Ti is always allocated to the program. If a program broadcasted through a channel as a program pertaining to the fourth category exists in the one-hour time slot of the one-channel/one-time-frame unit, a program frame Fr in a display area including at least 0.5 lines ending at the bottom of the time frame Ti is always allocated to the program. Thus, it is possible to let the user be aware of the fact that these programs are broadcasted during a time duration crossing the upper or lower limit of the time frame Ti. It is to be noted that a program assigned to a display area including at least 0.5 lines starting from the top of the time frame Ti being processed is a program assigned to a display area including at least 0.5 lines ending at the bottom of the immediately preceding time frame Ti. Thus, if the two time frames Ti, i.e., the time frame Ti being processed and the immediately preceding time frame Ti, the information on the program is displayed in a large program frame with a height of at least one line. By the same token, a program assigned to a display area including at least 0.5 lines ending at the bottom of the time frame Ti being processed is a program assigned to a display area including at least 0.5 lines starting from the top of the immediately succeeding time frame Ti. Thus, if the two time frames Ti, i.e., the time frame Ti being processed and the immediately succeeding time frame Ti, the information on the program is displayed in a large program frame with a height of at least one line.

In addition, in accordance with the algorithm for generating an electronic program table 31, the position of a program frame Fr on the time axis used as the vertical axis of the display area of the time frame Ti serving as a one-hour time slot being processed and the size of the program frame Fr are adjusted as accurately as possible to the actual broadcasting time range of the program assigned to the program frame Fr. To put it concretely, in accordance with the algorithm for generating an electronic program table 31, first of all, programs broadcasted through a channel being processed during the one-hour time slot being processed are allocated to some program frames Fr by identification of the categories of the programs and adoption of the method of selecting a program assignment pattern for programs pertaining to the fourth category as shown in the table of FIG. 13 as described above. However, the algorithm for generating an electronic program table 31 results in several allocations of program frames Fr to the programs. The position and size of each program frame Fr in one allocation are different from those of the same program frame Fr in another allocation. One of the allocations of program frames Fr to the programs is selected so as to minimize an error representing a difference between the position of each program frame Fr on the time axis used as the vertical axis of the display area of the time frame Ti serving as a one-hour time slot being processed and the actual broadcasting time of a program assigned to the program frame Fr. In the following description, such an error is referred to as a time error which is explained as follows.

The following description explains a method for computing the magnitude of a time error. In accordance with this time-error computation method, the time axis used as the vertical axis of the display area of the time frame Ti serving as a one-hour time slot being processed has a time scale conforming to the 0.5-line position unit of a program frame Fr on the axis. As described before, the one-hour height of the time frame Ti is four lines, which are composed of four 0.5-line position units. Thus, on the time axis used as the vertical axis of the display area of the time frame Ti serving as a one-hour time slot being processed, the zero-line position corresponds to 00 minutes, the 0.5-line position corresponds to 7.5 minutes, the one-line position corresponds to 15 minutes, the 1.5-line position corresponds to 22.5 minutes, the two-line position corresponds to 30 minutes, the 2.5-line position corresponds to 37.5 minutes, the three-line position corresponds to 45 minutes, the 3.5-line position corresponds to 52.5 minutes and the four-line position corresponds to 60 minutes as shown at the left end of FIG. 15.

The time error is expressed by Eq. (1) given below. In Eq. (1), notation $s_k$ denotes the actual broadcasting start time of a program $e_k$ broadcasted through a channel being processed in the one-hour time slot being processed whereas notation $p_k$ denotes the display start line of a program frame Fr allocated to the program $e_k$. The suffix k is an integer in the range one to n where notation n denotes the number of programs broadcasted through the channel being processed in the one-hour time slot being processed. The display start line $p_k$ of a program frame Fr allocated to the program $e_k$ is a line count expressed by a multiple of 0.5.

$$\text{Time error} = \Sigma |s_k - (60/4) \times p_k| \quad (1)$$

The time error is found in accordance with the above equation. Let us assume for example that the number of programs broadcasted through the channel being processed in the one-hour time slot being processed is three. The three programs are a program having an actual broadcasting start time of 00 minutes, a program having an actual broadcasting start time of 20 minutes a program having an actual broadcasting start time of 40 minutes.

Figure 15:
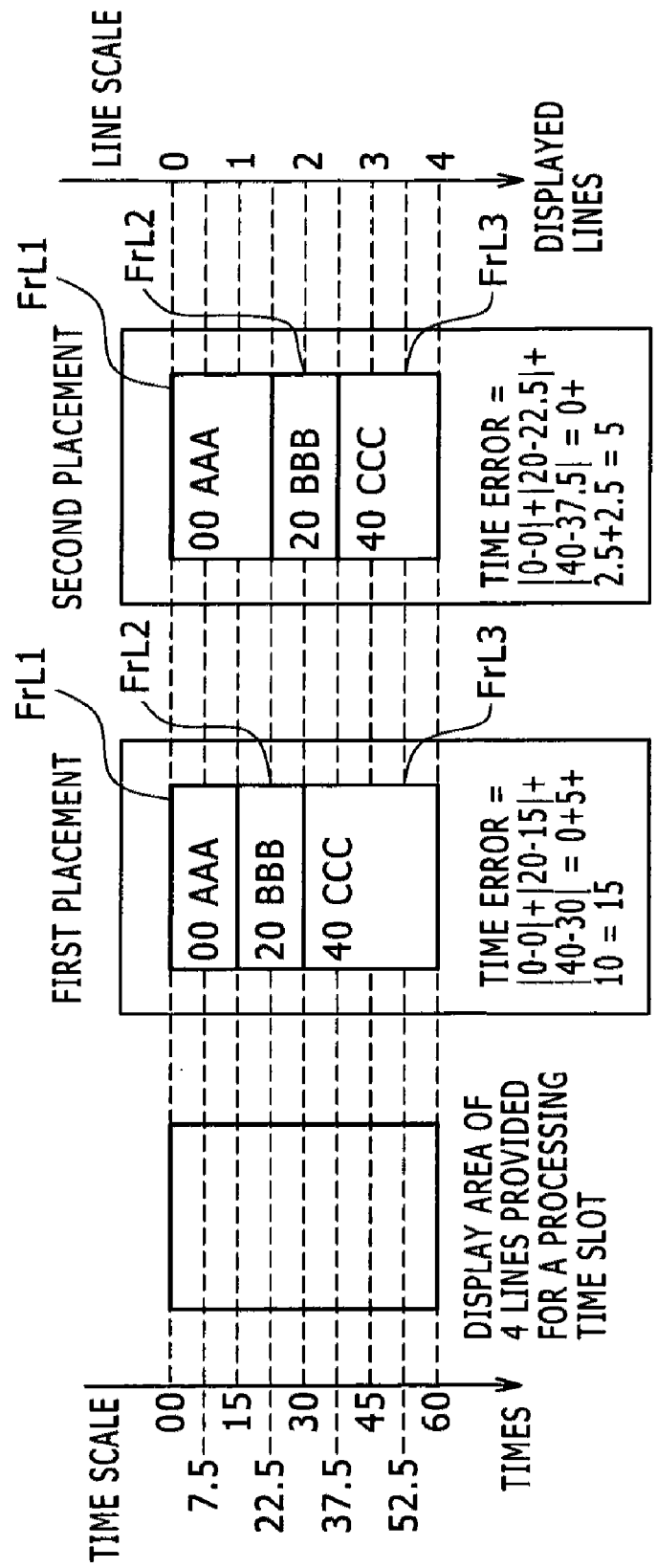
FIG. 15 is a diagram showing placements of program frames and time errors.

Here, a large program frame FrL having a height of at least one line is allocated to each of the three programs. As a result, for example, as shown in the middle of FIG. 15, the method adopted in the algorithm for generating an electronic program table 31 as a method for selecting a program assignment pattern produces a first program-frame allocation in which a large program frame FrL1 positioned at the top of the display area of the time frame Ti serving as a one-hour time slot being processed as a program frame having a height of one line is allocated to the program having an actual broadcasting start time of 00 minutes, a large program frame FrL2 positioned at the second location from the top of the same display area as a program frame having a height of one line is allocated to the program having an actual broadcasting start time of 20 minutes and a large program frame FrL3 positioned at the third location from the top of the same display area as a program frame having a height of two lines is allocated to the program having an actual broadcasting start time of 40 minutes. As shown on the right side of FIG. 15, however, the method adopted in the algorithm for generating an electronic program table 31 as a method for selecting a program assignment pattern also results in a second program-frame allocation in which a large program frame FrL1 positioned at the top of the display area of the time frame Ti serving as a one-hour time slot being processed as a program frame having a height of two lines is allocated to the program having an actual broadcasting start time of 00 minutes, a large program frame FrL2 positioned at the second location from the top of the same display area as a program frame having a height of one line is allocated to the program having an actual broadcasting start time of 20 minutes and a large program frame FrL3 positioned at the third location from the top of the same display area as a program frame having a height of one line is allocated to the program having an actual broadcasting start time of 40 minutes.

The time errors of the first and second program-frame allocations are computed as follows. The time error of the first program-frame allocation is |0−15×0|+|20−15×1|+|40−15×2|=15. On the other hand, the time error of the second program-frame allocation is |0−15×0|+|20−15×1.5|+|40−15×2.5|=5. Having a smaller time error, the second program-frame allocation is selected as the final allocation.

As described above, in accordance with the algorithm for generating an electronic program table 31, the position of a program frame Fr on the time axis used as the vertical axis of the display area of the time frame Ti serving as a one-hour time slot being processed and the size of the program frame Fr are adjusted as accurately as possible to the actual broadcasting time range of the program assigned to the program frame Fr. Thus, as a result of implementing the algorithm for generating an electronic program table 31, the longer the broadcasting time duration of a program, the larger the size of a program frame Fr allocated to the program or the larger the number of lines composing the program frame Fr. In actuality, the longer the broadcasting time duration of a program, the more the significance that can be said as importance of the program to both the broadcasting station and the TV watcher. Thus, by allocating a large program frame Fr to an important program, much information on the program can be displayed.

As explained so far, in accordance with the algorithm for generating an electronic program table 31, it is possible to generate an electronic program table 31 in which the titles of as many programs as possible are displayed, a program with a duration crossing the upper limit of 00 or the lower limit of 60 for a time frame Ti can be recognized at a glance and the position of a program frame Fr on the time axis used as the vertical axis of the display area of the time frame Ti serving as a one-hour time slot being processed as well as the size of the program frame Fr are adjusted as accurately as possible to the actual broadcasting time range of the program assigned to the program frame Fr.

The TV-broadcast receiving apparatus 1 generates an electronic program table 31 on the basis of the algorithm for generating an electronic program table 31 and displays the table on the electronic program table screen 30 of the display 11. It is thus possible to show the user an electronic program table 31 which is easy to view and easy to understand in comparison with the existing electronic program table.

(5): Procedure of Program-Table Generation Processing Based on the Algorithm for Generating an Electronic Program Table The following description explains details of the procedure of processing for generating an electronic program table 31 on the basis of the algorithm for generating an electronic program table 31 as described above. The processing for generating an electronic program table 31 is carried out in one-channel/one-time-frame units described earlier. A program broadcasted through the channel being processed as a program having at least a portion of its broadcasting duration included the one-hour time slot being processed is referred to as a program $e_k$. In the following description, such a program is referred to as a currently processed program $e_k$. The number of currently processed programs $e_k$ is n. The currently processed programs are expressed by a set represented by expression (2) as follows:

$$\{e_k | 0 \leq k \leq n\} \qquad (2)$$

Figure 16:
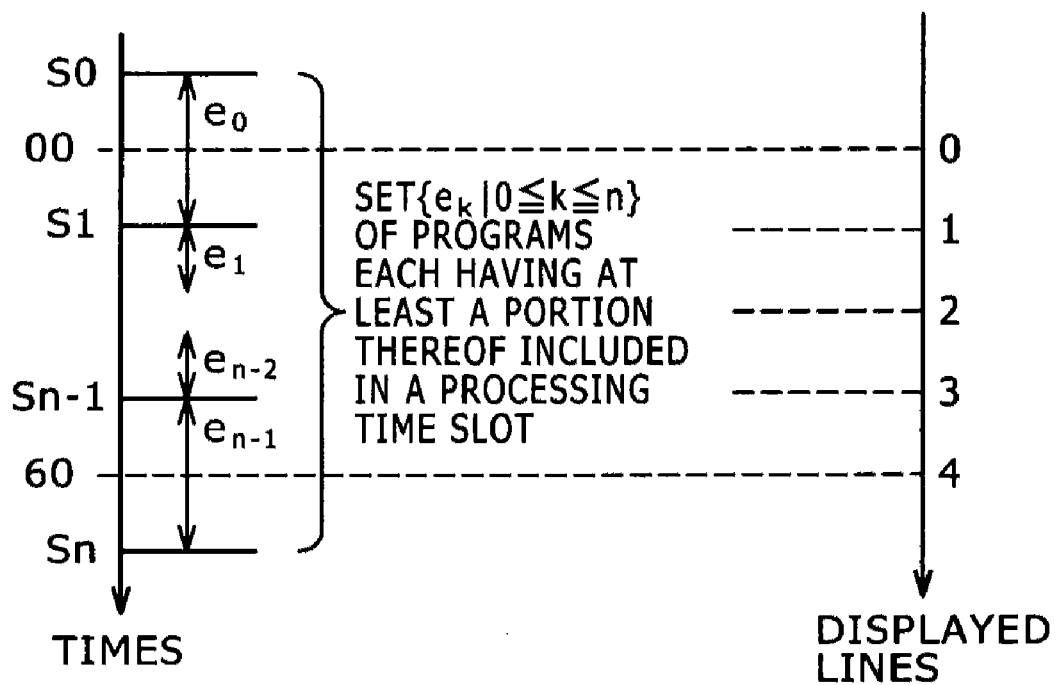
FIG. 16 is a diagram showing programs to be processed.

Notation $s_k$ denotes the broadcasting start time of a currently processed program $e_k$ whereas notation $s_{k+1}$ denotes the broadcasting end time of the currently processed program $e_k$. For example, a currently processed program $e_0$ is a specific currently processed program $e_k$ for k=0 as shown in FIG. 16. In this case, notation $s_0$ denotes the broadcasting start time of the currently processed program $e_0$ whereas notation $s_1$ denotes the broadcasting end time of the currently processed program $e_0$.

Figure 17:
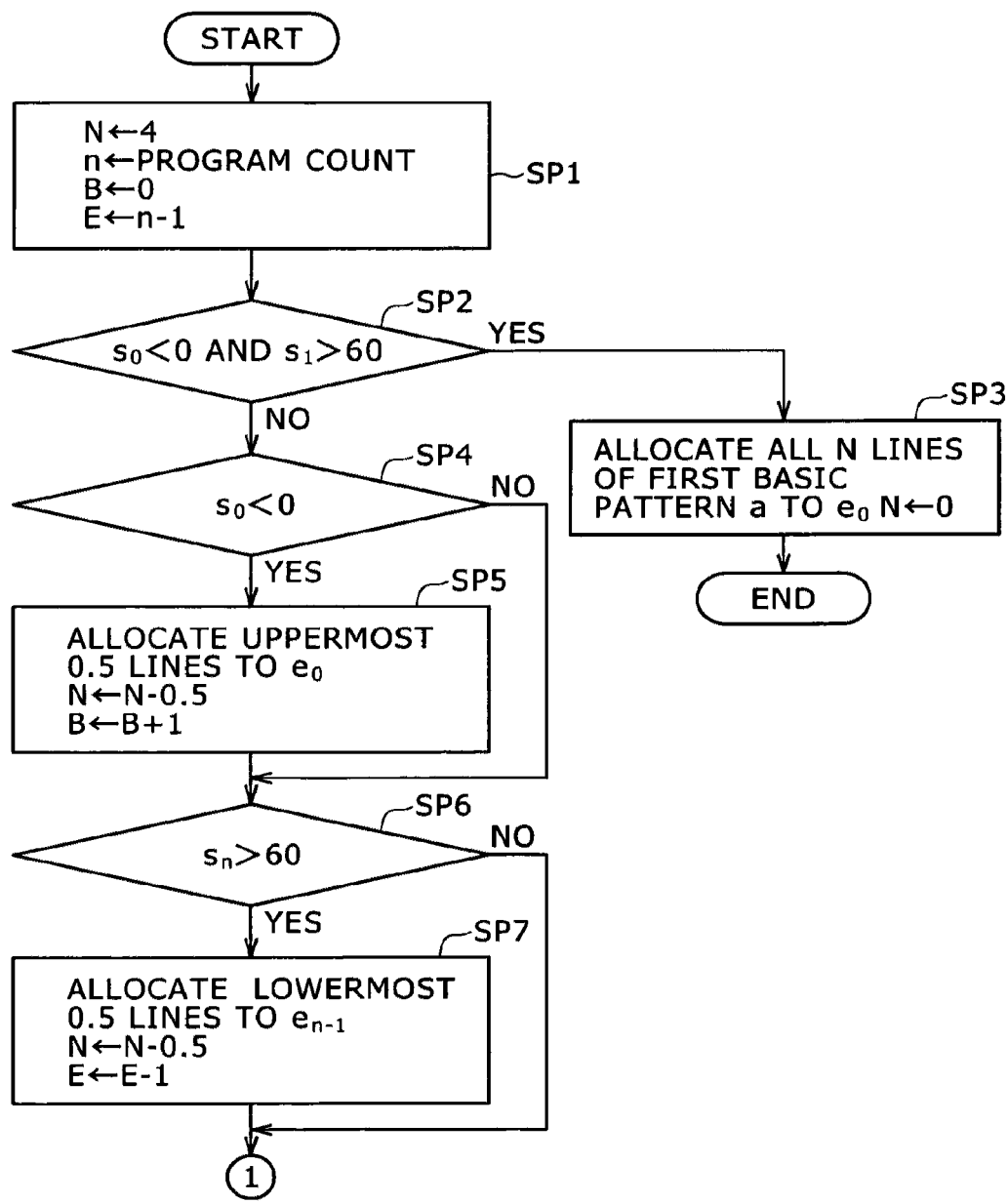
FIG. 17 shows part 1 of a flowchart representing the procedure of processing for generating an electronic program table.
Figure 18:
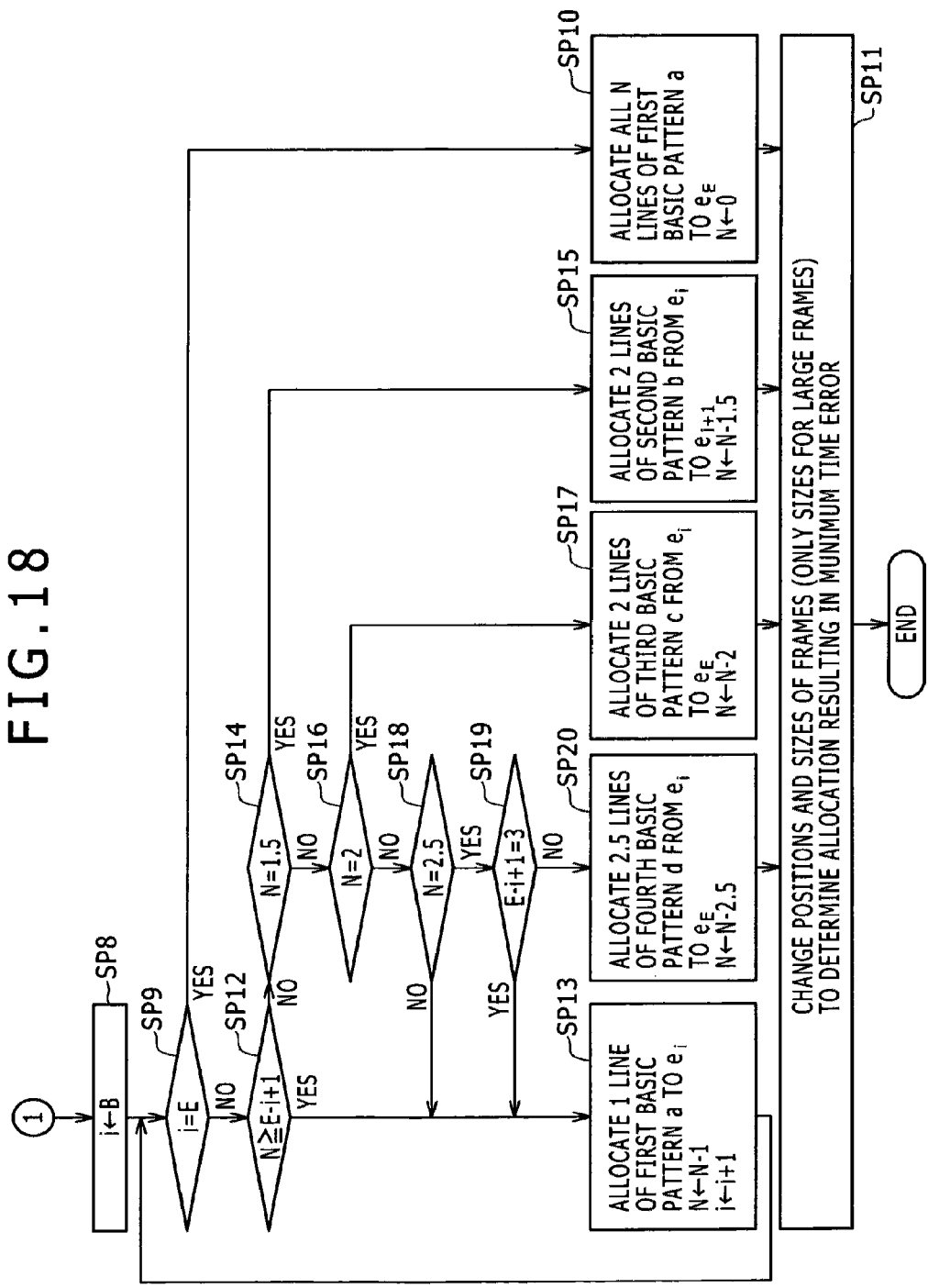
FIG. 18 shows part 2 of the flowchart representing the procedure of the processing for generating an electronic program table.

On the basis of the points described above, the following description explains details of the procedure RT1 of processing for generating an electronic program table 31 by adoption of the algorithm for generating an electronic program table 31 by referring to a flowchart shown in FIGS. 17 and 18. By the way, the processing for generating an electronic program table 31 is processing carried out by the host microcomputer 2 employed in the TV-broadcast receiving apparatus 1 by execution of a program stored in advance in an embedded memory shown in none of the figures or stored the nonvolatile memory 4.

When the host microcomputer 2 employed in the TV-broadcast receiving apparatus 1 recognizes the fact that a program-table display button provided on the remote controller RM has been pressed down, the host microcomputer 2 executes the program-table generation processing procedure RT1 which starts with a step SP1. At the step SP1, the host microcomputer 2 sets a variety of variables at their respective initial values. To put it concretely, a remaining-line count N representing the number of lines remaining in the display area of the time frame Ti serving as a one-hour time slot being processed at four, a program count n representing the number of currently processed programs $e_k$ at an initial program count, a variable B at zero in order to point to the initial earliest program among the currently processed programs $e_k$ and a variable E at (n−1) in order to point to the initial latest program among the currently processed programs $e_k$. Representing the number of programs to be broadcasted during the time slot of one hour, the initial program count is extracted from the EPG. The program $e_0$ is the earliest program $e_0$ among the currently processed programs $e_k$ whereas the program $e_{n-1}$ is the latest program among the currently processed programs $e_k$.

As the process carried out at the step SP1 to set the variables at their respective initial values is completed, the host microcomputer 2 continues the execution of the program-table generation processing procedure RT1 to a step SP2. At the step SP2, the host microcomputer 2 produces a result of determination as to whether or not the broadcasting start time $s_0$ of the program $e_0$ serving as the earliest program among the currently processed programs $e_k$ is smaller than zero and the broadcasting end time $s_1$ of the program $e_0$ is greater than 60.

An affirmation determination result produced in the process carried out at the step SP2 indicates that the program $e_0$ is a program pertaining to the first category and, hence, the only currently processed program $e_k$ as described before. This is because, since the broadcasting start time of the program $e_0$ leads ahead of the start of the one-hour time slot being processed whereas the broadcasting end time of the program $e_0$ lagging behind the end of the one-hour time slot, the host microcomputer 2 regards the program $e_0$ as a program pertaining to the first category shown in FIG. 14A. In this case, the host microcomputer 2 continues the execution of the program-table generation processing procedure RT1 to a step SP3.

At the step SP3, the host microcomputer 2 carries out a process to allocate all N (=4) lines to the program $e_0$ by selecting the first basic pattern a shown in FIG. 11A. Then, the host microcomputer 2 sets the remaining-line count N at zero and the program count n also at zero before terminating the program-table generation processing procedure RT1 for the one-channel/one-time-frame unit.

On the other hand, a negation determination result produced in the process carried out at the step SP2 indicates that a program pertaining to the first category is not included in the currently processed programs $e_k$. In this case, the host microcomputer 2 continues the execution of the program-table generation processing procedure RT1 to a step SP4.

At the step SP4, the host microcomputer 2 produces a result of determination as to whether or not the broadcasting start time $s_0$ of the program $e_0$ serving as the earliest program is smaller than 0. An affirmation determination result produced in the process carried out at the step SP4 indicates that the broadcasting start time of the program $e_0$ leads ahead of the start of the one-hour time slot being processed. The host microcomputer 2 thus regards the program $e_0$ as a program pertaining to the second category shown in FIG. 14A. In this case, the host microcomputer 2 continues the execution of the program-table generation processing procedure RT1 to a step SP5.

At the step SP5, the host microcomputer 2 carries out a process to allocate 0.5 lines at the top of the display area of the one-hour time slot being processed as a currently processed four-line time frame Ti to the program $e_0$. Then, the host microcomputer 2 sets the remaining-line count N at (N−0.5) lines. As a result, the remaining-line count N decreases from four to 3.5. In addition, the host microcomputer 2 increments the variable B by one to (B+1) pointing to the current earliest program. As a result, the variable B increases from zero to one. In this way, the program $e_0$ is excluded from the currently processed programs $e_k$. Then, the host microcomputer 2 decrements the program count n by one. Subsequently, the host microcomputer 2 continues the execution of the program-table generation processing procedure RT1 to a step SP6.

On the other hand, a negation determination result produced in the process carried out at the step SP4 indicates that a program pertaining to the second category is not included in the currently processed programs $e_k$. In this case, the host microcomputer 2 continues the execution of the program-table generation processing procedure RT1 directly to the step SP6.

At the step SP6, the host microcomputer 2 produces a result of determination as to whether or not the broadcasting end time $s_n$ of the program $e_{n-1}$ serving as the latest program among the currently processed programs $e_k$ is greater than 60. An affirmation determination result produced in the process carried out at the step SP6 indicates that the broadcasting end time of the program $e_{n-1}$ lags behind the start of the one-hour time slot being processed. The host microcomputer 2 thus regards the program $e_{n-1}$ as a program pertaining to the fourth category shown in FIG. 14A. In this case, the host microcomputer 2 continues the execution of the program-table generation processing procedure RT1 to a step SP7.

At the step SP7, the host microcomputer 2 carries out a process to allocate 0.5 lines at the bottom of the display area of the one-hour time slot being processed as a currently processed four-line time frame Ti to the program $e_{n-1}$. Then, the host microcomputer 2 sets the remaining-line count N at (N−0.5) lines. As a result, the remaining-line count N decreases from four to 3.5 or from 3.5 to 3. In addition, the host microcomputer 2 decrements the variable E by one to (E−1) pointing to the new current latest program. As a result, the variable E decreases from (n−1) to (n−2). In this way, the program $e_{n-1}$ is excluded from the currently processed programs $e_k$. Then, the host microcomputer 2 decrements the program count n by one. Subsequently, the host microcomputer 2 continues the execution of the program-table generation processing procedure RT1 to a step SP8 of a flowchart portion shown in FIG. 18.

On the other hand, a negation determination result produced in the process carried out at the step SP6 indicates that a program pertaining to the fourth category is not included in the currently processed programs $e_k$. In this case, the host microcomputer 2 continues the execution of the program-table generation processing procedure RT1 directly to the step SP8 of the flowchart portion shown in FIG. 18. The flowchart shown in FIG. 18 except a step SP11 represents processing to allocate the N remaining lines to the n remaining programs $e_k$ each pertaining to the third category shown in FIG. 14A.

At the step SP8, the host microcomputer 2 sets the variable B in a variable i pointing to the current earliest program among the programs $e_k$ not processed yet. Then, the host microcomputer 2 continues the execution of the program-table generation processing procedure RT1 to a step SP9. At the step SP9, the host microcomputer 2 produces a result of determination as to whether or not the variable i is equal to the variable E pointing to the current latest program among the programs $e_k$ not processed yet.

An affirmation determination result produced in the process carried out at the step SP9 indicates that the current earliest program among the programs $e_k$ not processed yet is the same program as the current latest program among the programs $e_k$ not processed yet. That is to say, the program $e_E$ is the only program not processed yet. In this case, the host microcomputer 2 continues the execution of the program-table generation processing procedure RT1 to a step SP10.

At the step SP10, the host microcomputer 2 carries out a process to allocate all the N remaining lines in conformity with the first basic pattern a shown in FIG. 11A to the program $e_E$ which remains as the program not processed yet. Then, the host microcomputer 2 sets the remaining-line count N at zero before continuing the execution of the program-table generation processing procedure RT1 to the step SP11.

On the other hand, a negation determination result produced in the process carried out at the step SP9 indicates that the number of programs $e_k$ each remaining as a program to be processed is at least two. In this case, the host microcomputer 2 continues the execution of the program-table generation processing procedure RT1 to a step SP12.

At the step SP12, the host microcomputer 2 produces a result of determination as to whether or not the remaining-line count N is at least equal to an expression of (E−i+1) where notation E denotes the variable E pointing to the latest program $e_E$ whereas notation i denotes the variable i pointing to the current earliest program. That is to say, the expression of (E−i+1) is the number of programs $e_k$ each remaining as a program not processed yet.

An affirmation determination result produced in the process carried out at the step SP12 indicates that the remaining-line count N is at least equal to the number of programs $e_k$ each remaining as a program not processed yet. In this case, the host microcomputer 2 continues the execution of the program-table generation processing procedure RT1 to a step SP13. At the step S13, the host microcomputer 2 carries out a process to allocate one line in conformity with the first basic pattern a shown in FIG. 11A to the current earliest program $e_i$ among the programs $e_k$ not processed yet. Then, the host microcomputer 2 decrements the remaining-line count N by one to (N−1) and increments the variable i pointing to the current earliest program $e_i$ among the programs $e_k$ not processed yet to (i+1). Subsequently, the host microcomputer 2 returns the execution of the program-table generation processing procedure RT1 back to the step SP9.

On the other hand, a negation determination result produced in the process carried out at the step SP12 indicates that the remaining-line count N is smaller than the number of programs $e_k$ each remaining as a program not processed yet. In this case, the host microcomputer 2 continues the execution of the program-table generation processing procedure RT1 to a step SP14. At the step S14, the host microcomputer 2 produces a result of determination as to whether or not the remaining-line count N is 1.5.

An affirmation determination result produced in the process carried out at the step SP14 indicates that the remaining-line count N is 1.5. In this case, the host microcomputer 2 continues the execution of the program-table generation processing procedure RT1 to a step SP15. At the step SP15, the host microcomputer 2 carries out a process to allocate the 1.5 lines in conformity with the second basic pattern b shown in FIG. 11B to the current earliest program $e_i$ among programs $e_k$ not processed yet and a program $e_{i+1}$ immediately following the program $e_i$. Then, the host microcomputer 2 decrements the remaining-line count N by 1.5 to (N−1.5) before continuing the execution of the program-table generation processing procedure RT1 to the step SP11.

By the way, when the process carried out at the step SP14 produces an affirmation result of determination for a case in which the remaining-line count N is 1.5 lines, the process including the steps SP18, SP19, SP13, SP9, SP12 described later should be executed so that the number of programs $e_k$ not processed yet is two. Thus, the program-table generation processing procedure RT1 is capable of certainly preventing the processing for generating an electronic program table 31 from ending in a display failure due to the fact that the remaining-line count N is 1.5 lines but the number of programs $e_k$ not processed yet is at least equal to 3.

On the other hand, a negation determination result produced in the process carried out at the step SP14 indicates that the remaining-line count N is not 1.5. In this case, the host microcomputer 2 continues the execution of the program-table generation processing procedure RT1 to a step SP16. At the step S16, the host microcomputer 2 produces a result of determination as to whether or not the remaining-line count N is two.

An affirmation determination result produced in the process carried out at the step SP16 indicates that the remaining-line count N is two. In this case, the host microcomputer 2 continues the execution of the program-table generation processing procedure RT1 to a step SP17. At the step SP17, the host microcomputer 2 carries out a process to allocate the two lines in conformity with the third basic pattern c shown in FIG. 11C to a series of programs $e_k$ ranging from the current earliest program $e_i$ to the latest program $e_E$ among programs $e_k$ not processed yet. Then, the host microcomputer 2 decrements the remaining-line count N by two to (N−2) before continuing the execution of the program-table generation processing procedure RT1 to the step SP11.

On the other hand, a negation determination result produced in the process carried out at the step SP16 indicates that the remaining-line count N is neither 1.5 nor 2. In this case, the host microcomputer 2 continues the execution of the program-table generation processing procedure RT1 to a step SP18. At the step S18, the host microcomputer 2 produces a result of determination as to whether or not the remaining-line count N is 2.5.

A negation determination result produced in the process carried out at the step SP18 indicates that the remaining-line count N is neither 1.5 nor 2.5 or indicates that the remaining-line count N is at least three. In this case, the host microcomputer 2 continues the execution of the program-table generation processing procedure RT1 to the step SP13. At the step SP13, the host microcomputer 2 carries out a process to allocate one line in conformity with the first basic pattern a shown in FIG. 11A to the current earliest program $e_i$ among programs $e_k$ not processed yet. Then, the host microcomputer 2 decrements the remaining-line count N by one to (N−1) and increments the variable i pointing to the current earliest program $e_i$ among programs $e_k$ not processed yet by one before returning the execution of the program-table generation processing procedure RT1 back to the step SP9.

On the other hand, an affirmation determination result produced in the process carried out at the step SP18 indicates that the remaining-line count N is 2.5. In this case, the host microcomputer 2 continues the execution of the program-table generation processing procedure RT1 to a step SP19. At the step S19, the host microcomputer 2 produces a result of determination as to whether or not the expression of (E−i+1) is equal to 3. In the expression, notation E denotes the variable E pointing to the latest program $e_E$ whereas notation i denotes the variable i pointing to the current earliest program. That is to say, the expression of (E−i+1) is the number of programs $e_k$ each remaining as a program not processed yet.

An affirmation determination result produced in the process carried out at the step SP19 indicates that the remaining-line count N is 2.5 and the number of programs $e_k$ each remaining as a program not processed yet is three. In this case, the host microcomputer 2 continues the execution of the program-table generation processing procedure RT1 to the step SP13. At the step SP13, the host microcomputer 2 carries out a process to allocate one line in conformity with the first basic pattern a shown in FIG. 11A to the current earliest program $e_i$ among programs $e_k$ not processed yet. Then, the host microcomputer 2 decrements the remaining-line count N by one to (N−1) and increments the variable i pointing to the current earliest program $e_i$ among programs $e_k$ not processed yet by one to (i+1) before returning the execution of the program-table generation processing procedure RT1 back to the step SP9.

As described above, if the remaining-line count N is 2.5 and the number of programs $e_k$ each remaining as a program not processed yet is three, the host microcomputer 2 continues the execution of the program-table generation processing procedure RT1 to the step SP13 at which the host microcomputer 2 carries out a process to decrement the remaining-line count N by one from 2.5 to 1.5 and decrement the variable i pointing to the current earliest program $e_i$ among programs $e_k$ not processed yet by one from three to two (=3−1). If the remaining-line count N is 2.5 and the number of programs $e_k$ each remaining as a program not processed yet is greater than 3, on the other hand, the host microcomputer 2 continues the execution of the program-table generation processing procedure RT1 to a step SP20, avoiding the step SP13 which would otherwise result in a remaining-line count N of 1.5 lines and leave the number of programs $e_k$ not processed yet at an integer at least equal to 3. Thus, as described above, the program-table generation processing procedure RT1 is capable of certainly preventing the processing for generating an electronic program table 31 from ending in a display failure due to the fact that the remaining-line count N is 1.5 lines but the number of programs $e_k$ not processed yet is at least equal to 3.

On the other hand, a negation determination result produced in the process carried out at the step SP19 indicates that the remaining-line count N is 2.5 and the number of programs $e_k$ each remaining as a program not processed yet is at least four. In this case, the host microcomputer 2 continues the execution of the program-table generation processing procedure RT1 to the step SP20. At the step SP20, the host microcomputer 2 carries out a process to allocate the 2.5 lines in conformity with the fourth basic pattern d shown in FIG. 11D to a series of programs $e_k$ ranging from the current earliest program $e_i$ to the latest program $e_E$ among programs $e_k$ not processed yet. Then, the host microcomputer 2 decrements the remaining-line count N by 2.5 to zero (=N−2.5) before continuing the execution of the program-table generation processing procedure RT1 to the step SP1.

By carrying out the series of processes described above, all the currently processed programs $e_k$ are assigned to some program frames Fr.

At the step SP11, the host microcomputer 2 changes the position and size of every program frame Fr allocated to programs $e_k$ except a program pertaining to the first category in order to determine a program-frame allocation resulting in a minimum time error computed in accordance with the time-error computation method explained earlier. Finally, the host microcomputer 2 terminates the execution of the program-table generation processing procedure RT1 for one one-channel/one-time-frame unit. By the way, in the case of a large program frame FrL, only the size can be changed.

Then, the host microcomputer 2 repeats the execution of the program-table generation processing procedure RT1 for every one-channel/one-time-frame unit in order to display information for at least seven channels and four one-hour time slots on the electronic program table 31.

As described above, the host microcomputer 2 generates an electronic program table 31 covering seven channels and four one-hour time slots and displays the electronic program table 31 on the display 11.

(6): Functional Configuration of the TV-Broadcast Receiving Apparatus

Figures 19, 20:
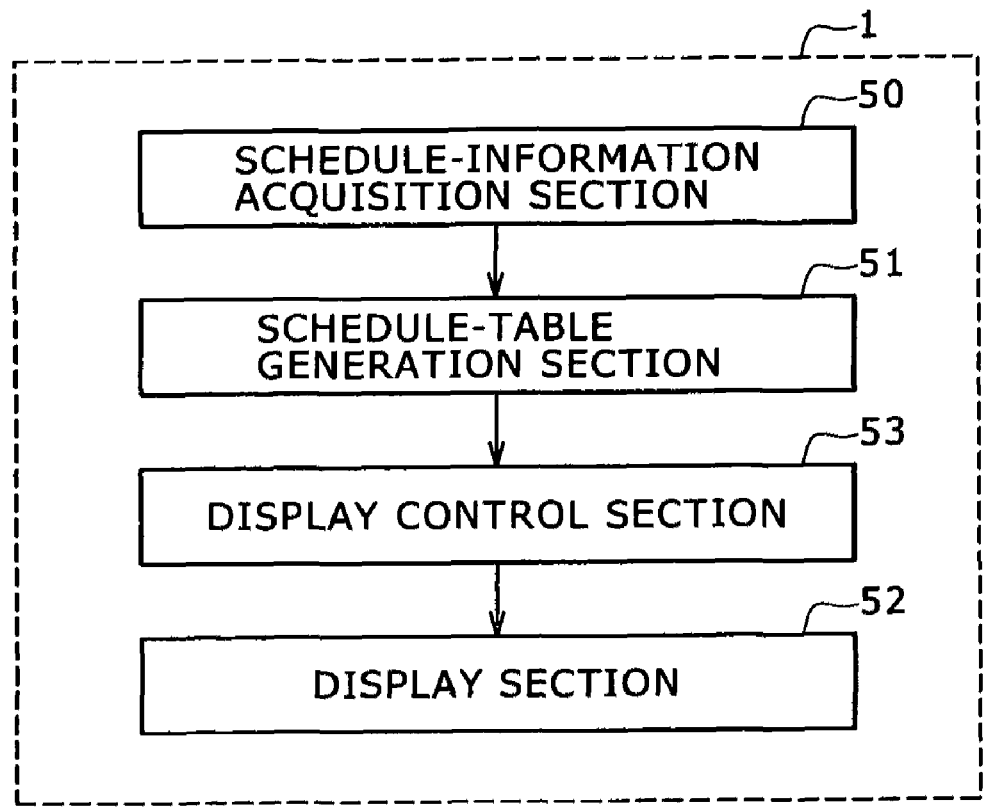
FIG. 19 is a block diagram showing the functional configuration of a TV-broadcast receiving apparatus.
FIG. 20 is a diagram showing a portion of an electronic program table with its horizontal axis representing broadcasting times and its vertical axis representing channels in accordance with another embodiment.

The following description explains the functional configuration of the TV-broadcast receiving apparatus 1 by focusing the explanation on the process to generate an electronic program table 31. As shown in FIG. 19, the TV-broadcast receiving apparatus 1 has a schedule-information acquisition section 50, a schedule-table generation section 51, a display control section 53 and a display section 52. The schedule-information acquisition section 50 is a unit for acquiring a schedule including the broadcasting start time of each event and a descriptive text describing the event. In the case of this embodiment, an event is a program whereas the schedule information is an EPG. The schedule-table generation section 51 is a unit for generating a schedule table by executing the steps of:

assigning a specific event to a first program frame having a size large enough for showing the broadcasting start time of the specific event as well as a descriptive text describing the specific event and assigning a plurality of events other than the specific event to a second program frame having a size smaller than that of the first program frame but large enough for showing the broadcasting start time of each of the other events on the basis of the schedule acquired by the schedule-information acquisition section 50 in accordance with importance of each of the events; and generating a schedule table including the first program frame allocated to the specific event as a frame showing the broadcasting start time of the specific event as well as a descriptive text describing the specific event and the second program frame allocated to the other events as a frame showing the broadcasting start time of each of the other events, that is, generating a schedule table showing at least the broadcasting start time of each of the events as information on the events.

An example of the importance of an event is the duration of a program handled as the event. In the case of this embodiment, the descriptive text describing an event is the title of a program handled as the event, the first program frame is the large program frame FrL, the second program frame is the small program frame FrS and the generated schedule table is the electronic program table 31.

The display control section 53 is a unit for displaying the schedule table generated by the schedule-table generation section 51 on the display section 52.

With the functional configuration described above, the TV-broadcast receiving apparatus 1 is capable of functionally implementing the processing to generate an electronic program table 31 explained earlier. The schedule-table generation section 51 is typically a functional unit implemented through execution of a program by the host microcomputer 2 which is included in the hardware configuration of the TV-broadcast receiving apparatus 1. The schedule-information acquisition section 50 is typically a functional unit corresponding to the digital system antenna 6, the digital tuner 7, the demultiplexer 8, the analog-system antenna 13, the analog tuner 14, the demodulator 15, the VBI slicer 16, the EPG decoder 17, the network terminal 18 and the network controller 19 which are also included in the hardware configuration of the TV-broadcast receiving apparatus 1. The display section 52 is typically a functional unit corresponding to the display 11 whereas the display control section 53 is typically a functional unit corresponding to the GUI superposition section 10 included in the hardware configuration of the TV-broadcast receiving apparatus 1.

(7): Operations and Effects

As described above, the TV-broadcast receiving apparatus 1 generates a schedule table by executing the steps of:

assigning a specific event to a first program frame having a size large enough for showing the broadcasting start time of the specific event as well as a descriptive text describing the specific event and assigning a plurality of events other than the specific event to a second program frame having a size smaller than that of the first program frame but large enough for showing the broadcasting start time of each of the other events on the basis of the schedule acquired by the schedule-information acquisition section 50 in accordance with importance of each of the events; and generating a schedule table including the first program frame allocated to the specific event as a frame showing the broadcasting start time of the specific event as well as a descriptive text describing the specific event and the second program frame allocated to the other events as a frame showing the broadcasting start time of each of the other events, that is, generating a schedule table showing at least the broadcasting start time of each of the events as information on the events.

An example of the importance of an event is the duration of a program handled as the event. In the case of this embodiment, the descriptive text describing an event is the title of a program handled as the event, the first program frame is the large program frame FrL, the second program frame is the small program frame FrS and the generated schedule table is the electronic program table 31.

In addition, the TV-broadcast receiving apparatus 1 also displays the electronic program table 31 generated as described above on the display 11 as an electronic program table screen 30.

As described above, in the TV-broadcast receiving apparatus 1, a large program frame FrL is used for showing the broadcasting start time of a specific program and a descriptive text describing the specific program whereas a small program frame FrS having a size smaller than that of the large program frame FrL is used for showing the broadcasting start time of each of a plurality of programs other than the specific program. It is thus possible to display information on a number of programs in a limited display area. That is to say, the state in which the electronic program table 31 can be viewed at a glance is improved. In addition, the TV-broadcast receiving apparatus 1 allows the user to recognize the number of programs and the broadcasting start time of each of the programs easily and certainly without carrying out a needless operation.

On top of that, the TV-broadcast receiving apparatus 1 generates an electronic program table 31 for showing at least the broadcasting start time of every program as information on the program in a program frame Fr without regard to whether the program frame Fr is a large program frame FrL or a small program frame FrS. Then, the TV-broadcast receiving apparatus 1 displays the electronic program table 31 on the display 11 as an electronic program table screen 30.

By operating in this way, the TV-broadcast receiving apparatus 1 is capable of displaying information on a number of programs in a limited display area. That is to say, the state in which the electronic program table 31 can be viewed at a glance is improved. In addition, the TV-broadcast receiving apparatus 1 allows the user to recognize the number of programs and the broadcasting start time of each of the programs easily and certainly without carrying out a needless operation.

In addition, the TV-broadcast receiving apparatus 1 selects a program shown in a program frame Fr indicated by a focus Fc moved to the position of the program frame Fr in accordance with an operation carried out by the user. If a program selected by the TV-broadcast receiving apparatus 1 in this way is a program included in a small program frame FrS, the TV-broadcast receiving apparatus 1 enlarges the small program frame FrS to a large program frame FrL which allows the user to recognize displayed information on a program selected in accordance with an operation carried out by the user in more detail.

With one or more large program frames FrL displayed in a predetermined display area for showing information on programs to be broadcasted in a time slot of typically one hour, if the TV-broadcast receiving apparatus 1 enlarges a small program frame FrS indicated by the focus Fc to a new large program frame FrL as described above, the TV-broadcast receiving apparatus 1 has to contract an existing large program frame FrL other than the new large program frame FrL to a new small program frame FrS in order to accommodate the new large program frame FrL.

By operating in this way, the TV-broadcast receiving apparatus 1 allows the user to recognize displayed information on a program selected in accordance with an operation carried out by the user in more detail without changing the size of the display area and the total number of programs, the information on which is shown in the display area. In addition, the TV-broadcast receiving apparatus 1 also allows the user to easily recognize information on programs other than the selected one. On top of that, in the case of this embodiment, it is requisite to only change the size of a program frame Fr. It is thus possible to implement display processing having a small processing load in comparison with the case of a superposition display such as a pop-up window.

On top of that, a specific small program frame FrS may be allocated to a plurality of programs. In this case, in accordance with an operation carried out by the user to place the focus Fc at the specific small program frame FrS, the TV-broadcast receiving apparatus 1 makes use of three adjacent program frames Fr including the specific small program frame FrS in order to reassign a particular one of a plurality of programs already assigned to the specific small program frame FrS to a large program frame FrL included in the three adjacent program frames Fr which include the specific small program frame FrS, the large program frame FrL having a height of one line and another small program frame FrS and in order to assign the remaining programs to the specific small program frame FrS and the other small program frame FrS. The particular program reassigned program to a large program frame FrL is the earliest one among the programs assigned so far to the specific small program frame FrS. That is to say, the TV-broadcast receiving apparatus 1 makes use of the three adjacent program frames Fr in order to change the assignment of a plurality of programs already assigned to the specific small program frame FrS. Thus, by repeating the process to reassign a particular one of a plurality of programs already assigned to a small program frame FrS to a large program frame FrL in accordance with an operation repeated by the user to place the focus Fc at a small program frame FrS, the TV-broadcast receiving apparatus 1 is capable of selecting and extracting each individual one of programs even if the programs have already been assigned to a small program frame FrS.

As described above, the TV-broadcast receiving apparatus 1 is capable of showing the user an electronic program table 31 very easy to view and very easy to understand in comparison with the existing apparatus.

In accordance with the configuration described above, the TV-broadcast receiving apparatus 1 generates a schedule table by executing the steps of:

assigning a specific event to a first program frame having a size large enough for showing the broadcasting start time of the specific event as well as a descriptive text describing the specific event and assigning a plurality of events other than the specific event to a second program frame having a size smaller than that of the first program frame but large enough for showing the broadcasting start time of each of the other events on the basis of the schedule acquired by the schedule-information acquisition section 50 in accordance with importance of each of the events; and generating a schedule table including the first program frame allocated to the specific event as a frame showing the broadcasting start time of the specific event as well as a descriptive text describing the specific event and the second program frame allocated to the other events as a frame showing the broadcasting start time of each of the other events, that is, generating a schedule table showing at least the broadcasting start time of each of the events as information on the events.

An example of the importance of an event is the duration of a program handled as the event. In the case of this embodiment, the descriptive text describing an event is the title of a program handled as the event, the first program frame is the large program frame FrL, the second program frame is the small program frame FrS and the generated schedule table is the electronic program table 31.

In addition, the TV-broadcast receiving apparatus 1 also displays the electronic program table 31 generated as described above on the display 11 as an electronic program table screen 30.

Thus, the TV-broadcast receiving apparatus 1 is capable of displaying information on a number of programs in a limited display area. That is to say, the state in which the electronic program table 31 can be viewed at a glance is improved. In addition, the TV-broadcast receiving apparatus 1 allows the user to recognize the number of programs and the broadcasting start time of each of the programs easily and certainly without carrying out a needless operation.

In addition, the TV-broadcast receiving apparatus 1 generates an electronic program table 31 showing at least the broadcasting start time of each of programs as information on the programs and displays the electronic program table 31 generated as described above on the display 11 as an electronic program table screen 30. Thus, the TV-broadcast receiving apparatus 1 is capable of displaying information on a number of programs in a limited display area. That is to say, the state in which the electronic program table 31 can be viewed at a glance is improved. In addition, the TV-broadcast receiving apparatus 1 allows the user to recognize the number of programs and the broadcasting start time of each of the programs easily and certainly without carrying out a needless operation.

Thus, the TV-broadcast receiving apparatus 1 is capable of showing the user an electronic program table 31 very easy to view and very easy to understand in comparison with the existing apparatus.

(8): Other Embodiments

It is to be noted that the embodiment described above applies the present invention to an electronic program table 31 with its horizontal axis representing channels and its vertical axis representing broadcasting times. However, implementations of the present invention are by no means limited to such an embodiment. FIG. 20 is a diagram showing a portion of an electronic program table 31x according to another embodiment of the present invention. As shown in the figure, the electronic program table 31x has a vertical axis representing channels and a horizontal axis representing broadcasting times.

Figure 21:
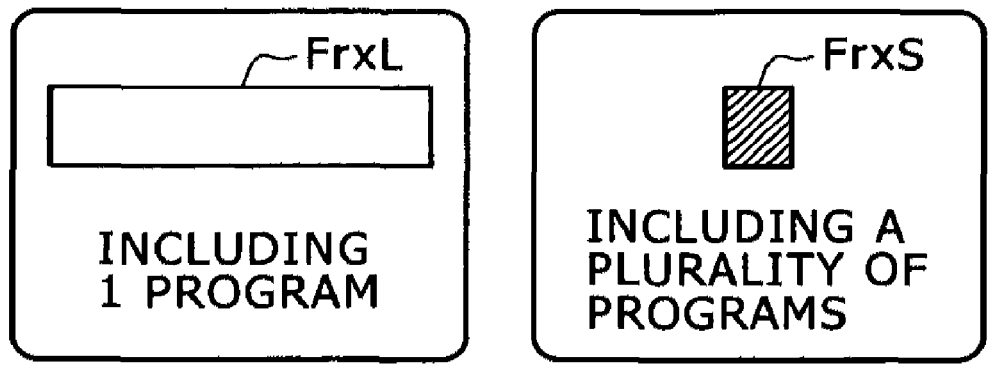
FIG. 21 is a diagram showing program-frame classification according to the other embodiment.

FIG. 21 is a diagram showing typical program frames Frx composing an electronic program table 31x. As shown in the figure, the program frame Frx has two types. That is to say, the program frame Frx can be a large program frame FrxL or a small program frame FrxS. The program frame FrxL can have any width. Allocated to a program, the program frame FrxL is used for displaying at least a portion of information on the program. The portion of information on the program includes the broadcasting start time of the program and a title given to the program. Used for displaying information on at least one program, the program frame FrxS has a width smaller than that of the program frame FrxL. Information shown in the program frame FrxS is the broadcasting start time of every program. Thus, the program frame FrxS is used for displaying at least the broadcasting start time of one program. By the way, the program frame FrxS can have a height equal to that of the program frame FrxL. In this case, if the height is at least one line, the broadcasting start times of a plurality of programs are arranged in the program frame FrxS horizontally.

A program assignment pattern is any combination of four basic patterns v to y shown in FIGS. 22A to 22D respectively.

Figure 22A:
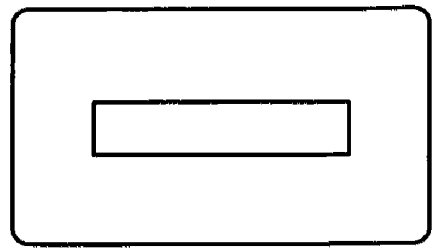
FIGS. 22A through 22D are diagrams showing basic patterns of program assignment according to the other embodiment.
Figure 22B:
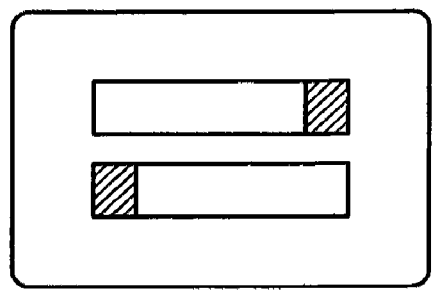

The first basic pattern v is a pattern of assignment of a program to a large program frame FrxL having any width as shown in FIG. 22A. The second basic pattern w is a pattern of assignment of two programs to a large program frame FrxL and a small program frame FrxS respectively as shown in FIG. 22B. To put it concretely, a program selected by making use of the focus Fc is assigned to the large program frame FrxL and the other program is assigned to the small program frame FrxS. The program selected by making use of the focus Fc may be the earlier program on the left side. In this case, the large program frame FrxL is followed by the small program frame FrxS. In another case, the program selected by making use of the focus Fc is the later program on the right side. In this case, the large program frame FrxL follows the small program frame FrxS.

Figure 22C:
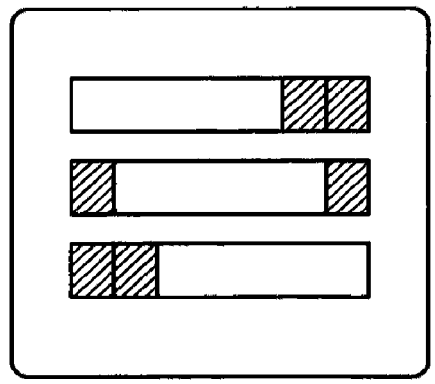

The third basic pattern x is a pattern of assignment of three or more programs to a large program frame FrxL and two small program frames FrxS as shown in FIG. 22C. To put it concretely, a program selected by making use of the focus Fc is assigned to the large program frame FrxL and the other programs are assigned to the two small program frames FrxS. The program selected by making use of the focus Fc may be the earliest program on the left-most side. In this case, the large program frame FrxL is followed by the two small program frames FrxS. In another case, the program selected by making use of the focus Fc is a middle program. In this case, the large program frame FrxL is sandwiched by the two small program frames FrxS. In a further case, the program selected by making use of the focus Fc is the latest program on the right-most side. In this case, the large program frame FrxL follows the two small program frames FrxS.

Figure 22D:
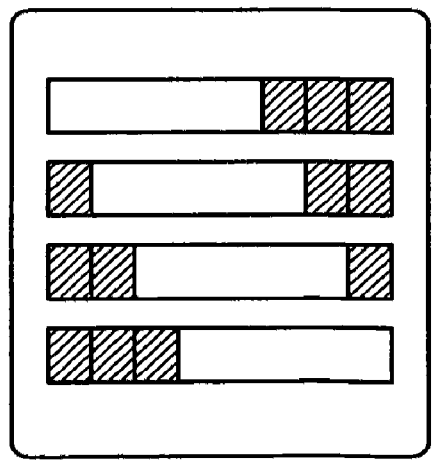

The fourth basic pattern y is a pattern of assignment of four or more programs to a large program frame FrxL and three small program frames FrxS as shown in FIG. 22D. To put it concretely, a program selected by making use of the focus Fc is assigned to the large program frame FrxL and the other programs are assigned to the three small program frames FrxS. The program selected by making use of the focus Fc may be the earliest program on the left-most side. In this case, the large program frame FrxL is followed by the three small program frames FrxS. In another case, the program selected by making use of the focus Fc is a middle program. In this case, the large program frame FrxL is sandwiched by one small program frame FrxS on the left-hand side and two small program frames FrxS on the right-hand side or sandwiched by two small program frames FrxS on the left-hand side and one small program frame FrxS on the right-hand side. In a further case, the program selected by making use of the focus Fc is the latest program on the right-most side. In this case, the large program frame FrxL follows the three small program frames FrxS.

As described above, the program assignment pattern is any combination of the four basic patterns v to y shown in FIGS. 22A to 22D respectively. By the way, if the third basic pattern x is used, it is possible to display all information on any number of programs. Also as explained above, in this case, a program selected by making use of the focus Fc is assigned to the large program frame FrxL and the other programs are assigned to the two small program frames FrxS. Thus, any individual one of the programs can be selected by making use of the focus Fc.

Thus, by applying the algorithm for generating an electronic program table 31 in accordance with the embodiment described earlier to the four basic patterns explained by referring to FIG. 22, it is possible to create an electronic program table 31x with its vertical axis representing channels and its horizontal axis representing broadcasting times.

Figure 23A:
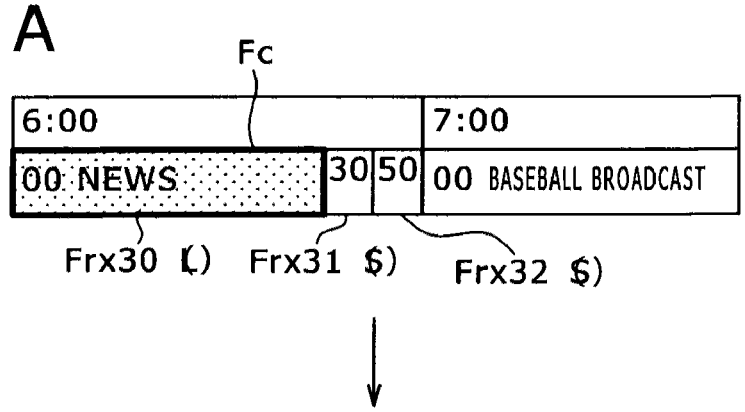
FIGS. 23A through 23C are diagrams each showing typical selection of programs in accordance with the other embodiment.
Figure 23B:
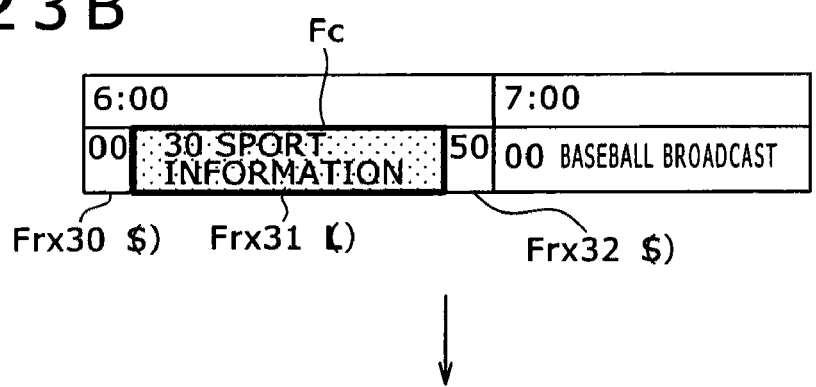
Figure 23C:
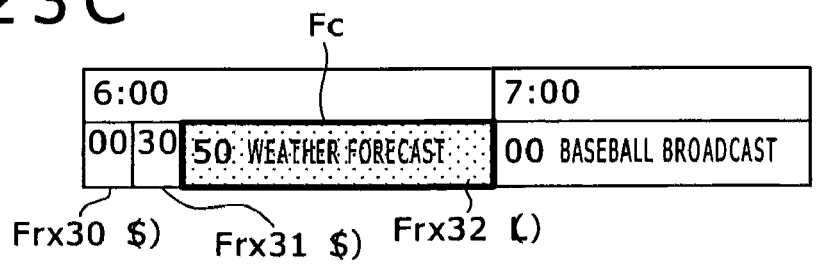

By referring to FIGS. 23A to 23C, the following description briefly explains a case to select a program by making use of the focus Fc from those displayed on an electronic program table 31*x* with its vertical axis representing channels and its horizontal axis representing broadcasting times. Let us assume for example that the EPG includes three programs to be broadcasted through a channel during a one-hour time slot starting at typically 6:00 PM. The three programs are a program to be broadcasted in the time range 6:00 PM to 6:30 PM, a program to be broadcasted in the time range 6:30 PM to 6:50 PM and a program to be broadcasted in the time range 6:50 PM to 7:00 PM. The three programs are assigned to program frames Frx in accordance with the third basic pattern x.

First of all, selected by making use of the focus Fc, the program to be broadcasted in the time range 6:00 PM to 6:30 PM is assigned to a large program frame Frx30 (L) displaying a broadcasting start time of 00 minutes and a title of "News" given to the program as shown in FIG. 23A. The program to be broadcasted in the time range 6:30 PM to 6:50 PM is assigned to a small program frame Frx31 (S) displaying only a broadcasting start time of 30 minutes on the right-hand side of the large program frame Frx30 (L). By the same token, the program to be broadcasted in the time range 6:50 PM to 7:00 PM is assigned to a small program frame Frx32 (S) displaying only a broadcasting start time of 50 minutes on the right-hand side of the small program frame Frx31 (S). That is to say, FIG. 23A shows a state in which the program to be broadcasted in the time range 6:00 PM to 6:30 PM is selected by making use of the focus Fc.

When the host microcomputer 2 employed in the TV-broadcast receiving apparatus 1 recognizes an operation carried out by the user to press a right-direction key of the remote controller RM in order to move the focus Fc from the program frame Frx30 (L) to the program frame Frx31 (S) in the state shown in FIG. 23A for example, the time frame Ti makes a transition to a state shown in FIG. 23B. In the transition, the program frame Frx30 (L) is changed to a program frame Frx30 (S). That is to say, the large program frame Frx30*x* (L) is changed to a small program frame Frx30 (S). In addition, the program frame Frx31 (S) on the right-hand side of the program frame Frx30 (L) is changed to a program frame Frx31 (L). That is to say, the small program frame Frx31 (S) is changed to a large program frame Frx31 (L). Thus, the focus Fc is now located at the newly created large program frame Frx31 (L). As a result, the program frame Frx30 (S) displays only a broadcasting start time of 00 minutes whereas the program frame Frx31 (L) on the right-hand side of the program frame Frx30 (S) displays the broadcasting start time of 30 minutes and a title of "Sport Information" for the program newly selected by making use of the focus Fc. That is to say, FIG. 23B shows a state in which the program to be broadcasted in the time range 6:30 PM to 6:50 PM is selected by making use of the focus Fc.

When the host microcomputer 2 employed in the TV-broadcast receiving apparatus 1 recognizes an operation carried out by the user to press the right-direction key of the remote controller RM in order to further move the focus Fc from the program frame Frx31 (L) to the program frame Frx32 (S) in the state shown in FIG. 23B for example, the time frame Ti makes a transition to a state shown in FIG. 23C. In the transition, the program frame Frx31 (L) is changed to a program frame Frx31 (S). That is to say, the large program frame Frx31*x* (L) is changed to a small program frame Frx31 (S). In addition, the program frame Frx32 (S) on the right-hand side of the program frame Frx31 (L) is changed to a program frame Frx32 (L). That is to say, the small program frame Frx32 (S) is changed to a large program frame Frx32 (L). Thus, the focus Fc is now located at the newly created large program frame Frx32 (L). As a result, the program frame Frx31 (S) displays only a broadcasting start time of 30 minutes whereas the program frame Frx32 (L) on the right-hand side of the program frame Frx31 (S) displays the broadcasting start time of 50 minutes and a title of "Weather Forecast" for the program newly selected by making use of the focus Fc. That is to say, FIG. 23C shows a state in which the program to be broadcasted in the time range 6:50 PM to 7:00 PM is selected by making use of the focus Fc.

As described above, the host microcomputer 2 employed in the TV-broadcast receiving apparatus 1 is capable of selecting a program indicated by making use of the focus Fc even from those displayed on an electronic program table 31*x* with its vertical axis representing channels and its horizontal axis representing broadcasting times in the same way as the selection of a program from those appearing in an electronic program table 31 with its horizontal axis representing channels and its vertical axis representing broadcasting times.

In addition, the user is allowed to arbitrarily switch the electronic program table screen 30 from an electronic program table 31*x* with its vertical axis representing channels and its horizontal axis representing broadcasting times in accordance with the other embodiment to an electronic program table 31 with its horizontal axis representing channels and its vertical axis representing broadcasting times in accordance with the embodiment explained earlier or vice versa.

Figure 25:
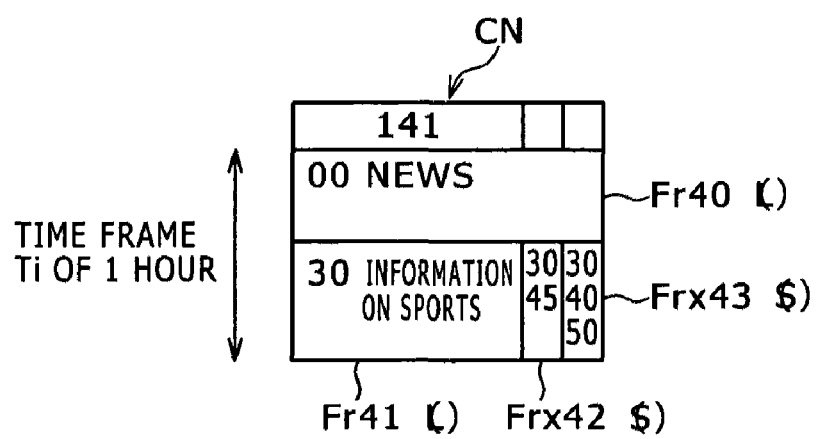
FIG. 25 is a diagram showing program-frame allocation according to the further embodiment for displaying information for the channel numbers of channels sharing an event in the time range 00 to 30 minutes in a 1-hour time frame Ti including the time range.

In accordance with the description given so far, the processing for generating an electronic program table is carried out for every one-channel/one-time-frame unit. On top of that, a program frame Frx conforming to the electronic program table 31*x* with its vertical axis representing channels and its horizontal axis representing broadcasting times can be combined with a program frame Fr conforming to the electronic program table 31 with its horizontal axis representing channels and its vertical axis representing broadcasting times, for example, in order to collectively display information on programs to be displayed through a plurality of channels sharing a program as a common event in one multi-channel-number frame CN which is provided for a plurality of channels sharing a common event as a frame with a typical time slot of one hour as shown in FIG. 25.

Figure 24:
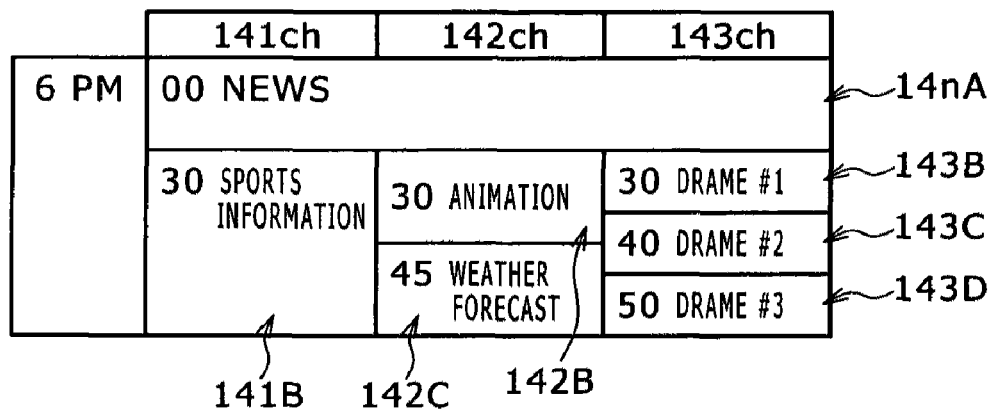
FIG. 24 is a diagram showing typical program information according to a further embodiment.

For example, the EPG includes three channels sharing a program as a common event as shown in FIG. 24. The three channels have channel numbers of 141, 142 and 143 respectively. The EPG also includes information on programs to be broadcasted through the three channels during a one-hour time slot starting typically at 6:00 PM. The programs are:

a program 14*n*A to be broadcasted in the time range 6:00 to 6:30 as a common event shared by the three channels;

a program 141B to be broadcasted in the time range 6:30 to 7:00 through the channel with a channel number of 141;

a program 142B to be broadcasted in the time range 6:30 to 6:45 through the channel with a channel number of 142;

a program 142C to be broadcasted in the time range 6:45 to 7:00 through the channel with a channel number of 142;

a program 143B to be broadcasted in the time range 6:30 to 6:40 through the channel with a channel number of 143;

a program 143C to be broadcasted in the time range 6:40 to 6:50 through the channel with a channel number of 143; and a program 143D to be broadcasted in the time range 6:50 to 7:00 through the channel with a channel number of 143.

The programs described above are assigned to program frames Fr conforming to the electronic program table 31 and program frames Frx conforming to the electronic program table 31*x* in the multi-channel-number frame CN having a one-hour time slot corresponding to a time frame Ti as shown in FIG. 25. To put it concretely, the host microcomputer 2 employed in the TV-broadcast receiving apparatus 1 displays information on the programs described above on the multi-channel-number frame CN. The information displayed on the multi-channel-number frame CN includes:

the channel number of 141 having a height of one line on the first row also including two positions on the right-hand side of the channel number of 141 for the channel numbers of 142 and 143 respectively;

a program frame Fr40 (L) having a height of two lines on the second row;

a program frame Fr41 (L) having a height of two lines and a width smaller than the width of the program frame Fr40 (L) by a difference of two lines corresponding to the channel numbers 142 and 143 respectively on the left end of the third row;

a program frame Frx42 (S) having a height of two lines and a width of one line corresponding to the channel number of 142 on the right-hand side of the program frame Fr41 (L) on the third row; and a program frame Frx43 (S) having a height of two lines and a width of one line corresponding to the channel number of 143 on the right end of the third row.

The program frame Fr40 (L) is allocated to the program 14nA to be broadcasted in the time range 6:00 to 6:30 as a common event shared by the three channels. The program frame Fr41 (L) is allocated to the program 141B to be broadcasted in the time range 6:30 to 7:00 through the channel with a channel number of 141.

The program frame Frx42 (S) is allocated to the program 142B to be broadcasted in the time range 6:30 to 6:45 through the channel with a channel number of 142 and the program 142C to be broadcasted in the time range 6:45 to 7:00 through the channel with the channel number of 142.

The program frame Frx43 (S) is allocated to the program 143B to be broadcasted in the time range 6:30 to 6:40 through the channel with a channel number of 143, the program 143C to be broadcasted in the time range 6:40 to 6:50 through the channel with the channel number of 143 and the program 143D to be broadcasted in the time range 6:50 to 7:00 through the channel with the channel number of 143.

As a result, for the program 14nA, the program frame Fr40 (L) shows a broadcasting start time of 00 minutes and a title of "News." For the program 141B, the program frame Fr41 (L) shows a broadcasting start time of 30 minutes and a title of "Sport Information." The program frame Frx42 (S) shows a broadcasting start time of 30 minutes for the program 142B and a broadcasting start time of 45 minutes for the program 142C. The program frame Frx43 (S) shows a broadcasting start time of 30 minutes for the program 143B, a broadcasting start time of 40 minutes for the program 143C and a broadcasting start time of 50 minutes for the program 143D.

As described above, pieces of program information provided for a plurality of channels sharing a common event can be collectively displayed in one multi-channel-number frame CN. By making use of such a multi-channel-number frames CN, it is possible to display pieces of program information provided for a number of channels for a case in which there are a number of broadcasting stations sharing a common event.

By referring to FIGS. 26A to 26F, the following description briefly explains a process to select a program by making use of the focus Fc. First of all, the focus Fc is placed on the program frame Fr40 (L) in order to select the program 14nA in an initial state shown in FIG. 26A. In this initial state, the multi-channel-number frame CN shows information for the channel number of 141. When the host microcomputer 2 employed in the TV-broadcast receiving apparatus 1 recognizes an operation carried out by the user to press the downward-direction key of the remote controller RM in the state shown in FIG. 26A, the host microcomputer 2 moves the focus Fc from the program frame Fr40 (L) to the program frame Fr41 (L), resulting in a state shown in FIG. 26B. The resulting state shown in FIG. 26B is a state in which the program 141B is selected.

When the host microcomputer 2 employed in the TV-broadcast receiving apparatus 1 recognizes an operation carried out by the user to press a right-direction key of the remote controller RM in the state shown in FIG. 26B, the host microcomputer 2 moves the focus Fc in the right direction, resulting in a state shown in FIG. 26C. With the movement of the focus Fc in the right direction, the program frame Fr41 (L) is changed to a program frame Frx41 (S) with a height of two lines. That is to say, the large program frame Fr41 (L) is changed to a small program frame Frx41 (S). In addition, the program frame Frx42 (S) on the right-hand side of the program frame Fr41 (L) is changed to a program frame Fr44 (L) having a height of 1.5 lines and a program frame Fr45 (S) having a height of 0.5 lines right beneath the program frame Fr44 (L). On top of that, the program 142B assigned so far to the program frame Frx42 (S) is reassigned to the program frame Fr44 (L) whereas the program 142C assigned so far to the program frame Frx42 (S) is reassigned to the program frame Fr45 (S). Furthermore, the focus Fc is moved to the program frame Fr44 (L). Moreover, the channel number displayed on the CN is changed to 142.

As a result, the program frame Fr41x (S) displays only the broadcasting start time of 30 minutes for the program 141B whereas the program frame Fr44 (L) on the right-hand side of the program frame Frx41 (S) displays the broadcasting start time of 30 minutes and a title of "Animation" for the program 142B. The program frame Fr45 (S) beneath the program frame Fr44 (L) displays only the broadcasting start time of 45 minutes for the program 142C. The resulting state shown in FIG. 26C is a state in which the program 142B broadcasted by a channel having the channel number of 142 is selected.

When the host microcomputer 2 employed in the TV-broadcast receiving apparatus 1 recognizes an operation carried out by the user to press the downward-direction key of the remote controller RM in the state shown in FIG. 26C, the host microcomputer 2 moves the focus Fc downward, resulting in a state shown in FIG. 26D. With the movement of the focus Fc in the downward direction, the program frame Fr44 (L) is changed to a program frame Fr44 (S). That is to say, the large program frame Fr44 (L) is changed to a small program frame Fr44 (S). In addition, the program frame Fr45 (S) beneath the program frame Fr44 (L) is changed to a program frame Fr45 (L) having a height of 1.5 lines. Furthermore, the focus Fc is moved to the program frame Fr45 (L).

As a result, the program frame Fr44 (S) displays only the broadcasting start time of 30 minutes for the program 142B whereas the program frame Fr45 (L) right below the program frame Fr44 (S) displays the broadcasting start time of 45 minutes and a title of "Weather Forecast" for the program 142C. The resulting state shown in FIG. 26D is a state in which the program 142C broadcasted by a channel having the channel number of 142 is selected.

When the host microcomputer 2 employed in the TV-broadcast receiving apparatus 1 recognizes an operation carried out by the user to press the right-direction key of the remote controller RM in the state shown in FIG. 26C, the host microcomputer 2 moves the focus Fc in the right direction, resulting in a state shown in FIG. 26E. With the movement of the focus Fc in the right direction, the program frame Fr44 (L)

and the program frame Fr45 (S) are restored to the program frame Frx42 (S) having a height of two lines. In addition, the program frame Frx43 (S) on the right-hand side of the program frame Fr44 (L) and the program frame Fr45 (S) is changed to a program frame Fr46 (L) having a height of one line, a program frame Fr47 (S) having a height of 0.5 lines right beneath the program frame Fr46 (L) and a program frame Fr48 (S) having a height of 0.5 lines right beneath the program frame Fr47 (S). On top of that, the program 143B assigned so far to the program frame Frx43 (S) is reassigned to the program frame Fr46 (L), the program 143C assigned so far to the program frame Frx43 (S) is reassigned to the program frame Fr47 (S) and the program 143D assigned so far to the program frame Frx43 (S) is reassigned to the program frame Fr48 (S). Furthermore, the focus Fc is moved to the program frame Fr46 (L). In addition, the channel number displayed on the CN is changed to 143.

As a result, the program frame Frx42 (S) displays the broadcasting start time of 30 minutes for the program 142B and the broadcasting start time of 45 minutes for the program 142C below the broadcasting start time of 30 minutes for the program 142B. The program frame Fr46 (L) on the right-hand side of the program frame Frx42 (S) displays the broadcasting start time of 30 minutes and a title of "Drama #1" for the program 143B. The program frame Fr47 (S) beneath the program frame Fr46 (L) displays only the broadcasting start time of 40 minutes for the program 143C whereas the program frame Fr48 (S) beneath the program frame Fr47 (S) displays only the broadcasting start time of 50 minutes for the program 143D. The resulting state shown in FIG. 26E is a state in which the program 143B broadcasted by a channel having the channel number of 143 is selected.

When the host microcomputer 2 employed in the TV-broadcast receiving apparatus 1 recognizes an operation carried out by the user to press the downward-direction key of the remote controller RM in the state shown in FIG. 26E, the host microcomputer 2 moves the focus Fc downward, resulting in a state shown in FIG. 26F. With the movement of the focus Fc in the downward direction, the program frame Fr46 (L) is changed to a program frame Fr46 (S). That is to say, the large program frame Fr46 (L) is changed to a small program frame Fr46 (S). In addition, the program frame Fr47 (S) beneath the program frame Fr46 (L) is changed to a program frame Fr47 (L) having a height of one line. Furthermore, the focus Fc is moved to the program frame Fr47 (L).

As a result, the program frame Fr46 (S) displays only the broadcasting start time of 30 minutes for the program 143B whereas the program frame Fr47 (L) right below the program frame Fr46 (S) displays the broadcasting start time of 40 minutes and a title of "Drama #2" for the program 143C. The resulting state shown in FIG. 26F is a state in which the program 143C broadcasted by a channel having a channel number of 143 is selected.

By the way, when the host microcomputer 2 employed in the TV-broadcast receiving apparatus 1 recognizes an operation carried out by the user to press the right-direction key of the remote controller RM in the state shown in FIG. 26D, the host microcomputer 2 moves the focus Fc in the right direction from the program frame Fr45 (L), also resulting in a state shown in FIG. 26F. The resulting state shown in FIG. 26F is a state in which the focus Fc is placed at the program frame Fr47 (L).

That is to say, when the user selects a desired program by moving the focus Fc across the border between channels having the channel numbers of 142 and 143 from the channel having the channel number of 142 to the channel having the channel number of 143, which is the channel number of a channel broadcasting a plurality of programs during the time slot of one hour, the host microcomputer 2 has to select a specific one of the programs as a desired program broadcasted by the channel having the channel number of 143. In this case, the specific program selected by the host microcomputer 2 is a program having a broadcasting start time close to the broadcasting start time of a program selected so far.

As described above, even if information on programs broadcasted by a plurality of channels sharing a common event is collectively displayed in one multi-channel-number frame CN, the host microcomputer 2 employed in the TV-broadcast receiving apparatus 1 allows the user to select one of the programs by making use of the focus Fc.

In addition, the user is also allowed to arbitrarily switch the electronic program table screen 30 from the electronic program table 31 displaying information on programs in one-channel/one-time-frame units in accordance with the embodiment described earlier to an electronic program table displaying information on programs in multi-channel/one-time-frame units shown in FIG. 25 in accordance with another embodiment described above or vice versa. With this feature, the TV-broadcast receiving apparatus 1 can be used to display an electronic program table in a much more user-friendly manner.

On top of that, in accordance with the embodiments described so far, a large program frame FrL displays the broadcasting start time of a program assigned to the large program frame FrL and a title given to the program. However, implementations of the present invention are by no means limited to such embodiments. In a range permitted by the display area of a large program frame FrL, additional information included in an EPG as information other than the broadcasting start time of a program assigned to the program frame FrL and a title given to the program can be displayed. Examples of the additional information are an outline of the program or a detailed description of the program. By displaying such additional information, much information on each program can be shown to the user in comparison with an electronic program table showing only the broadcasting start time of every program and a title given to the program.

Figure 27A:
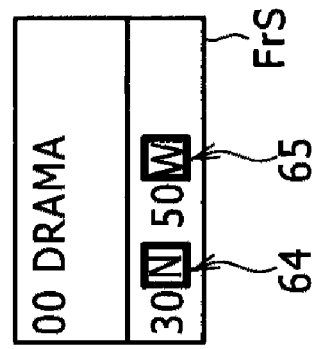
FIGS. 27A through 27C are diagrams each showing program icons according to a still further embodiment.

In addition, in accordance with the embodiments described so far, a small program frame FrS displays only the broadcasting start time of a program assigned to the small program frame FrS. However, implementations of the present invention are by no means limited to such embodiments. For example, a small program frame FrS can also be used to display icons each showing the processing state of a program assigned to the small program frame FrS at a location horizontally adjacent to the broadcasting start time as shown in FIG. 27A. In the typical program frame FrS shown in the figure, the displayed icons for two programs assigned to the small program frame FrS are an ongoing recording icon 60 indicating that a process to record one of the programs is being carried out and a completed reservation icon 61 indicating that a reservation has been made for the other program.

Figure 27B:
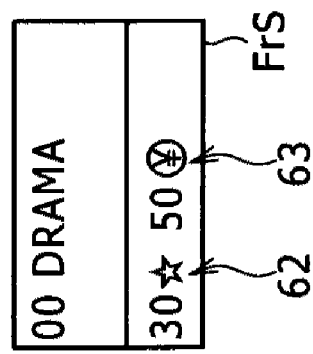

In addition, a small program frame FrS can also be used to display icons each showing attributes of a program assigned to the small program frame FrS at a location horizontally adjacent to the broadcasting start time as shown in FIG. 27B. In the typical program frame FrS shown in the figure, the displayed icons for two programs assigned to the small program frame FrS are a recommendation icon 62 indicating that one of the programs is a recommended program and a pay-program icon 63 indicating that the other program is a pay program.

Figure 27C:
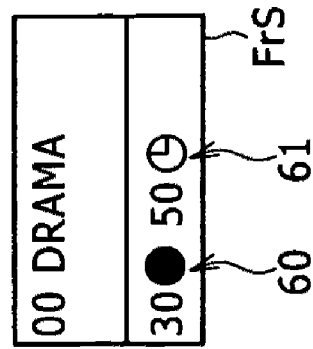
Figure 29A:
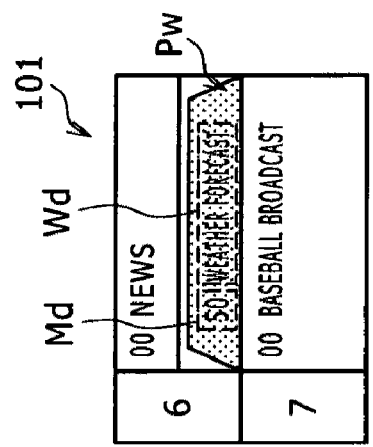
FIGS. 29A through 29C are explanatory diagrams to be referred to in description of a second known method for displaying an electronic program table.
Figure 29B:
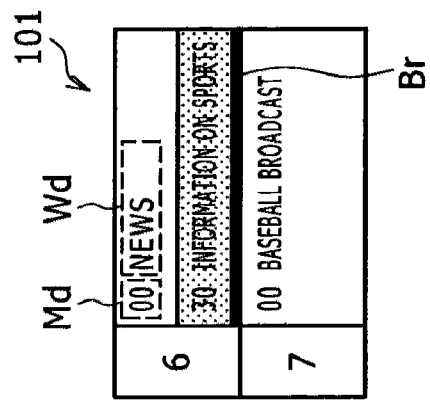
Figure 29C:
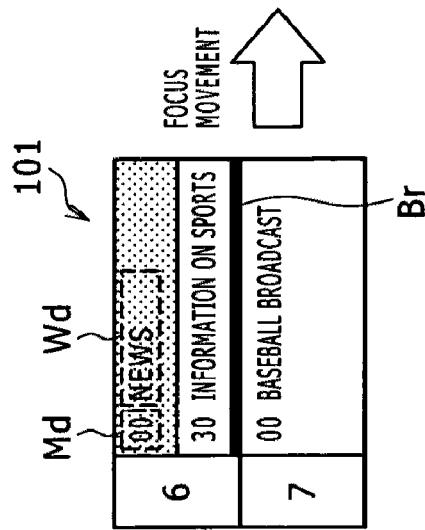

On top of that, a small program frame FrS can also be used to display icons each showing the contents of a program assigned to the small program frame FrS at a location horizontally adjacent to the broadcasting start time as shown in FIG. 27C. In the typical program frame FrS shown in the figure, the displayed icons for two programs assigned to the small program frame FrS are a news icon 64 indicating that one of the programs is a news program and a weather-forecast icon 65 indicating that the other program is a weather-forecast program.

Moreover, icons representing additional information displayed in a small program frame FrS allocated to a program as additional information on the program are by no means limited to the icons described above. That is to say, icons representing additional information displayed in a small program frame FrS allocated to a program as additional information on the program can be a variety of other icons (or marks) each giving the user a hint as to what type of program the program is. In the following description, the icons (or marks) representing information on a program are each generically referred to as a program icon.

In addition, in a range permitted by the display area of a small program frame FrS, a variety of program icons each representing information on a program can be displayed at locations arranged horizontally beside the broadcasting start time of the program. By displaying such additional information, much information on each program can be shown to the user in comparison with an electronic program table showing only the broadcasting start time of every program.

In addition, the embodiments described so far each assume that, the longer the broadcasting time duration of a program, the more the significance that can be said as importance of the program to both the broadcasting station and the TV watcher. For this reason, a large program frame Fr is allocated to an important program so that much information on the program can be displayed. In addition, the embodiments described so far each also assume that a program selected by the user by making use of the focus Fc is a program of importance to the user. For this reason, a large program frame Fr is allocated to a program selected by the user by making use of the focus Fc. Nevertheless, implementations of the present invention are by no means limited to such embodiments. For example, a large program frame FrL can also be allocated to a program with an approaching broadcasting end time or a program currently being broadcasted.

As an alternative, a large program frame FrL can also be allocated to a program including program information indicating that the program is a new program, or indicating that the program is a program broadcasted for the last time, or indicating that the program is reserved for watching or recording.

As another alternative, the TV-broadcast receiving apparatus 1 can be provided with a function to generate data indicating favorites with the user on the basis of operations carried out by the user to select a program and/or watch a program or on the basis of keywords registered by the user as keywords each showing a favorite with the user. Then, the TV-broadcast receiving apparatus 1 identifies the most favorite program on the basis of the data indicating favorites with the user and assign the most favorite program to a large program frame FrL.

In addition, conversely speaking, it is possible to provide a configuration in which a most undesired program is deliberately assigned to a small program frame FrS. Examples of the most undesired program are a program that may not be watched because no contract has been made with a broadcasting station broadcasting the program, a program with its broadcasting time range already expired and a least favorite program.

On top of that, in accordance with the embodiments described above, the size of a small program frame FrS is set at 0.5 lines. However, implementations of the present invention are by no means limited to such embodiments. That is to say, the size of a small program frame FrS can be set at any value as long as the value is smaller than the size of the large program frame FrL.

In addition, in accordance with the embodiments described above, both the large program frame FrL and the small program frame FrS display the broadcasting start time of a program in terms of minutes representing an offset relative to the start of the time frame Ti including the large program frame FrL and the small program frame FrS. However, implementations of the present invention are by no means limited to such embodiments. For example, both the program frame Fr1 and the small program frame FrS can also display the broadcasting start time of a program in terms of hours and minutes. As an alternative, the large program frame FrL displays the broadcasting start time of a program in terms of hours and minutes whereas the small program frame FrS displays the broadcasting start time of a program in terms of minutes.

On top of that, in accordance with the embodiments described above, the remote controller RM is used as means for selecting a program by moving the focus Fc. However, implementations of the present invention are by no means limited to such embodiments. For example, a variety of operation devices such as a mouse and a keyboard can also be used for moving the focus Fc.

In addition, in accordance with the embodiments described above, the present invention is applied to a TV-broadcast receiving apparatus 1 functioning as a schedule-table presenting apparatus or an information processing apparatus. However, the scope of the present invention is by no means limited to such embodiments. That is to say, the present invention can also be applied to a variety of other apparatus.

To put it concretely, the present invention can be applied to a program recording apparatus such as a DVD recorder or a hard-disk recorder. In this case, the program recording apparatus functions as a schedule-table generation apparatus not having the display section 52 included in the configuration shown in FIG. 19. In the case of such an application, the program recording apparatus displays a generated electronic program table 31 on an external display section such as an externally connected liquid-crystal display unit in order to show the electronic program table 31 to the user.

In addition, the present invention can be applied to an information processing apparatus such as a server having a data transmitting section in place of the display section 52 and the display control section 53. Such a server transmits a generated electronic program table 31 to a terminal having a display section by way of typically a network. As a matter of fact, the TV-broadcast receiving apparatus 1 employs the network terminal 18 and the network controller 19 to be used as the data transmitting section of the information processing apparatus. Thus, the TV-broadcast receiving apparatus 1 is capable of transmitting a generated electronic program table 31 to an external apparatus connected to the network terminal 18 through the network controller 19.

On top of that, in accordance with the embodiments described above, the TV-broadcast receiving apparatus 1 acquires an EPG including a broadcasted schedule of TV programs to be broadcasted by broadcasting stations and, on the basis of the EPG, generates an electronic program table 31 serving as a schedule table of the TV programs. However, implementations of the present invention are by no means limited to such embodiments. For example, instead of acquiring an EPG, the TV-broadcast receiving apparatus 1 may also obtain information broadcasted by a server through typically a network as information showing a broadcasted schedule of TV programs to be broadcasted by broadcasting stations. Then, on the basis of the information received from the server, the TV-broadcast receiving apparatus 1 generates an electronic program table 31 serving as a schedule table of the TV programs.

In addition, the information received by the TV-broadcast receiving apparatus 1 from a server through typically a network does not have to be information showing a broadcasted schedule of TV programs to be broadcasted by broadcasting stations. The information can be information showing a schedule of a variety of events such as motion pictures shown at motion-picture theatres and concerts performed at concert halls. Such information shows at least the start time of every event and a descriptive text describing the event. Then, on the basis of the schedule received from the server, the TV-broadcast receiving apparatus 1 generates a schedule table of events.

On top of that, in accordance with the embodiments described above, the left-most single-channel-number frame CN1, which is provided for a particular channel number frame CN1 selected among the channel number frames CN1 to CN7, deliberately shows a triangular mark M1 oriented in the left direction if a channel number smaller than the channel number CN1 displayed in the left-most single-channel-number frame CN1 exists in the acquired EPG. The triangular mark M1 oriented in the left direction is deliberately displayed in order to indicate that a channel number smaller than the channel number CN1 displayed in the left-most single-channel-number frame CN1 exists in the acquired EPG. By the same token, the right-most single-channel-number channel number frame CN7, which is provided for a particular channel number frame CN7 selected among the channel number frames CN1 to CN7, deliberately shows a triangular mark M2 oriented in the right direction if a channel number greater than the channel number CN7 displayed in the right-most single-channel-number frame CN7 exists in the acquired EPG. The triangular mark M2 oriented in the right direction is deliberately displayed in order to indicate that a channel number greater than the channel number CN7 displayed in the right-most single-channel-number frame CN7 exists in the acquired EPG. However, implementations of the present invention are by no means limited to such embodiments. For example, the left-most single-channel-number frame CN1 shows the triangular mark M1 without regard to whether a channel number smaller than the channel number CN1 displayed in the left-most single-channel-number frame CN1 exists in the acquired EPG, whereas the right-most single-channel number frame CN7 shows the triangular mark M2 without regard to whether a channel number greater than the channel number CN7 displayed in the right-most single-channel-number frame CN7 exists in the acquired EPG. In this case, if a channel number smaller than the channel number CN1 displayed in the left-most single-channel-number frame CN1 does not exist in the acquired EPG and the triangular mark M1 is operated, the last channel in the acquired EPG will appear. If a channel number greater than the channel number CN7 displayed in the right-most single-channel-number frame CN7 does not exist in the acquired EPG and the triangular mark M2 is operated, on the other hand, the first channel in the acquired EPG will appear. In this way, the triangular marks M1 and M2 allow the display of channels to be rotated along a ring as follows.

Let us assume for example that the EPG includes only seven channels with channel numbers of 011, 012, 021, 022, 023, 041 and 042 respectively. In this case, if the right-direction key provided on the remote controller RM is operated in order to change displayed channels, the display of channels is switched from a displayed sequence of 011, 012, 021, 022, 023, 041 and 042 to a displayed sequence of 012, 021, 022, 023, 041, 042 and 011 in a loop scroll set in the right direction. That is to say, in this case, the triangular marks M1 and M2 show that a loop scroll can be carried out.

In addition, in accordance with the embodiments described above, a program executed to carry out the processing to generate an electronic program table is stored in advance in a memory shown in none of the figures or the nonvolatile memory 4. However, implementations of the present invention are by no means limited to such embodiments. For example, the program can also be stored in advance in a recording medium such as an optical disk, a magnetic disk or a memory card. In this case, the TV-broadcast receiving apparatus 1 reads out the program from the recording medium through a drive connected to the TV-broadcast receiving apparatus 1 but shown in none of the figures and installs the program into an internal memory employed in the host microcomputer 2 or the nonvolatile memory 4 for later execution.

In addition, it should be understood by those skilled in the art that a variety of modifications, combinations, sub-combinations and alterations may occur, depending on design requirements and other factors insofar as they are within the scope of the appended claims or the equivalents thereof.

The present invention can be effectively applied to for example a wide range of apparatus each handling an EPG. Examples of such an apparatus are a TV receiver, a DVD recorder and an HDD recorder.

What is claimed is:

1. A schedule-table presenting apparatus, comprising:
a schedule acquisition section configured to acquire a schedule including the broadcasting start time of each of events and a descriptive text describing each of said events;
a schedule-table generation section configured (i) to assign a specific one of said events to a first program frame having a size large enough for showing the broadcasting start time of said specific event as well as a descriptive text describing said specific event and (ii) assign a plurality of events other than said specific event to a second program frame having a size smaller than that of said first program frame but large enough for showing the broadcasting start time of each of said other events based on said schedule acquired by said schedule acquisition section and in accordance with importance of each of said events in order to (iii) generate a schedule table including said first program frame and said second program frames such that a minimum time error is attained;
a display control section configured to display said schedule table generated by said schedule-table generation section on a display section determined in advance; and
a frame selection section configured to select one of said first and second program frames composing said schedule table,
wherein if a selected program frame is said second program frame, said selected second program frame is changed to said first program frame by increasing the size of said selected second program frame to the size of said first program frame, and if said selected second program frame has been allocated to a plurality of events, a specific one of said events is increased in size to the size of said first program frame and the remaining events remain the size of said second program frame.

2. The schedule-table presenting apparatus according to claim 1 wherein, if said selected second program frame is increased in size to said first program frame, said schedule-table generation means changes a previously selected first program frame placed to said second program frame by decreasing the size of said previously selected first program frame to the size of said second program frame.

3. The schedule-table presenting apparatus according to claim 1 wherein said schedule-table generation means generates said schedule table by creating a proper combination of the following patterns:
- a first pattern of assigning one event to one said first program event;
- a second pattern of assigning of two events to one said first program frame and one said second program frame respectively;
- a third pattern of assigning of three or more events to one said first program frame and two said second program frames; and
- a fourth pattern of assigning of four or more events to one said first program frame and three said second program frames.

4. The schedule-table presenting apparatus according to claim 1 wherein said schedule-table generation means determines an arrangement of said first and second program frames on the basis of broadcasting start times of events assigned to said first and second program frames and on the basis of a time axis set in said schedule table.

5. The schedule-table presenting apparatus according to claim 1 wherein said schedule-table generation means generates a schedule table showing the broadcasting start time of each particular one of events assigned to said second program frame and an icon representing said particular event.

6. The schedule-table presenting apparatus according to claim 1 wherein said importance of any particular one of said events is determined on the basis of the duration of said particular event.

7. The schedule-table presenting apparatus according to claim 1 wherein said importance of any particular one of said events is determined on the basis of the broadcasting start time of said particular event.

8. The schedule-table presenting apparatus according to claim 1 wherein said importance of any particular one of said events is determined on the basis of attributes of said particular event.

9. The schedule-table presenting apparatus according to claim 1 wherein said importance of any particular one of said events is determined on the basis of how much the user likes said particular event.

10. The schedule-table presenting apparatus according to claim 1 wherein each of said events is a program.

11. The schedule-table presenting apparatus according to claim 1 wherein said schedule table generated by said schedule-table generation means is transmitted to an external recipient.

12. A schedule-table presenting method, comprising:
using a processor to carry out the following:
acquiring a schedule including the broadcasting start time of each of events and a descriptive text describing each of said events,
assigning a specific one of said events to a first program frame having a size large enough for showing the broadcasting start time of said specific event as well as a descriptive text describing said specific event and assigning a plurality of events other than said specific event to a second program frame having a size smaller than that of said first program frame but large enough for showing the broadcasting start time of each of said other events on the basis of said schedule acquired at said schedule acquisition step and in accordance with importance of each of said events,
generating a schedule table including said first program frame and said second program frame such that a minimum time error is attained, and
displaying said schedule table generated at said schedule-table generation step on a display section determined in advance; and
selecting one of said first and second program frames composing said schedule table,
wherein if the selected program frame is said second program frame, said selected second program frame is changed to said first program frame by increasing the size of said selected second program frame to the size of said first program frame, and if said selected second program frame has been allocated to a plurality of events, a specific one of said events is increased in size to the size of said first program frame and the remaining events remain the size of said second program frame.

13. A schedule-table presenting apparatus comprising:
a schedule acquisition section configured to acquire a schedule including the broadcasting start time of each of events and a descriptive text describing each of said events;
a schedule-table generation section configured to generate a schedule table showing at least said broadcasting start time of each of said events as information on said events on the basis of said schedule acquired by said schedule acquisition section such that a minimum time error is attained, the time error being defined by the relation:

$$\text{Time error} = \Sigma |s_k - (60/4) \times p_k|$$

wherein $s_k$ denotes an actual broadcast start time of a program $e_k$ broadcast through a channel being processed in a given one-hour time slot, $p_k$ denotes a display start line of a program frame Fr allocated to the program $e_k$, k is an integer in a range from 1 to n where n denotes a number of programs broadcasted through a given channel being processed in the given one-hour time slot; and
a display control section configured to display said schedule table generated by said schedule-table generation section on a display section determined in advance.

14. The schedule-table presenting apparatus according to claim 13 wherein said schedule table generated by said schedule-table generation means is transmitted to an external recipient.

15. A schedule-table presenting method, comprising:
using a processor to carry out the following:
acquiring a schedule including the broadcasting start time of each of events and a descriptive text describing each of said events,
generating a schedule table showing at least said broadcasting start time of each of said events as information on said events on the basis of said schedule acquired at said schedule acquisition step such that a minimum time error is attained, the time error being defined by the relation:

$$\text{Time error} = \Sigma |s_k - (60/4) \times p_k|$$

wherein $s_k$ denotes an actual broadcast start time of a program $e_k$ broadcast through a channel being processed in a given one-hour time slot, $p_k$ denotes a display start line of a program frame Fr allocated to the program $e_k$, and k is an integer in a range from 1 to n where n denotes a number of programs broadcast through a given channel in the given one-hour time slot and
displaying said schedule table generated at said schedule-table generation step on a display section determined in advance.

* * * * *